US011476652B2

(12) United States Patent
Simon

(10) Patent No.: US 11,476,652 B2
(45) Date of Patent: Oct. 18, 2022

(54) CAST IN PLACE DEVICE

(71) Applicant: IPEX TECHNOLOGIES INC., Oakville (CA)

(72) Inventor: Jis Simon, Brampton (CA)

(73) Assignee: IPEX TECHNOLOGIES INC., Mississauga (CA)

( * ) Notice: Subject to any disclaimer, the term of this patent is extended or adjusted under 35 U.S.C. 154(b) by 50 days.

(21) Appl. No.: 17/144,360

(22) Filed: Jan. 8, 2021

(65) Prior Publication Data

US 2021/0234350 A1 Jul. 29, 2021

(30) Foreign Application Priority Data

Jan. 24, 2020 (CA) ................................ CA 3069704
Nov. 5, 2020 (CA) ................................ CA 3098232

(51) Int. Cl.
*H02G 3/22* (2006.01)
*E04G 15/06* (2006.01)
*H02G 3/04* (2006.01)
*F16L 5/04* (2006.01)

(52) U.S. Cl.
CPC ............. *H02G 3/22* (2013.01); *E04G 15/061* (2013.01); *F16L 5/04* (2013.01); *H02G 3/0412* (2013.01)

(58) Field of Classification Search
CPC ...... H02G 3/22; H02G 3/0412; E04G 15/061; F16L 5/04; E04B 1/948; E04B 1/947; E04B 5/48; A62C 2/065
See application file for complete search history.

(56) References Cited

U.S. PATENT DOCUMENTS

| | | | |
|---|---|---|---|
| 358,505 | A | 3/1887 | Tatum |
| 2,728,126 | A | 12/1955 | Whtlock |
| 3,242,283 | A | 3/1966 | Clements |
| 4,272,643 | A | 6/1981 | Carroll |
| 4,365,784 | A | 12/1982 | De Stasio |
| 4,583,565 | A | 4/1986 | Cornwall |
| 4,596,340 | A | 6/1986 | Luther |
| 4,638,829 | A | 1/1987 | Cornwall |
| 4,788,800 | A | 12/1988 | Whiteley |
| 5,009,220 | A | 4/1991 | Cornelison |
| 5,035,097 | A | 7/1991 | Cornwall |

(Continued)

FOREIGN PATENT DOCUMENTS

| | | |
|---|---|---|
| AU | 598001 B | 7/1987 |
| AU | 598699 B | 7/1988 |

(Continued)

*Primary Examiner* — Gisele D Ford

(57) ABSTRACT

A first firestop device and a second firestop device, each comprising a housing. The housing of the first firestop device has a connection side with a plurality of connection elements and the housing of the second firestop device has a complementary side with a complementary element. The connection elements are each arranged at a different location on the connection side of the housing of the first firestop device, so that a position of the first firestop device relative to the second firestop device, when the connection side of the housing of the first firestop device is interlocked with the complementary side of the housing of the second firestop device, is selectable by selecting which of the connection elements of the first firestop device is connected to the complementary element of the second firestop device.

13 Claims, 43 Drawing Sheets

(56) References Cited

U.S. PATENT DOCUMENTS

| | | | |
|---|---|---|---|
| 5,040,351 | A | 8/1991 | Cornwall |
| 5,127,425 | A | 7/1992 | Cornwall |
| 5,183,070 | A | 2/1993 | Cornwall |
| 5,293,724 | A | 3/1994 | Cornwall |
| 5,634,304 | A | 6/1997 | Sakno |
| 6,161,564 | A | 12/2000 | Cornwall |
| 6,336,297 | B1 | 1/2002 | Cornwall |
| 6,405,502 | B1 | 6/2002 | Cornwall |
| 6,536,169 | B2 | 3/2003 | Dykhoff |
| 7,240,905 | B1 | 7/2007 | Stahl, Sr. |
| 7,373,761 | B2 | 5/2008 | Stahl, Sr. |
| 7,465,888 | B2 | 12/2008 | Fischer et al. |
| 7,581,362 | B2 | 9/2009 | Vaughan |
| 8,001,737 | B1 | 8/2011 | Price |
| 8,689,503 | B2 | 4/2014 | Fischer et al. |
| 8,793,946 | B2 | 8/2014 | Stahl, Jr. et al. |
| 8,813,336 | B1 | 8/2014 | Cornwall |
| 8,851,198 | B2 | 10/2014 | Burnham |
| 9,103,116 | B2 | 8/2015 | McConnell et al. |
| 9,388,570 | B2 | 7/2016 | Brown et al. |
| 9,597,534 | B1 | 3/2017 | Murray et al. |
| 9,636,530 | B2 | 5/2017 | Murray et al. |
| 2004/0016190 | A1 | 1/2004 | Radke et al. |
| 2004/0168395 | A1* | 9/2004 | Sanftleben ............ E04G 15/061 52/698 |
| 2006/0096197 | A1* | 5/2006 | Tollefson ................ F16L 3/222 52/223.13 |
| 2010/0146889 | A1* | 6/2010 | Pontarolo ................. E04B 5/21 52/295 |
| 2011/0030309 | A1* | 2/2011 | Peacock .................. F16L 3/222 248/69 |
| 2011/0036038 | A1 | 2/2011 | von Rummelhoff |
| 2013/0152497 | A1* | 6/2013 | Monden .................... F16L 5/04 52/578 |
| 2013/0228657 | A1* | 9/2013 | Sprenger .................. H02G 3/22 248/56 |
| 2014/0260016 | A1 | 9/2014 | Langille |
| 2015/0047276 | A1* | 2/2015 | Gandolfo .................. F16L 5/04 52/220.8 |
| 2015/0121782 | A1 | 5/2015 | McConnell et al. |
| 2018/0106034 | A1 | 4/2018 | Hulteen |
| 2018/0214722 | A1 | 8/2018 | Murray et al. |
| 2019/0237954 | A1* | 8/2019 | Ferderer .............. H02G 3/0418 |
| 2020/0106254 | A1* | 4/2020 | Doultremont ........ G02B 6/4444 |

FOREIGN PATENT DOCUMENTS

| | | | |
|---|---|---|---|
| CA | 1274444 | C | 2/1988 |
| DE | 102018215690 | A1 | 3/2020 |
| EP | 332681 | B1 | 7/1988 |
| EP | 1404999 | B1 | 6/2002 |
| EP | 1446539 | B1 | 10/2002 |
| EP | 1495248 | B1 | 2/2003 |
| EP | 1780456 | B1 | 10/2006 |
| GB | 1391035 | A | 2/1973 |
| GB | 1391035 | A | 2/1973 |
| KR | 200378186 | U | 3/2005 |
| KR | 200378186 | Y1 | 3/2005 |
| KR | 200378186 YI | | 3/2005 |
| KR | 100662699 | B1 | 12/2006 |
| KR | 100662707 | B1 | 12/2006 |
| KR | 20100009142 | A | 1/2010 |
| KR | 101055222 | B1 | 8/2011 |
| KR | 101500262 | B1 | 3/2015 |
| KR | 101726291 | B1 | 4/2017 |
| WO | WO2018193073 | A1 | 10/2018 |

* cited by examiner

CAST IN PLACE DEVICE

FIELD OF THE INVENTION

This invention relates to cast in place devices, and more particularly to firestop devices for preventing fire from spreading through service penetrations in concrete floors or the like.

BACKGROUND OF THE INVENTION

When constructing a building, poured concrete is often used to form walls, floors, and other constructional components. Often, a passage-forming device is attached to the formwork of the to-be-cast component before the concrete is poured, so that the device becomes embedded within the component and provides a passageway for passing pipes, electrical wires, or the like from one side of the component to the other.

In the event of a fire, there is a risk that the fire will spread through the passageway provided by the passage-forming device. To prevent or impede the spread of fire through the passageway, it is known to provide the device with an intumescent material that expands when exposed to the heat from a fire, thereby substantially sealing the passageway to facilitate containment of the fire and resulting smoke.

In some circumstances, it may be desirable to provide two or more passageways through a concrete constructional component. This can be achieved by attaching two passage-forming firestop devices together and embedding both devices within the concrete component, as is disclosed in U.S. Pat. No. 8,689,503 to Fischer et al., issued Apr. 8, 2014.

A disadvantage of known passage-forming firestop devices is that they provide limited configurations for attaching two or more of the devices together. This limits the relative positions that can be selected for the passageways extending through the concrete component, thereby limiting the relative positions of the pipes or other conduits that will pass through the passageways. A further disadvantage of known firestop devices is that they provide limited adjustability for selecting the length of the passageway. This limits the capacity of the devices to provide passageways through concrete components of varying thicknesses.

SUMMARY OF THE INVENTION

It is an object of the present invention to provide an improved type of cast-in-place constructional system that at least partially overcomes some of the disadvantages of the prior art.

Accordingly, in one aspect the present invention resides in a cast-in-place constructional system comprising a first firestop device and a second firestop device that are embeddable in a to-be-cast constructional component, the first firestop device and the second firestop device each comprising: a housing with an internal passageway for receiving a conduit; and an intumescent material that is positioned within the internal passageway, the intumescent material being configured to expand and occlude the internal passageway when exposed to heat from a fire; wherein the housing of the first firestop device is configured to interlock with the housing of the second firestop device; wherein the housing of the first firestop device and the housing of the second firestop device each have a center axis that extends through a center of their respective internal passageways; wherein, when the housing of the first firestop device is interlocked with the housing of the second firestop device, the center axis of the first firestop device is parallel to the center axis of the second firestop device; wherein the housing of the first firestop device and the housing of the second firestop device each have a mounting flange for releasably mounting the first firestop device and the second firestop device to a formwork of the to-be-cast constructional component; wherein the housing of the first firestop device has a connection side with a plurality of connection elements and the housing of the second firestop device has a complementary side with a complementary element, the complementary element of the complementary side of the second firestop device being configured to connect to a selected one of the connection elements of the connection side of the first firestop device; and wherein the connection elements of the connection side of the first firestop device are each arranged at a different location on the connection side of the housing of the first firestop device, so that a position of the first firestop device relative to the second firestop device, when the connection side of the housing of the first firestop device is interlocked with the complementary side of the housing of the second firestop device, is selectable by selecting which of the connection elements of the connection side of the first firestop device is connected to the complementary element of the complementary side of the second firestop device.

At least one advantage of the constructional system according to at least some embodiments of the present invention is that the plurality of connection elements on the connection side of the first firestop device may provide an improved selection of positions of the first firestop device relative to the second firestop device that may be selected when arranging the two firestop devices for embedding in a to-be-cast concrete component. This preferably allows the firestop devices to accommodate a variety of possible arrangements of the conduits that are to pass through the firestop devices, thereby preferably providing improved flexibility and customizability in the construction process. This further preferably provides the ability to "work around" other elements and devices being embedded in the concrete.

For example, in at least some embodiments of the invention the plurality of connection elements on the connection side of the first firestop device allow the first firestop device to be arranged relative to the second firestop device at an offset, in which the center axis of the first firestop device is offset relative to the center axis of the second firestop device. This preferably allows the first firestop device and the second firestop device to accommodate conduits that are offset from each other. Preferably, the direction and the size of the offset can be selected by selecting which of the plurality of connection elements on the connection side of the first firestop device is connected to the complementary element on the complementary side of the second firestop device.

The complementary side of the second firestop device is optionally a male side of the second firestop device, with the complementary element comprising a protrusion, and the connection side of the first firestop device is optionally a female side of the first firestop device, with the connection elements comprising sockets that are configured to matedly receive the protrusion of the second firestop device. Preferably, the first firestop device and the second firestop device are substantially identical, each having a male side and a female side that permit the firestop devices to be interlocked with additional firestop devices in a daisy-chain like arrangement.

In a further aspect, the present invention resides in a firestop device comprising: a sleeve with an internal passageway for receiving a conduit, the sleeve having an open bottom end and an open top end; a telescopic extension sleeve that removably couples to the sleeve, the extension sleeve defining an inner extension chamber with an open upper end and an open lower end for removably coupling to the open top end of the sleeve; and a locking mechanism for locking the extension sleeve at a selected height relative to the sleeve.

At least one advantage of the firestop device according to at least some embodiments of the present invention is that the telescopic extension sleeve allows the height of the device to be extended. The device thus preferably provides improved versatility for use with concrete components of varying thicknesses, with for example the extension sleeve being coupled to the sleeve to embed the device in a relatively thick component and with the extension sleeve being removed from the sleeve to embed the device in a relatively thin component. Preferably, the sleeve can also be cut to further reduce the height of the device when the device is to be embedded in a relatively thin component.

In a still further aspect, the present invention resides in a method of positioning and installing a first firestop device and a second firestop device, the first firestop device and the second firestop device each comprising: a housing with an internal passageway for receiving a conduit; and an intumescent material that is positioned within the internal passageway, the intumescent material being configured to expand and occlude the internal passageway when exposed to heat from a fire; wherein the housing of the first firestop device is configured to interlock with the housing of the second firestop device; wherein the housing of the first firestop device has a connection side with a plurality of connection elements and the housing of the second firestop device has a complementary side with a complementary element, the complementary element of the complementary side of the second firestop device being configured to connect to a selected one of the connection elements of the connection side of the first firestop device; and wherein the connection elements of the connection side of the first firestop device are each arranged at a different location on the connection side of the housing of the first firestop device; the method comprising: selecting a position for installing the first firestop device relative to the second firestop device; selecting one of the connection elements of the connection side of the first firestop device to connect to the complementary element of the complementary side of the second firestop device based on the position selected for installing the first firestop device relative to the second firestop device; connecting the complementary element of the complementary side of the second firestop device to the selected one of the connection elements of the connection side of the first firestop device; and installing the first firestop device and the second firestop device.

In some embodiments, the housing of the first firestop device has a mounting flange for releasably mounting the first firestop device to a formwork of a to-be-cast concrete component, the mounting flange lying in a mounting plane; wherein the connection elements of the connection side of the first firestop device each intersect a connection plane, the connection plane being parallel to the mounting plane; wherein the connection elements of the connection side of the first firestop device are arranged along a connection axis, the connection axis being parallel to the mounting plane; wherein the housing of the first firestop device is substantially identical to the housing of the second firestop device; wherein the housing of the first firestop device and the housing of the second firestop device each have a center axis that extends through a center of their respective internal passageways, the center axis being perpendicular to the mounting plane; wherein, when the housing of the first firestop device is interlocked with the housing of the second firestop device, the center axis of the first firestop device is parallel to the center axis of the second firestop device; wherein the plurality of connection elements of the connection side of the first firestop device comprise at least a first connection element and a second connection element; wherein, when the complementary element of the complementary side of the second firestop device is connected to the first connection element of the first firestop device, the center axis of the second firestop device is located at a first position relative to the center axis of the first firestop device; wherein, when the complementary element of the complementary side of the second firestop device is connected to the second connection element of the first firestop device, the center axis of the second firestop device is located at a second position relative to the center axis of the first firestop device; wherein the first position of the center axis of the second firestop device is spaced from the second position of the center axis of the second firestop device along an offset axis, the offset axis being parallel to the connection axis of the first firestop device and perpendicular to the center axis of the second firestop device; wherein selecting the position for installing the first firestop device relative to the second firestop device comprises selecting at least from the first position and the second position; wherein selecting one of the connection elements of the connection side of the first firestop device to connect to the complementary element of the complementary side of the second firestop device comprises selecting at least from the first connection element and the second connection element; and wherein installing the first firestop device and the second firestop device comprises connecting the mounting flange of the first firestop device and the mounting flange of the second firestop device to the formwork of the to-be-cast concrete component.

Optionally, the first firestop device and the second firestop device each further comprise: a sleeve that is fastened to the housing, the sleeve having a cylindrical wall that extends coaxially about the center axis of the internal passageway of the housing, the cylindrical wall defining an inner chamber with an open bottom end that is open to the internal passageway and an open top end; a gasket that is interposed between the sleeve and the housing, the gasket having a center hole for receiving the conduit; a metal sheath that annularly surrounds the intumescent material, the metal sheath having four tabs that are parallel to the mounting plane and extend out of the internal passageway, each of the four tabs having a hole; a telescopic extension sleeve that removably couples to the sleeve, the extension sleeve having a cylindrical outer wall that extends coaxially about the center axis of the internal passageway of the housing when the extension sleeve is coupled to the sleeve, the cylindrical outer wall defining an inner extension chamber with an open lower end for receiving the open top end of the sleeve, and an open upper end; a locking mechanism for locking the extension sleeve at a selected height relative to the sleeve; and a cap that removably couples to the open top end of the sleeve or the open upper end of the extension sleeve; wherein installing the first firestop device and the second firestop device comprises, for each of the first firestop device and the second firestop device: selecting a desired height of the firestop device based on a thickness of the to-be-cast concrete component; if the desired height is smaller than an unmodified height of the firestop device, cutting the sleeve so that the firestop device has the desired height; if the desired height is larger than the unmodified height of the firestop device, coupling the extension sleeve to the sleeve, positioning the extension sleeve so that the firestop device has the desired height, and locking the extension sleeve at the desired height; coupling the cap to the open top end of the sleeve or the open upper end of the extension sleeve; pouring concrete into the formwork to form the concrete component, the poured concrete being received by the holes in the tabs of the metal sheath, and the cap preventing the poured concrete from getting into the inner chamber or the inner extension chamber; curing the concrete, with the holes in the tabs of the metal sheath anchoring the metal sheath in the cured concrete; removing the cap from the open top end of the sleeve or the open upper end of the extension sleeve; and inserting the conduit through the internal passageway, the hole in the gasket, the inner chamber, and, if the extension sleeve is coupled to the sleeve, the inner extension chamber, with the gasket providing a water tight seal between the gasket and the conduit.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 33 is a perspective cross-sectional view of the firestop device with the extension assembly of FIG. 21, showing the firestop device interlocked with a second firestop device, with both firestop devices embedded in a concrete constructional component and with a pipe extending through each of the firestop devices;

DETAILED DESCRIPTION OF THE DRAWINGS

Preferred embodiments of the invention and its advantages can be understood by referring to the present drawings. In the present drawings, like numerals are used for like and corresponding parts of the accompanying drawings. Also, the following preferred embodiments and detailed description illustrate and describe non-limiting features of the invention.

Figure 1:
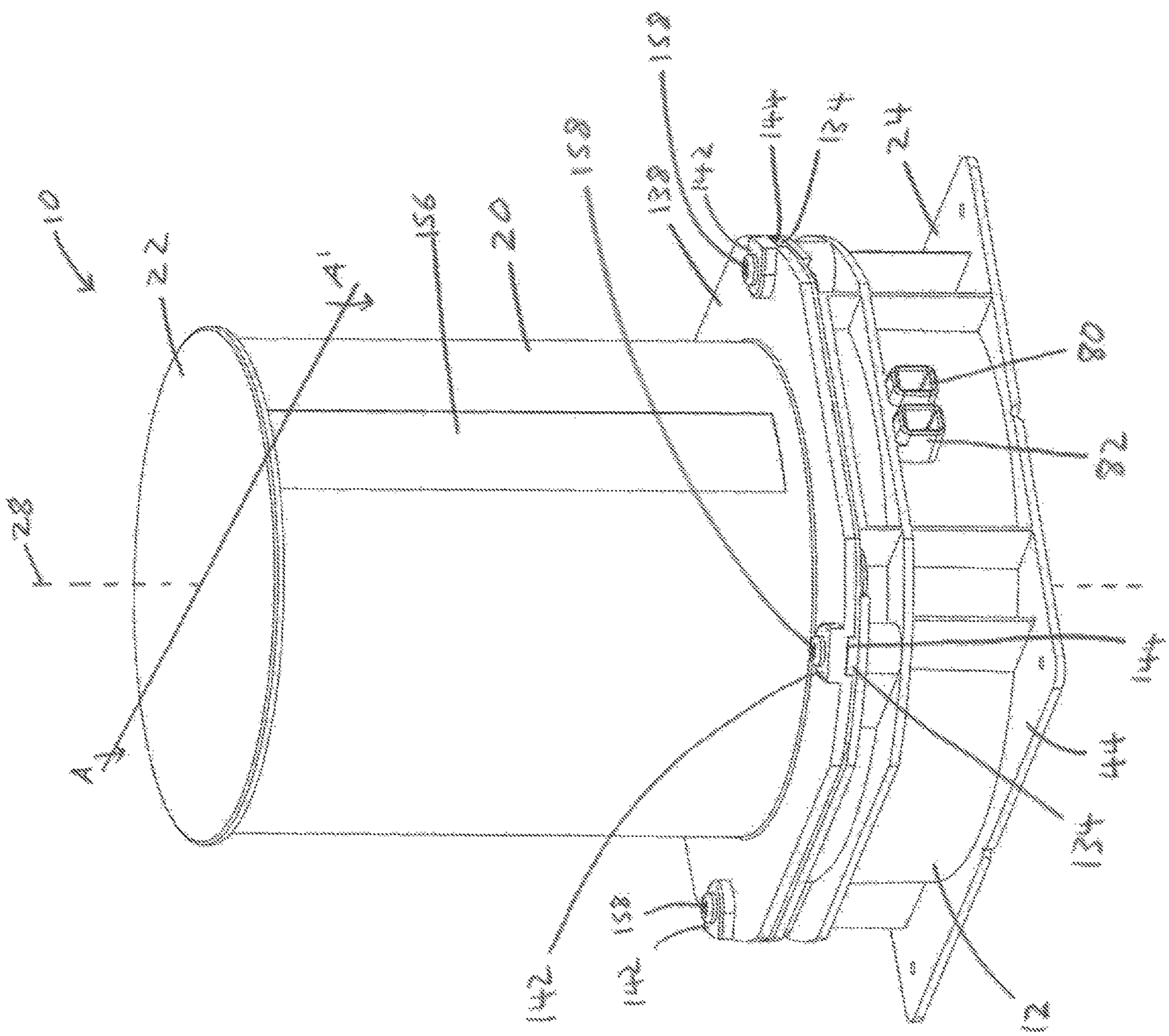
FIG. 1 is a perspective view of a firestop device in accordance with a first embodiment of the present invention.
Figure 5:
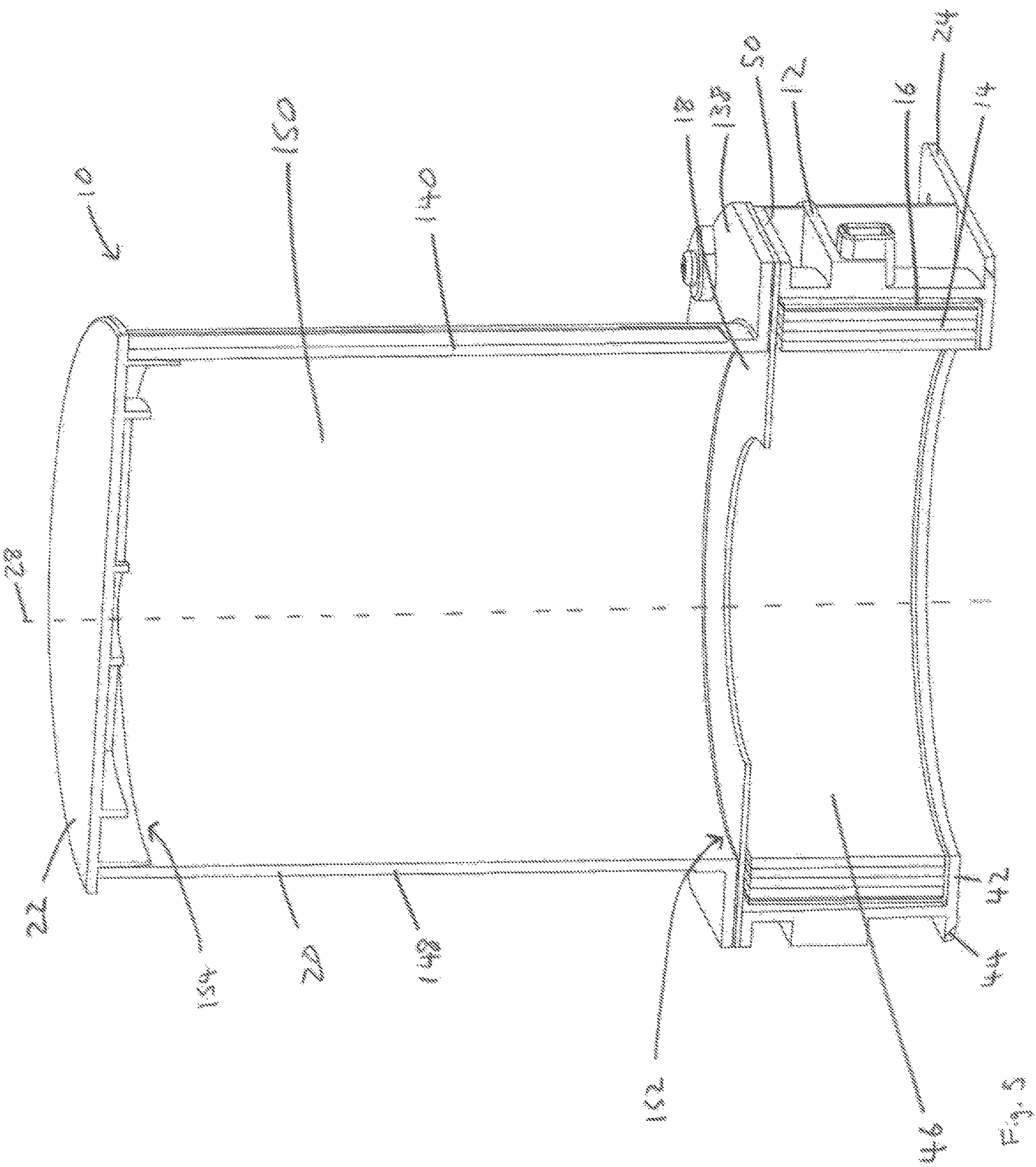
FIG. 5 is a perspective cross-sectional view of the firestop device of FIG. 1, taken along line A-A' shown in FIG. 1.

FIGS. 1 and 5 show a firestop device 10 of a cast-in-place constructional system in accordance with a first embodiment of the invention. As best shown in FIG. 5, the firestop device 10 has a housing 12, an intumescent material 14, a metal sheath 16, a gasket 18, a sleeve 20, and a removable cap 22.

Figure 6:
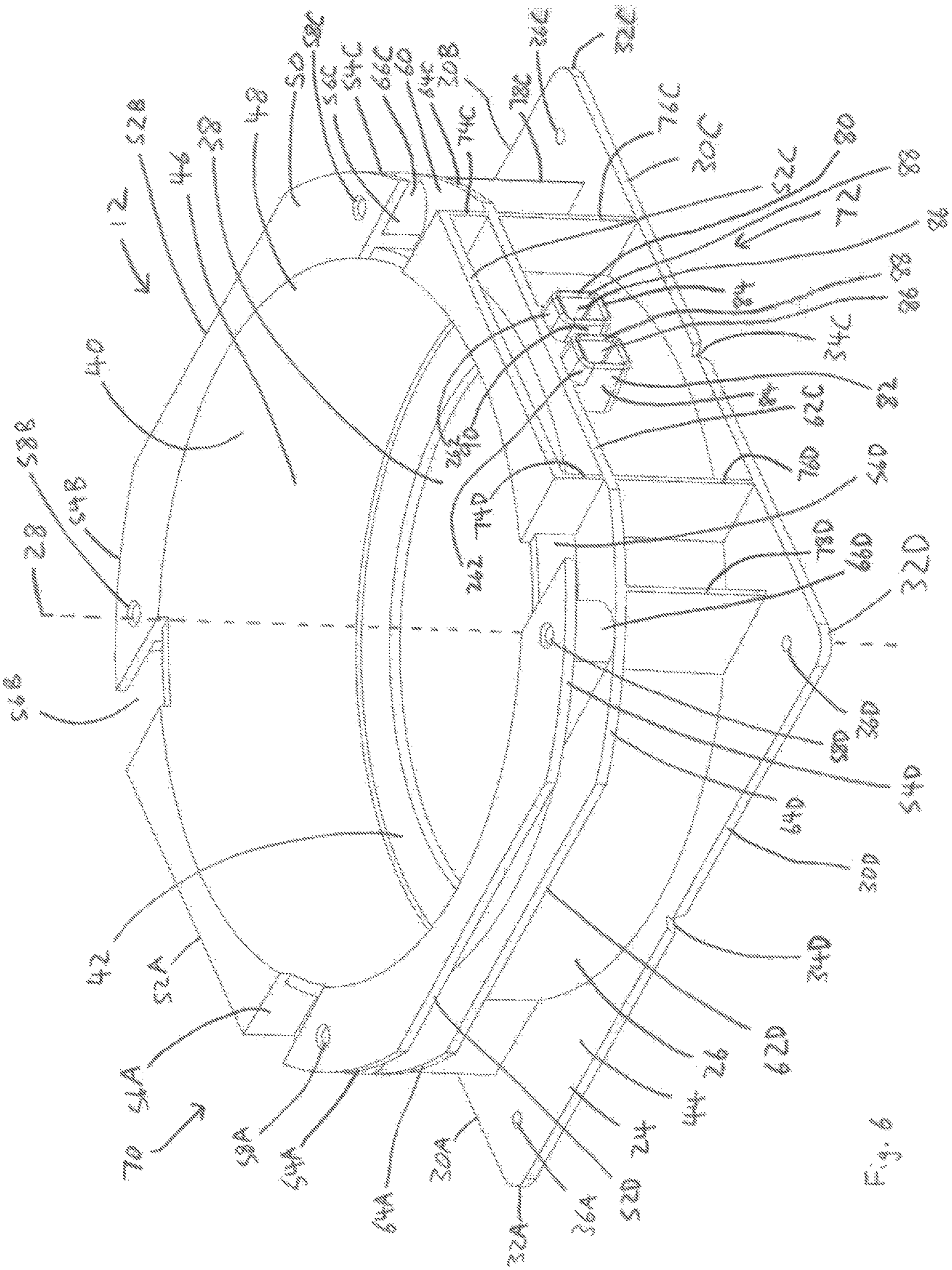
FIG. 6 is a perspective view of a housing of the firestop device of FIG. 1, showing a male side of the housing.
Figure 7:
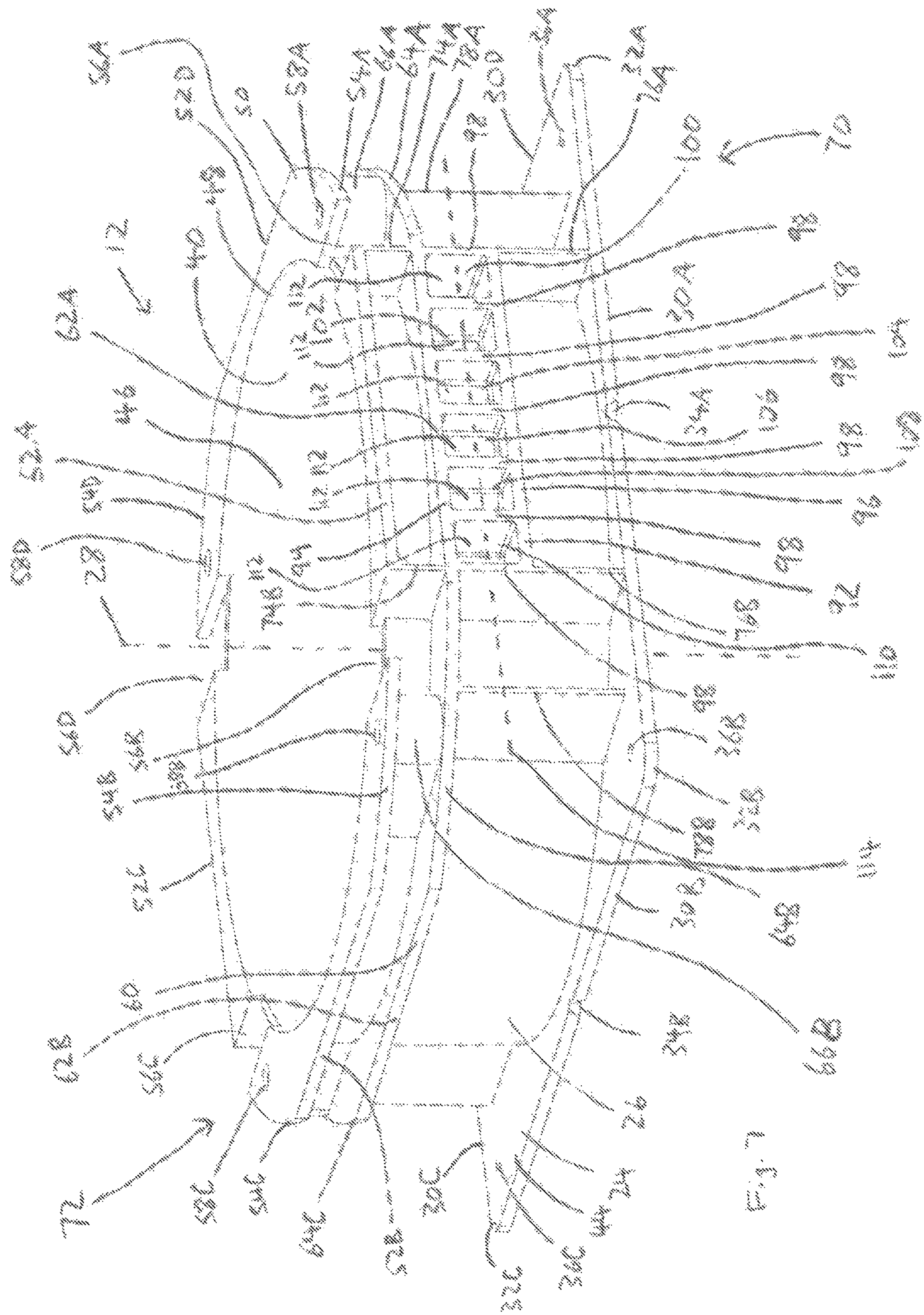
FIG. 7 is a perspective view of the housing of FIG. 6, showing a female side of the housing.

The housing 12 is shown in FIGS. 6 and 7 as having a planar base plate 24 and a generally cylindrical passage-forming body 26 that extends upwardly from the base plate 24 about a center axis 28. The base plate 24 has a generally square shape with four sides 30A, 30B, 30C, 30D and four rounded corners 32A, 32B, 32C, 32D. Each side 30A, 30B, 30C, 30D of the base plate 24 has a small notch 34A, 34B, 34C, 34D at its midpoint. Four mounting holes 36A, 36B, 36C, 36D extend through the base plate 24, each being positioned adjacent to one of the corners 32A, 32B, 32C, 32D. As shown in FIG. 6, the base plate 24 has a circular opening 38, the center axis 28 extending through the center of the circular opening 38.

The passage-forming body 26 has a cylindrical passage-forming wall 40 that extends upwardly from the base plate 24 concentrically about the center axis 28. The cylindrical passage-forming wall 40 defines an internal passageway 46 that extends from the circular opening 38 of the base plate 24 up to a circular upper housing opening 48. The diameter of the internal passageway 46 is larger than the diameter of the circular opening 38 of the base plate 24. The cylindrical passage-forming wall 40 divides the base plate 24 into an inner supporting flange 42 that extends radially inwardly from the cylindrical passage-forming wall 40 to the circular opening 38, and an outer mounting flange 44 that extends radially outwardly from the cylindrical passage-forming wall 40 to the sides 30A, 30B, 30C, 30D. The mounting flange 44 lies in a mounting plane that is perpendicular to the center axis 28.

An upper housing flange 50 extends radially outwardly from the cylindrical passage-forming wall 40 adjacent to the circular upper housing opening 48. The upper housing flange 50 has four straight side edges 52A, 52B, 52C, 52D that are each located vertically above a respective one of the sides 30A, 30B, 30C, 30D of the base plate 24, and four rounded corner edges 54A, 54B, 54C, 54D that are each located above and spaced radially inwardly from a respective one of the corners 32A, 32B, 32C, 32D of the base plate 24. Four fastening holes 58A, 58B, 58C, 58D extend through the upper housing flange 50, each being positioned adjacent to one of the rounded corner edges 54A, 54B, 54C, 54D. The upper housing flange 50 also has two tab-receiving cut-outs 56A, 56B that extend from the circular upper housing opening 48 to the straight side edge 52A, and two more tab-receiving cut-outs 56C, 56D that extend from the circular upper housing opening 48 to the straight side edge 52C. The cut-out 56A is located between the rounded corner edge 54A and the straight edge 52A, the cut-out 56B is located between the rounded corner edge 54B and the straight edge 52A, the cut-out 56C is located between the rounded corner edge 54C and the straight edge 52C, and the cut-out 56D is located between the rounded corner edge 54D and the straight edge 52C.

Figure 12:
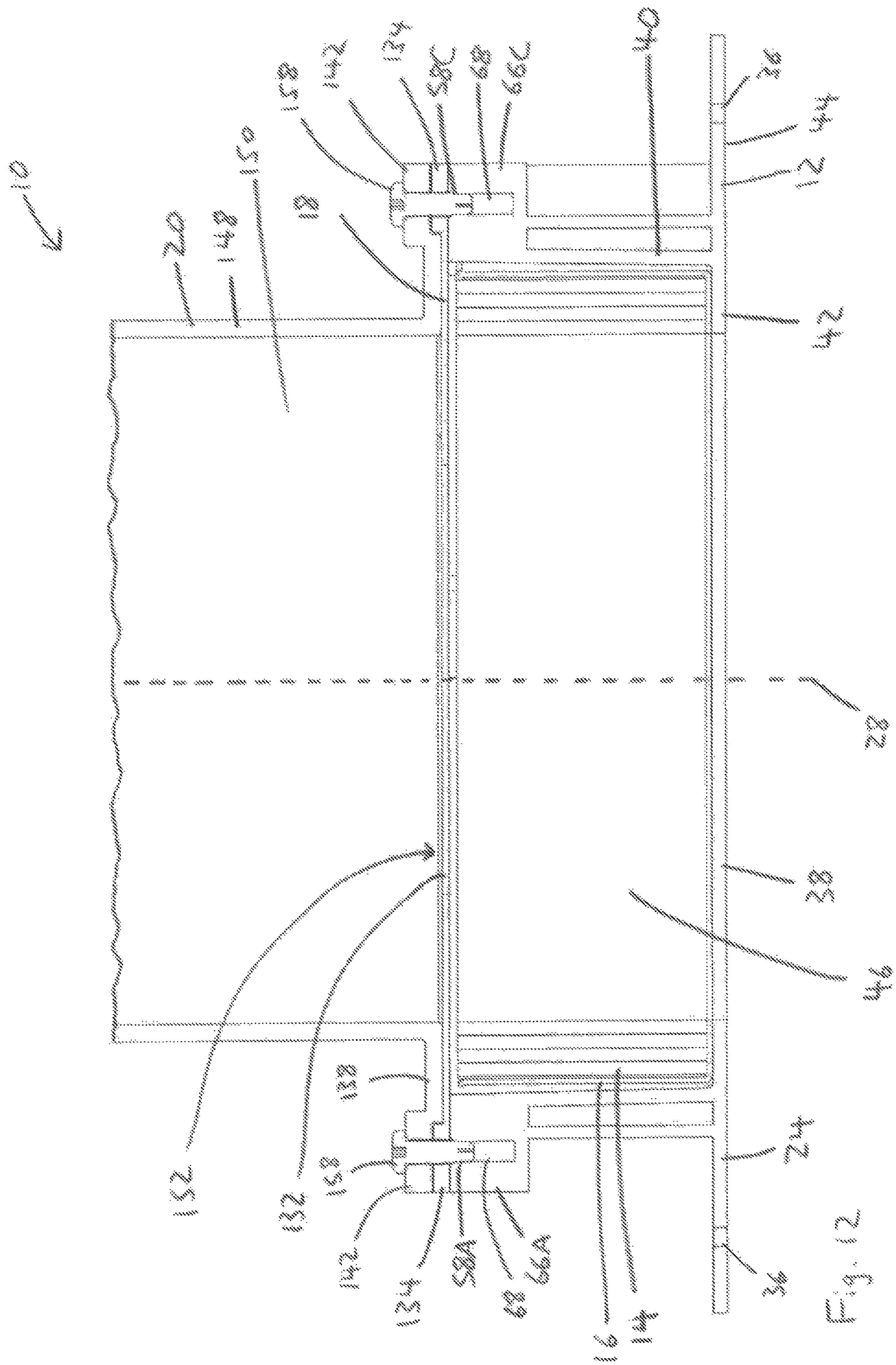
FIG. 12 is an enlarged cross-sectional view of the firestop device of FIG. 1, showing the housing, the gasket, the intumescent material, the metal sheath, and the bottom portion of a sleeve of the firestop device.

An intermediate housing flange 60 extends radially outwardly from the cylindrical passage-forming wall 40, and is spaced below the upper housing flange 50. The intermediate housing flange 60 has a shape that generally corresponds to the shape of the upper housing flange 50, including four straight intermediate side edges 62A, 62B, 62C, 62D that are each located vertically below a respective one of the straight side edges 52A, 52B, 52C, 52D of the upper housing flange 50, and four rounded intermediate corner edges 64A, 64B, 64C, 64D that are each located vertically below a respective one of the rounded corner edges 54A, 54B, 54C, 54D of the upper housing flange 50. Unlike the upper housing flange 50, the intermediate housing flange 60 does not include any tab-receiving cut-outs 56A, 56B, 56C, 56D or fastening holes 58A, 58B, 58C, 58D. As shown in FIGS. 6 and 7, a fastener receiving body 66A, 66B, 66C, 66D extends between the upper housing flange 50 and the intermediate housing flange 60 below each of the fastening holes 58A, 58B, 58C, 58D. As best shown in FIG. 12, the fastener receiving bodies 66A, 66B, 66C, 66D each define a fastener receiving channel 68 that extends downwardly from each of the respective fastening holes 58A, 58B, 58C, 58D.

The housing 12 has a female side 70, as shown in FIG. 7, and a male side 72, as shown in FIG. 6. The female side 70 is separated from the male side 72 by a hypothetical plane that contains the center axis 28 and extends through the notch 34B and the notch 34D. The female side 70 is the half of the housing 12 from the notch 34B to the notch 34D that includes the corner 32A, the side 30A, and the corner 32B of the base plate 24. The male side 72 is the half of the housing 12 from the notch 34D to the notch 34B that includes the corner 32C, the side 30C, and the corner 32D of the base plate 24. The female side 70 is also referred to herein as the connection side 70, and the male side 72 is also referred to herein as the complementary side 72.

As shown in FIG. 6, the male side 72 of the housing 12 has two upper support walls 74C, 74D that extend vertically from the upper housing flange 50 to the intermediate housing flange 60. The upper support wall 74C extends parallel to the side 30B of the base plate 24 from the cylindrical passage-forming wall 26 to the straight side edge 52C of the upper housing flange 50, and is positioned immediately adjacent to the tab-receiving cut-out 56C. The upper support wall 74D extends parallel to the side 30D of the base plate 24 from the cylindrical passage-forming wall 26 to the straight side edge 52C of the upper housing flange 50, and is positioned immediately adjacent to the tab-receiving cut-out 56D.

The male side 72 of the housing 12 also has two inner lower support walls 76C, 76D and two outer lower support walls 78C, 78D that extend vertically from the base plate 24 to the intermediate housing flange 60. The inner lower support wall 76C extends parallel to the side 30B of the base plate 24 from the cylindrical passage-forming wall 26 to the intermediate side edge 62C of the intermediate housing flange 60, and is positioned directly below the upper support wall 74C. The inner lower support wall 76D extends parallel to the side 30D of the base plate 24 from the cylindrical passage-forming wall 26 to the intermediate side edge 62D of the intermediate housing flange 60, and is positioned directly below the upper support wall 74D. The outer lower support wall 78C extends parallel to the side 30B of the base plate 24 from the cylindrical passage-forming wall 26 to the intermediate corner edge 64C of the intermediate housing flange 60, and is positioned below the fastener receiving body 66C. The outer lower support wall 78D extends parallel to the side 30D of the base plate 24 from the cylindrical passage-forming wall 26 to the intermediate corner edge 64D of the intermediate housing flange 60, and is positioned below the fastener receiving body 66D.

Figure 16:
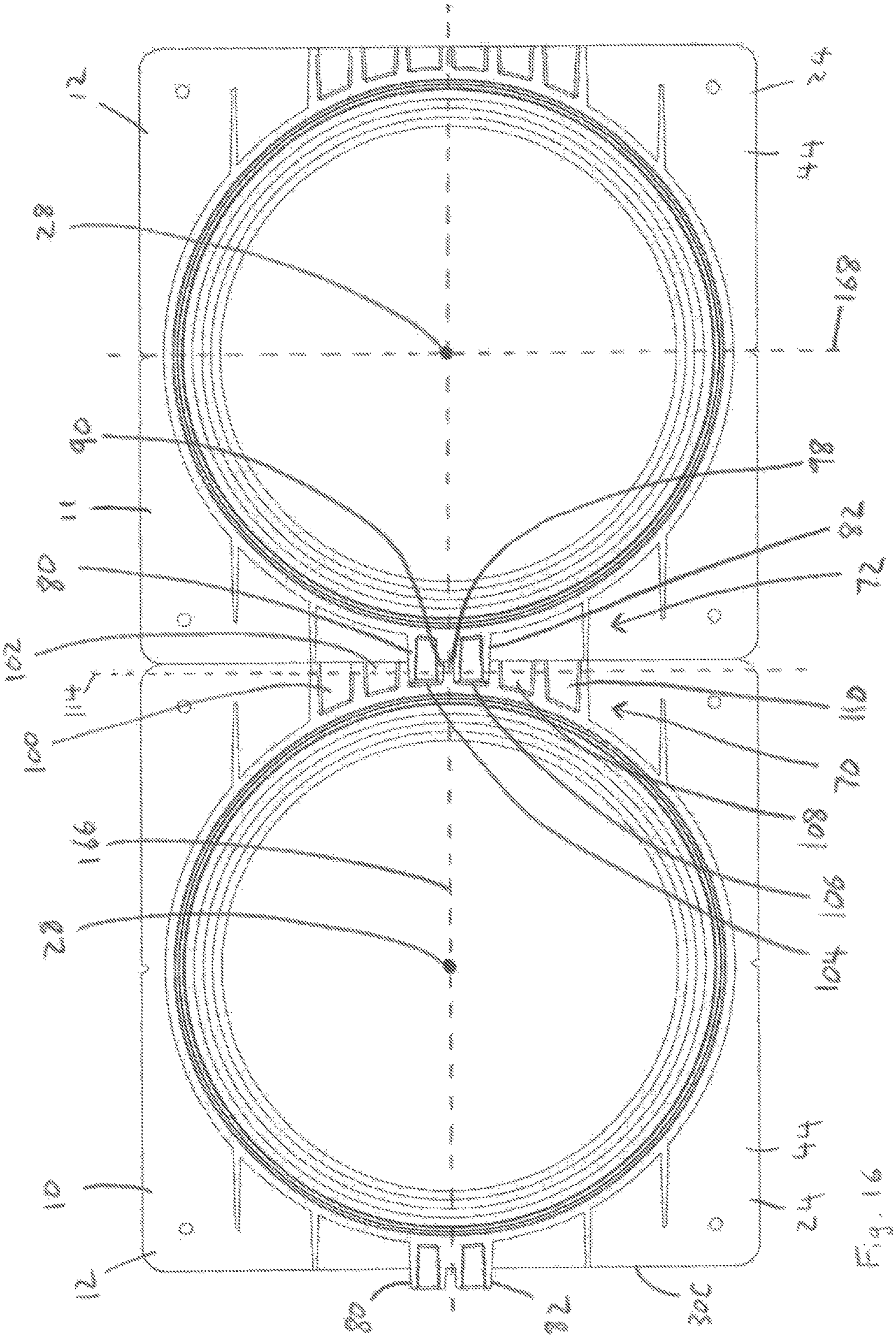
FIG. 16 is a cross-sectional top view of the interlocked firestop devices of FIG. 15, taken along line B-B' shown in FIG. 15, and showing the second firestop device in an aligned position relative to the first firestop device.

As shown in FIG. 6, the male side 72 of the housing 12 has a first protrusion 80 and a second protrusion 82. The first protrusion 80 and the second protrusion 82 each comprise a generally rectangular projection 262 that extends laterally outwardly from the cylindrical passage-forming wall 26. Each of the protrusions 80, 82 has a generally rectangular outer protrusion wall 84 that defines a hollow interior 86 with a distal open end 88. The protrusions 80, 82 are positioned immediately below the intermediate housing flange 60, with a top portion of the protrusion wall 84 of each of the protrusions 80, 82 merging with the intermediate housing flange 60. The two protrusions 80, 82 are spaced from each other with a gap 90 defined therebetween, the gap 90 being positioned above the notch 34C. As best shown in FIG. 16, both of the protrusions 80, 82 extend beyond the side 30C of the base plate 24.

As shown in FIG. 7, the female side 70 of the housing 12 also has two upper support walls 74A, 74B that extend vertically from the upper housing flange 50 to the intermediate housing flange 60. The upper support wall 74A extends parallel to the side 30D of the base plate 24 from the cylindrical passage-forming wall 26 to the straight side edge 52A of the upper housing flange 50, and is positioned immediately adjacent to the tab-receiving cut-out 56A. The upper support wall 74B extends parallel to the side 30B of the base plate 24 from the cylindrical passage-forming wall 26 to the straight side edge 52A of the upper housing flange 50, and is positioned immediately adjacent to the tab-receiving cut-out 56B.

The female side 70 of the housing 12 also has two inner lower support walls 76A, 76B and two outer lower support walls 78A, 78B that extend vertically from the base plate 24 to the intermediate housing flange 60. The inner lower support wall 76A extends parallel to the side 30D of the base plate 24 from the cylindrical passage-forming wall 26 to the intermediate side edge 62A of the intermediate housing flange 60, and is positioned directly below the upper support wall 74A. The inner lower support wall 76B extends parallel to the side 30B of the base plate 24 from the cylindrical passage-forming wall 26 to the intermediate side edge 62A of the intermediate housing flange 60, and is positioned directly below the upper support wall 74B. The outer lower support wall 78A extends parallel to the side 30D of the base plate 24 from the cylindrical passage-forming wall 26 to the intermediate corner edge 64A of the intermediate housing flange 60, and is positioned below the fastener receiving body 66A. The outer lower support wall 78B extends parallel to the side 30B of the base plate 24 from the cylindrical passage-forming wall 26 to the intermediate corner edge 64B of the intermediate housing flange 60, and is positioned below the fastener receiving body 66B.

As shown in FIG. 7, the female side 70 of the housing 12 has a ladder-shaped socket member 92 that extends between the inner lower support wall 76A and the inner lower support wall 76B. The ladder-shaped socket member 92 has a top wall 94 that is parallel to the mounting flange 44 of the base plate 24, a bottom wall 96 that is spaced downwardly from the top wall 94 and parallel to the mounting flange 44, and a series of spaced dividing walls 98 that are perpendicular to the mounting flange 44 and extend between the top wall 94 and the bottom wall 96. In the embodiment shown in FIG. 7, the top wall 94 of the ladder-shaped socket member 92 is formed by the portion of the intermediate housing flange 60 that extends between the inner lower support wall 76A and the inner lower support wall 76B. The two outermost dividing walls 98 of the ladder-shaped socket member 92 are merged with the inner lower support wall 76A and the inner lower support wall 76B, respectively, and form a thickened segment of the inner lower support wall 76A and the inner lower support wall 76B where the inner lower support wall 76A and the inner lower support wall 76B meet the intermediate housing flange 60. The bottom wall 96 extends between the inner lower support wall 76A and the inner lower support wall 76B, spaced above the mounting flange 44.

In the embodiment shown in FIG. 7, the ladder-shaped socket member 92 defines six side-by-side sockets 100, 102, 104, 106, 108, 110. Each of the sockets 100, 102, 104, 106, 108, 110 is defined between the top wall 94, the bottom wall 96, and an adjacent pair of the dividing walls 98. The sockets 100, 102, 104, 106, 108, 110 each have a generally rectangular protrusion receiving cavity 112. The sockets 100, 102, 104, 106, 108, 110 are also referred to herein as connection elements 100, 102, 104, 106, 108, 110.

Figure 8:
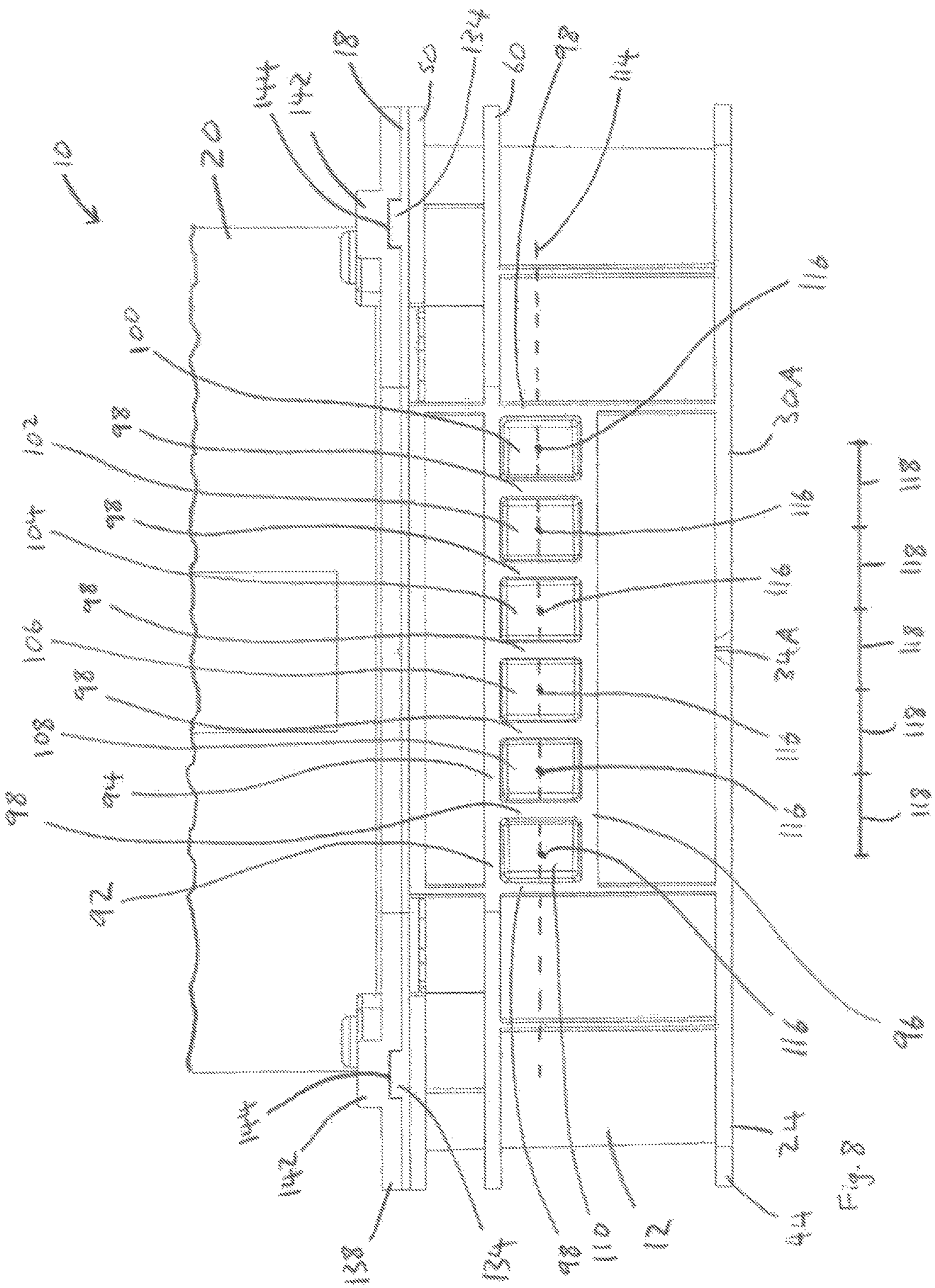
FIG. 8 is an enlarged side view of the female side of the firestop device of FIG. 1.

As shown in FIG. 7, the sockets 100, 102, 104, 106, 108, 110 are arranged along a connection axis 114 that is parallel to the mounting plane of the mounting flange 44, the connection axis 114 being contained by a hypothetical connection plane that is parallel to the mounting plane of the mounting flange 44. As shown in FIG. 8, a center 116 of each of the sockets 100, 102, 104, 106, 108, 110 is spaced a preselected distance 118 along the connection axis 114 from the center 116 of an adjacent one of the sockets 100, 102, 104, 106, 108, 110. The preselected distance 118 is also referred to herein as the offset interval 118. Any suitable offset interval 118 can be selected, including for example ¼ inch, ½ inch, or 1 inch. In the embodiment shown, the offset interval 118 is preferably about ½ inch.

Figure 9:
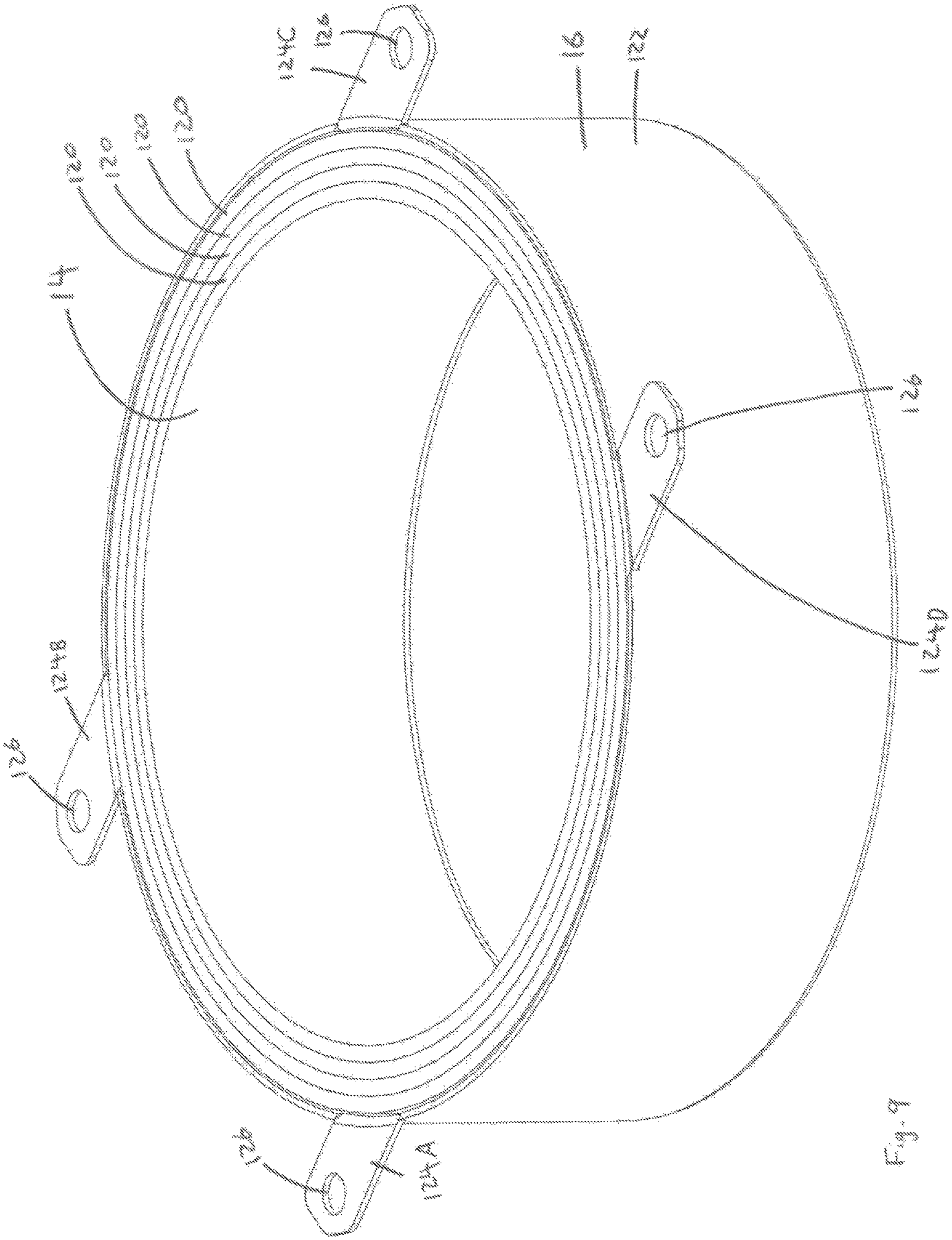
FIG. 9 is a perspective view of an intumescent material and a metal sheath of the firestop device of FIG. 1.

The intumescent material 14 and the metal sheath 16 are best shown in FIG. 9. The intumescent material 14 comprises four concentrically arranged cylindrical layers 120 of a suitable intumescent substance that expands when exposed to heat from a fire. The metal sheath 16 has a cylindrical sheath wall 122 that concentrically surrounds the intumescent material 14. Four metal tabs 124A, 124B, 124C, 124D extend laterally outwardly from a top end of the sheath wall

122. Each of the metal tabs 124A, 124B, 124C, 124D has an anchor hole 126 that extends therethrough.

Figure 10:
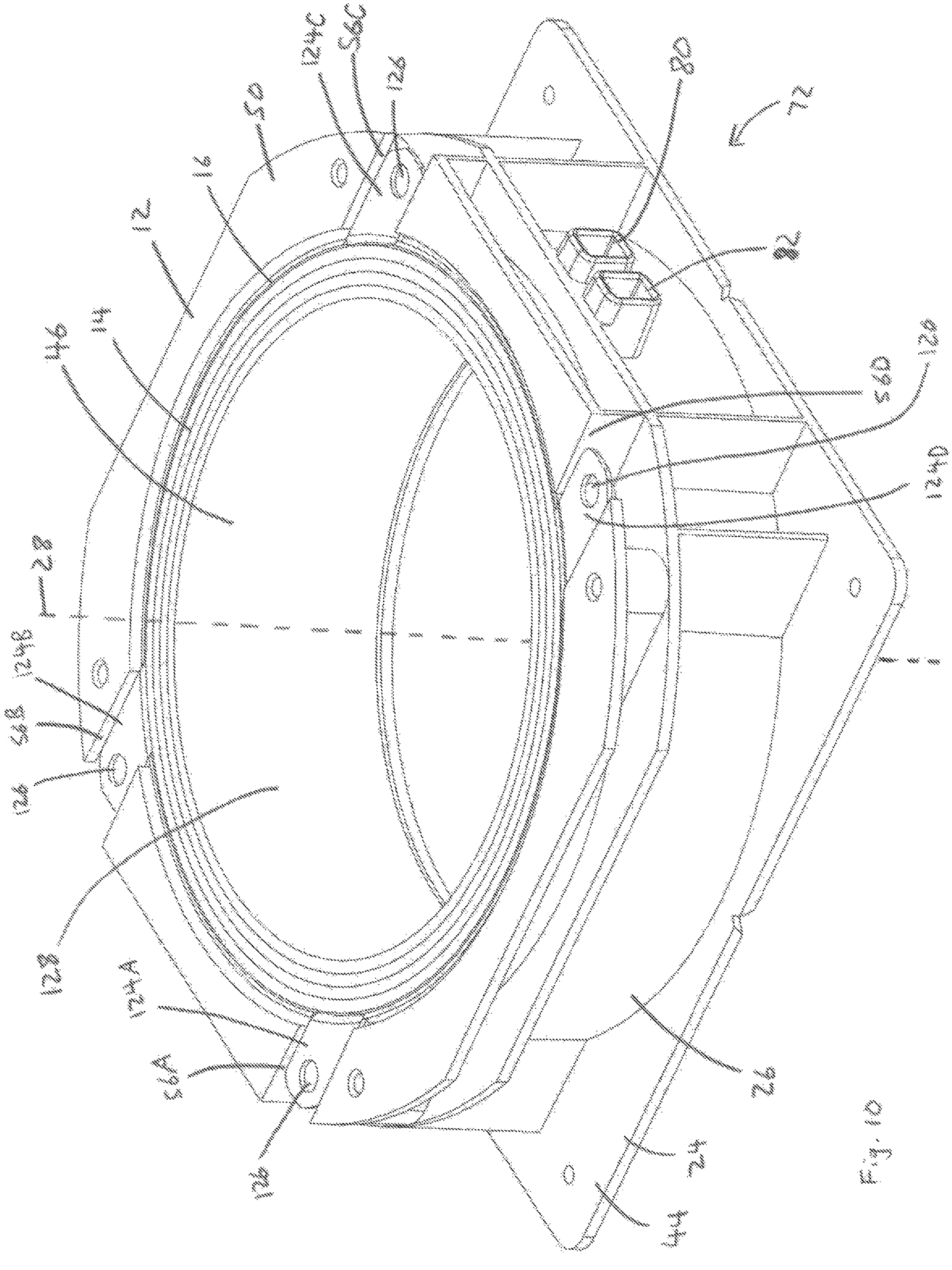
FIG. 10 is a perspective view of the housing of the firestop device of FIG. 1, showing the intumescent material and the metal sheath positioned within an internal passageway of the housing.

As shown in FIG. 10, when the firestop device 10 is assembled, the metal sheath 16 and the intumescent material 14 are positioned within the internal passageway 46 of the housing 12, supported by the inner supporting flange 42 of the base plate 24. The intumescent material 14 defines a narrowed passageway 128 within the internal passageway 46, the narrowed passageway 128 being concentric about the center axis 28. As shown in FIG. 10, each of the metal tabs 124A, 124B, 124C, 124D extends laterally out from the internal passageway 46 of the housing 12 into a respective one of the tab-receiving cut-outs 56A, 56B, 56C, 56D of the upper housing flange 50, the metal tabs 124A, 124B, 124C, 124D extending parallel to the mounting plane of the mounting flange 44.

Figure 11:
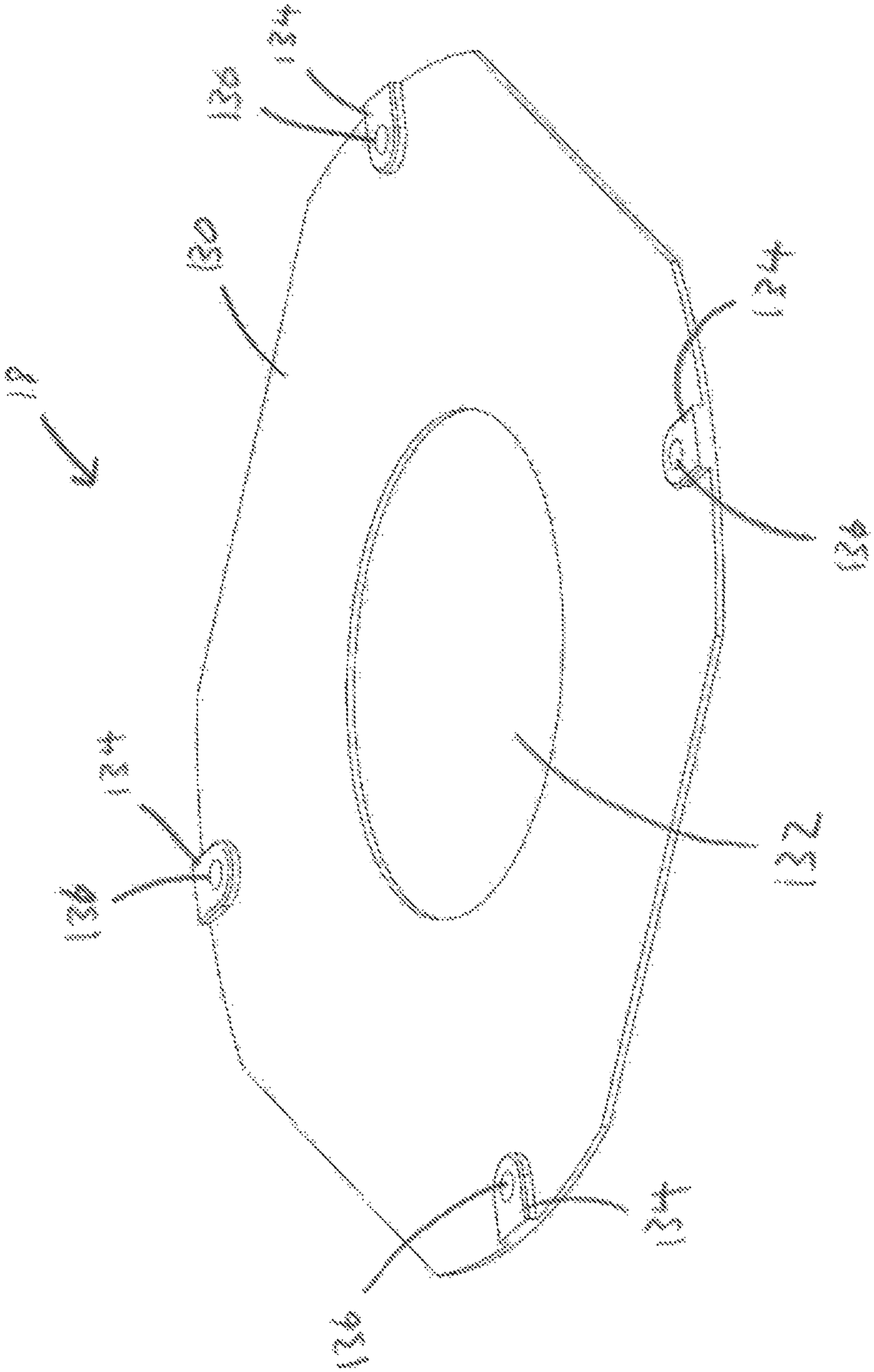
FIG. 11 is a perspective view of a gasket of the firestop device of FIG. 1.

The gasket 18 is best shown in FIG. 11 as having a thin, planar gasket body 130 with a circular, central gasket opening 132. The gasket body 130 has a generally square shape with rounded corners. Each rounded corner of the gasket body 130 has a raised gasket fastening nodule 134 with a gasket fastening hole 136 extending therethrough.

Figure 13:
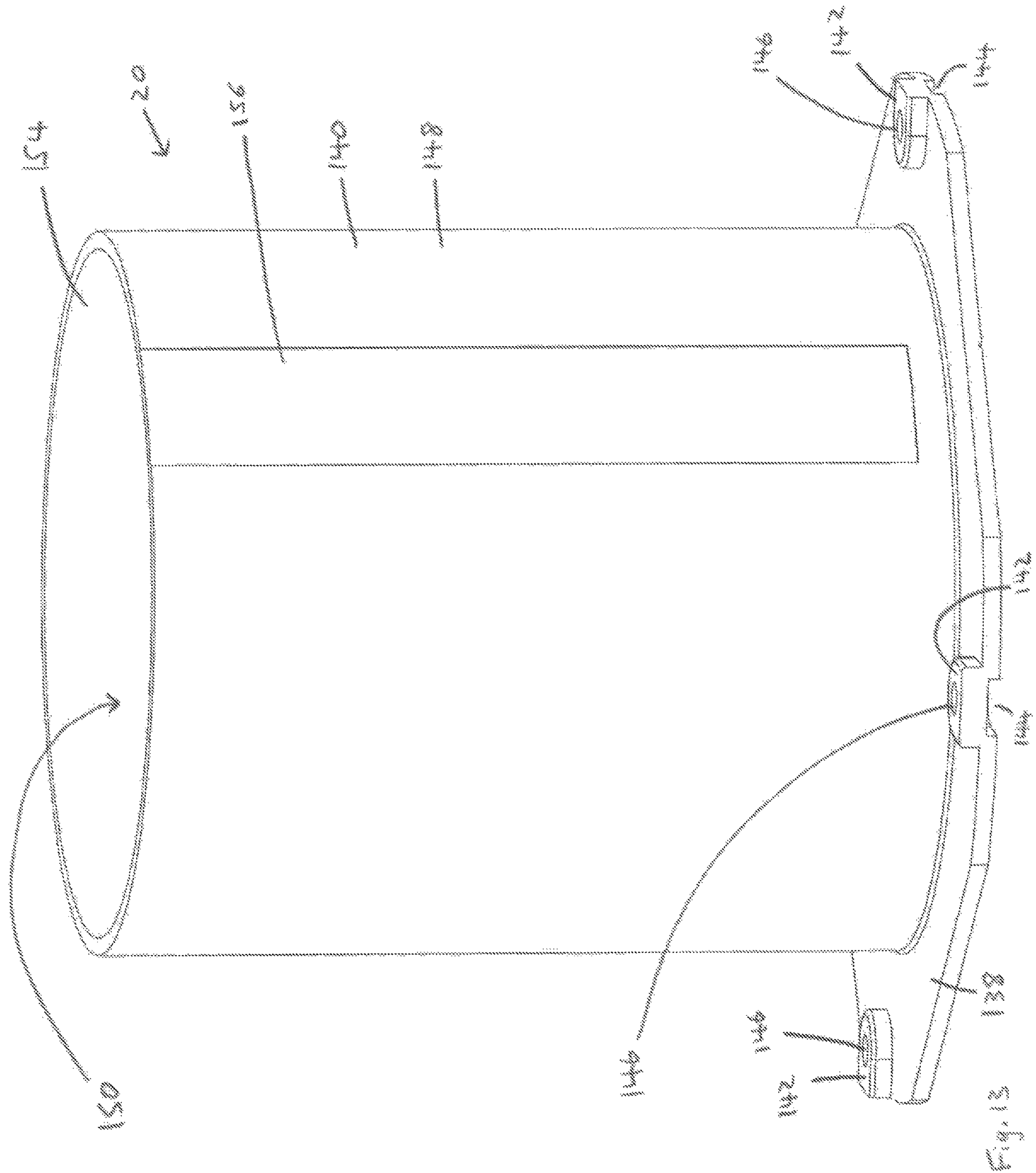
FIG. 13 is a perspective view of the sleeve of the firestop device of FIG. 1.
Figure 14:
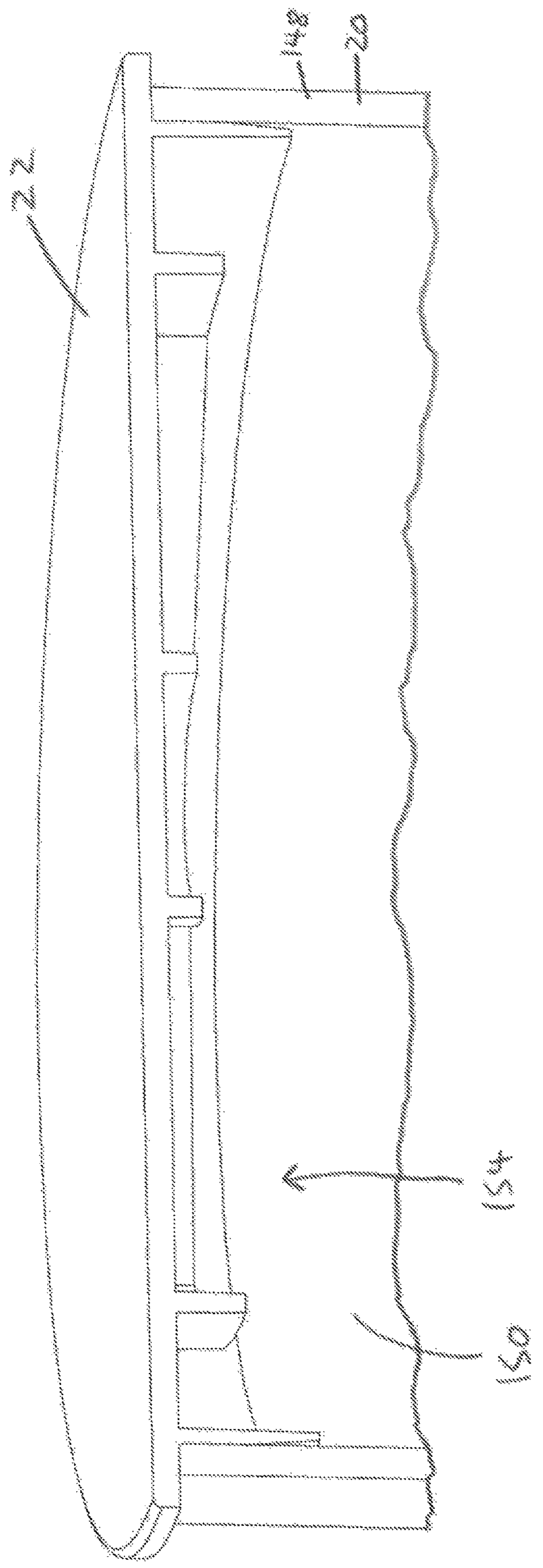
FIG. 14 is an enlarged cross-sectional view of a cap coupled to the top end of the sleeve of the firestop device of FIG. 1.

The sleeve 20 is shown in FIG. 13 as having a generally planar attachment flange 138 and a cylindrical sleeve portion 140 that extends upwardly from the center of the attachment flange 138. The attachment flange 138 has a generally square shape with rounded corners. Each rounded corner of the attachment flange 138 has a raised sleeve fastening nodule 142 and a gasket nodule receiving recess 144 positioned directly below the raised sleeve fastening nodule 142. A sleeve fastening hole 146 extends through each of the sleeve fastening nodules 142.

The sleeve portion 140 has a cylindrical wall 148 that defines an inner chamber 150 with an open bottom end 152 and an open top end 154. The open bottom end 152 of the inner chamber 150 is best shown in FIG. 5. As shown in FIG. 13, the outer surface of the cylindrical wall 148 preferably has a marking area 156 that carries markings, not shown, that assist an installer in cutting the sleeve portion 140 to a desired length when installing the firestop device 10, as is described below. As shown in FIG. 5, a removable cap 22 can be installed in the open top end 154 of the sleeve 20 to occlude the open top end 154.

The arrangement of the housing 12, the intumescent material 14, the metal sheath 16, the gasket 18, the sleeve 20, and the removable cap 22 of the firestop device 10 when the firestop device 10 is fully assembled is best shown in FIG. 5. As previously described, the intumescent material 14 and the metal sheath 16 are contained within the internal passageway 46 of the housing 12, supported by the inner supporting flange 42 of the base plate 24. The gasket 18 is positioned above the housing 12, interposed between the upper housing flange 50 and the attachment flange 138 of the sleeve 20. As can be seen in FIG. 1, the gasket fastening nodules 134 of the gasket 18 are received by the gasket nodule receiving recesses 144 of the sleeve 20. Fasteners 158, preferably in the form of self-tapping screws, are passed through the sleeve fastening holes 146 of the sleeve 20, the gasket fastening holes 136 of the gasket 18, the fastening holes 58A, 58B, 58C, 58D of the upper housing flange 50, and into the fastener receiving channels 68 of the housing 12, as best shown in FIG. 12. As shown in FIG. 5, when the firestop device 10 is assembled, the gasket opening 132 of the gasket 18 and the cylindrical wall 148 of the sleeve 20 are arranged coaxially about the center axis 28, with the open bottom end 152 of the inner chamber 150 of the sleeve 20 open to the internal passageway 46 of the housing 12 via the gasket opening 132.

Figure 2:
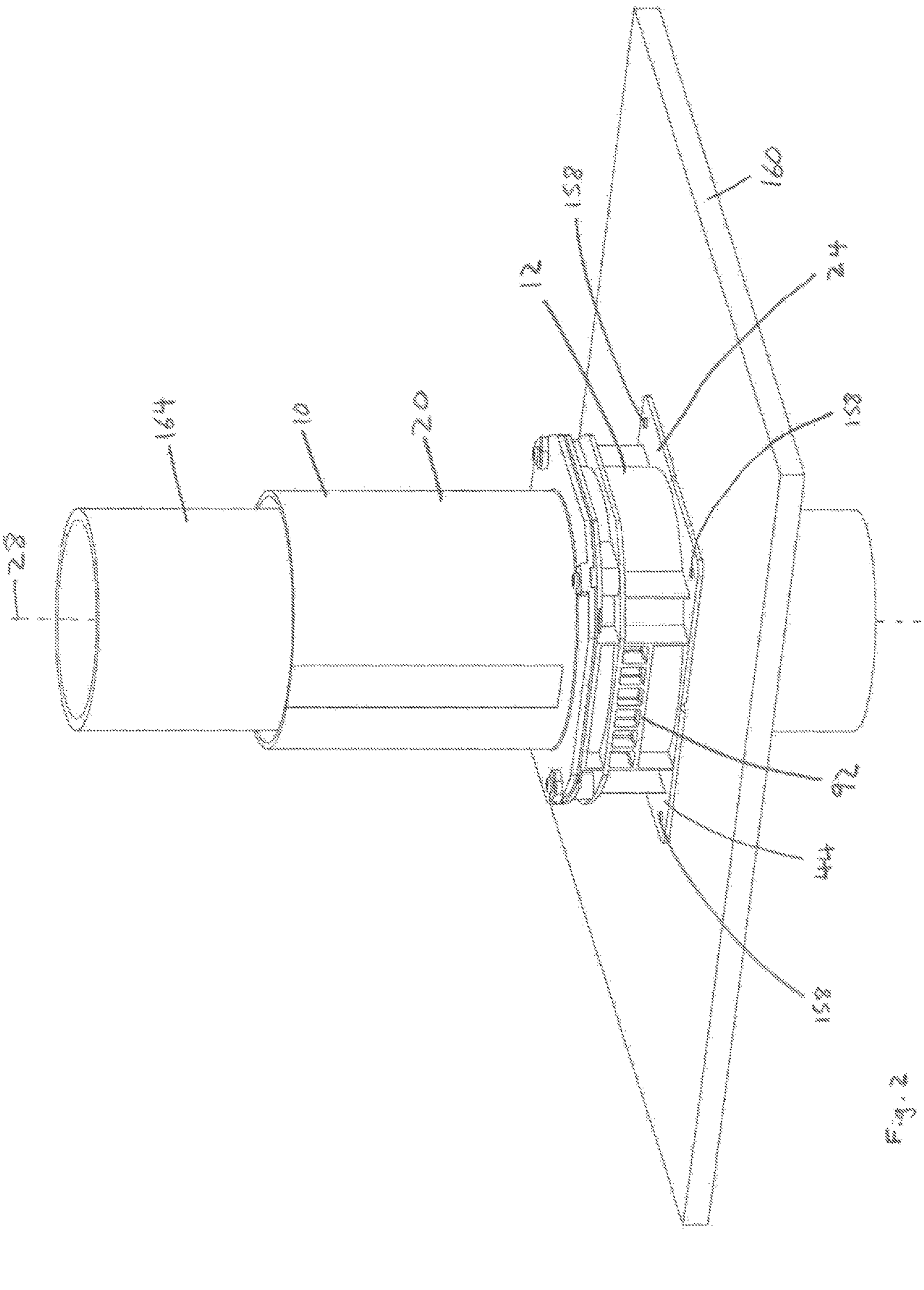
FIG. 2 is a perspective view of the firestop device of FIG. 1, showing the firestop device attached to a formwork of a to-be-cast constructional component, with a pipe shown extending through the firestop device.

The firestop device 10 is preferably embedded in a to-be-cast constructional component to provide a passageway for a conduit to pass through the to-be-cast constructional component. To embed the firestop device 10, the firestop device 10 is first mounted to a formwork 160 of the to-be-cast constructional component, as shown in FIG. 2. The formwork 160 forms a mold for the to-be-cast constructional component. To mount the firestop device 10 to the formwork 160, fasteners 158 are passed through the mounting holes 36A, 36B, 36C, 36D in the mounting flange 44 and into the formwork 160. The formwork 160 is preferably made of wood and the fasteners 158 are preferably nails.

Figure 3:
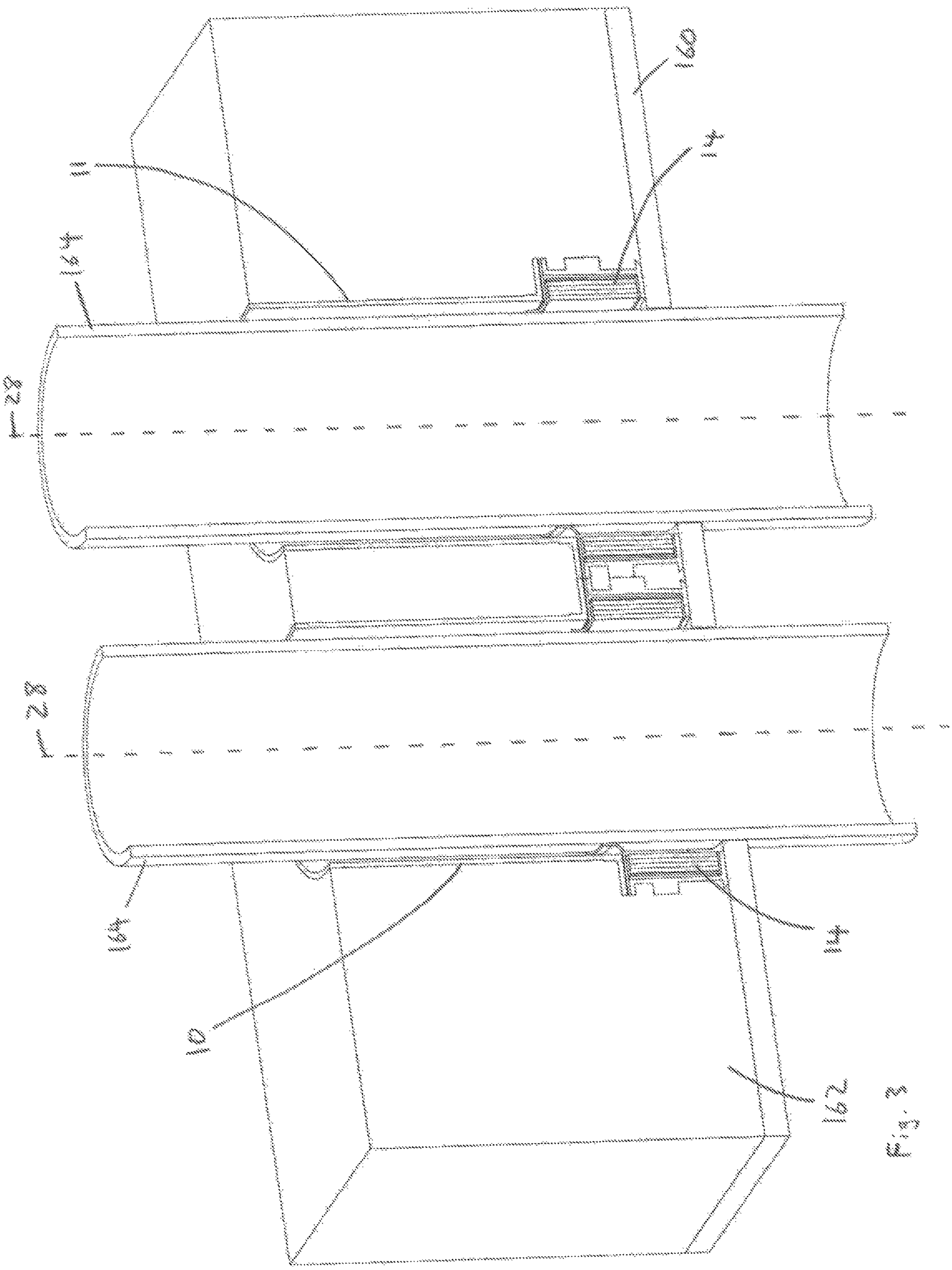
FIG. 3 is a perspective cross-sectional view of the firestop device of FIG. 1 shown interlocked with a second firestop device, with both firestop devices embedded in a concrete constructional component and with a pipe extending through each of the firestop devices.
Figure 4:
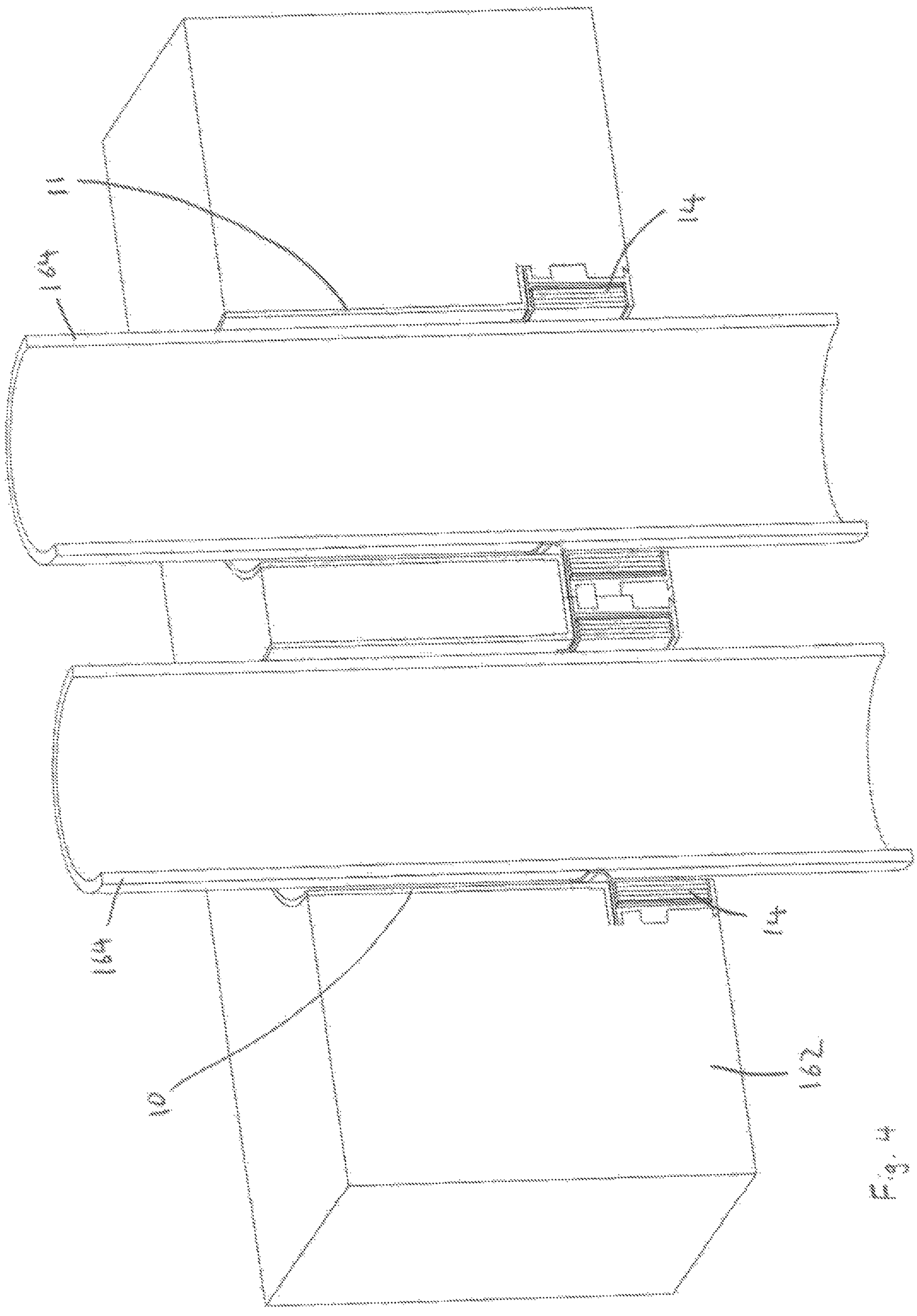
FIG. 4 is a perspective cross-sectional view of the firestop devices of FIG. 3, showing the firestop devices embedded in the concrete constructional component with the formwork removed.

After the firestop device 10 is mounted in place, concrete is poured into the mold provided by the formwork 160 to form the concrete component 162. The concrete component 162 is optionally a concrete floor as shown in FIG. 3, although it could be any other concrete structure such as a concrete wall. Prior to pouring the concrete, the cap 22 is attached to the open top end 154 of the sleeve 20 to prevent the concrete from getting into the inner chamber 150.

The poured concrete surrounds the firestop device 10, filling every available space around the perimeter of the device 10, including the anchoring holes 126 in the metal tabs 124A, 124B, 124C, 124D of the metal sheath 16. After the mold is completely filled, the concrete is cured, with the holes 126 in the tabs 124A, 124B, 124C, 124D helping to anchor the metal sheath 16 in the cured concrete.

Once the concrete has hardened, the formwork 160 is removed, leaving behind the concrete component 162 with the firestop device 10 embedded therein. The cap 22 can then be removed from the open top end 154 of the sleeve 20, and a conduit can be passed through the firestop device 10 from one side of the concrete component 162, through the open top end 154 of the sleeve 20, the inner chamber 150 of the sleeve 20, the gasket opening 132 of the gasket 18, the internal passageway of the housing 12, and the circular opening 38 of the base plate 24, to the other side of the concrete component 162. The conduit may, for example, be a drain, waste and vent (DWV) pipe 164 as shown in FIG. 3.

The gasket opening 132 is preferably sized to provide a water tight seal between the gasket 18 and the pipe 164, to prevent water from passing through the firestop device 10 from one side of the concrete component 162 to the other side of the concrete component 162 in the event of a flood or a leak.

In the event of a fire, the intumescent material 14 is configured to expand when exposed to heat from the fire. The metal sheath 16 surrounding the intumescent material 14 preferably helps to direct the expansion of the intumescent material 14 radially inwardly, so that the intumescent material 14 crushes the pipe 164 and occludes the internal passageway 46. This preferably helps to prevent the fire from spreading through the firestop device 10 from one side of the concrete component 162 to the other side of the concrete component 162.

In some circumstances, it may be desired or required to pass more than one pipe 164, or other type of conduit, through a to-be-cast constructional component. This can be achieved by embedding two firestop devices 10, 11 of the cast-in-place constructional system into the concrete component 162, as shown in FIG. 3. The two firestop devices 10, 11 are preferably identical and have the structure as described above, although this is not necessary.

Figure 15:
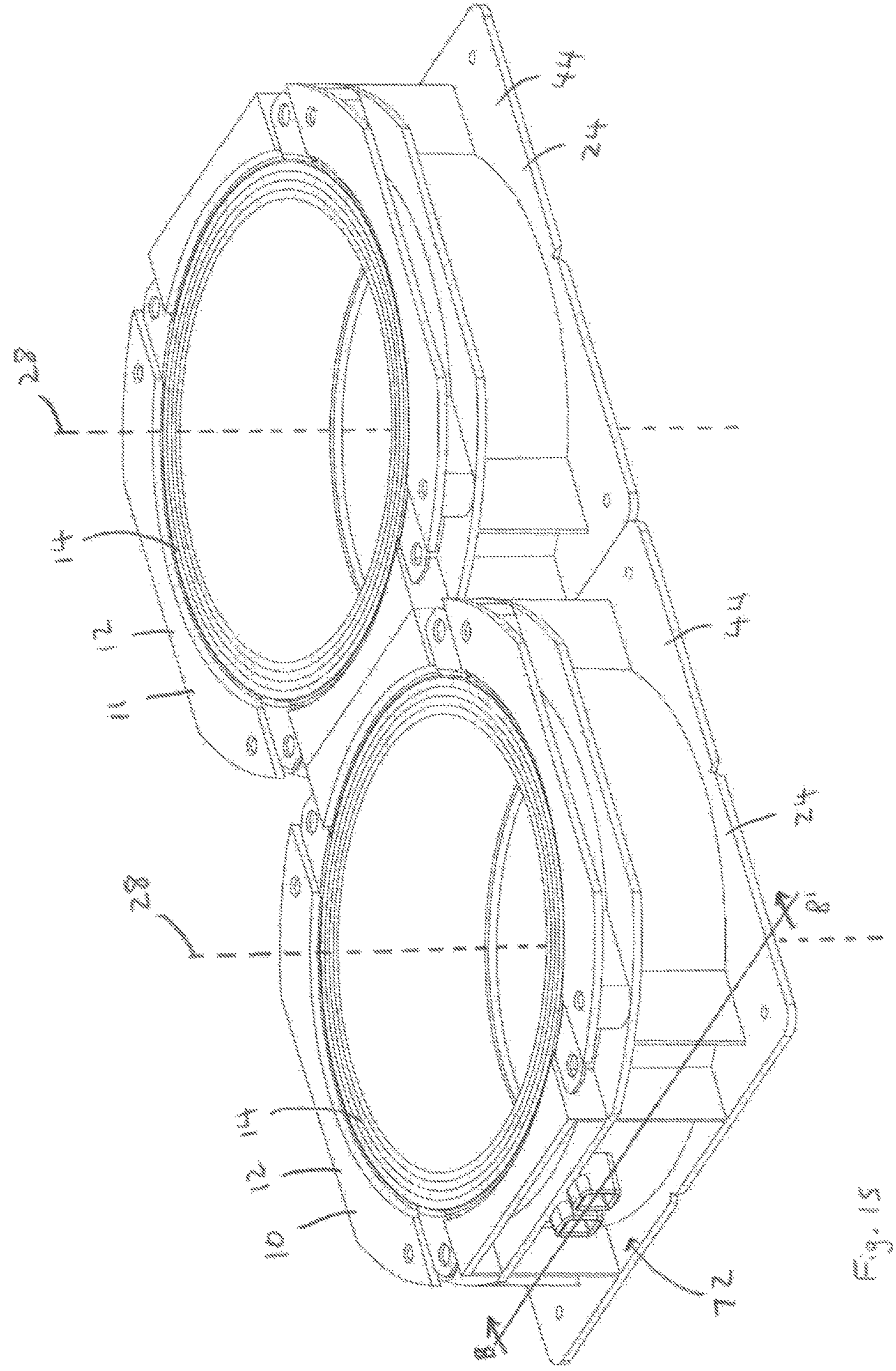
FIG. 15 is a perspective view of the housings of the interlocked firestop devices shown in FIG. 3.

To assist in positioning the two firestop devices 10, 11, the housings 12 of the firestop devices 10, 11 are preferably interlocked in a side-by-side arrangement as shown in FIG. 15. To interlock the housings 12 of the two firestop devices 10, 11, the female side 70 of a first one of the firestop devices 10 is positioned in opposition to the male side 72 of a second one of the firestop devices 11, with the protrusions 80, 82 on the male side 72 of the second firestop device 11 matedly received by a selected adjacent pair of the sockets 100, 102, 104, 106, 108, 110 on the female side 70 of the first firestop device 10, and with the dividing wall 98 between the selected adjacent pair of the sockets 100, 102, 104, 106, 108, 110 matedly received by the gap 90 between the two protrusions 80, 82, as shown in FIG. 16. When the housing 12 of the first firestop device 10 is interlocked with the housing 12 of the second firestop device 11, the center axis 28 of the first firestop device 10 is parallel to the center axis 28 of the second firestop device 11.

A position of the first firestop device 10 relative to the second firestop device 11 can be selected by selecting which of the sockets 100, 102, 104, 106, 108, 110 on the female side 70 of the first firestop device 10 matedly receives the protrusions 80, 82 on the male side 72 of the second firestop device 11. To arrange the firestop devices 10, 11 in the aligned configuration shown in FIG. 16, the protrusions 80, 82 on the male side 72 of the second firestop device 11 are matedly received by the third and fourth sockets 104, 106 on the female side 70 of the first firestop device 10. When in the aligned configuration, an alignment axis 166 of the first firestop device 10 intersects with the center axis 28 of the second firestop device 11, as shown in FIG. 16. The alignment axis 166 of the first firestop device 10 is a hypothetical line that intersects with the center axis 28 of the first firestop device 10 and is perpendicular to both the center axis 28 and the connection axis 114 of the first firestop device 10.

Figure 17:
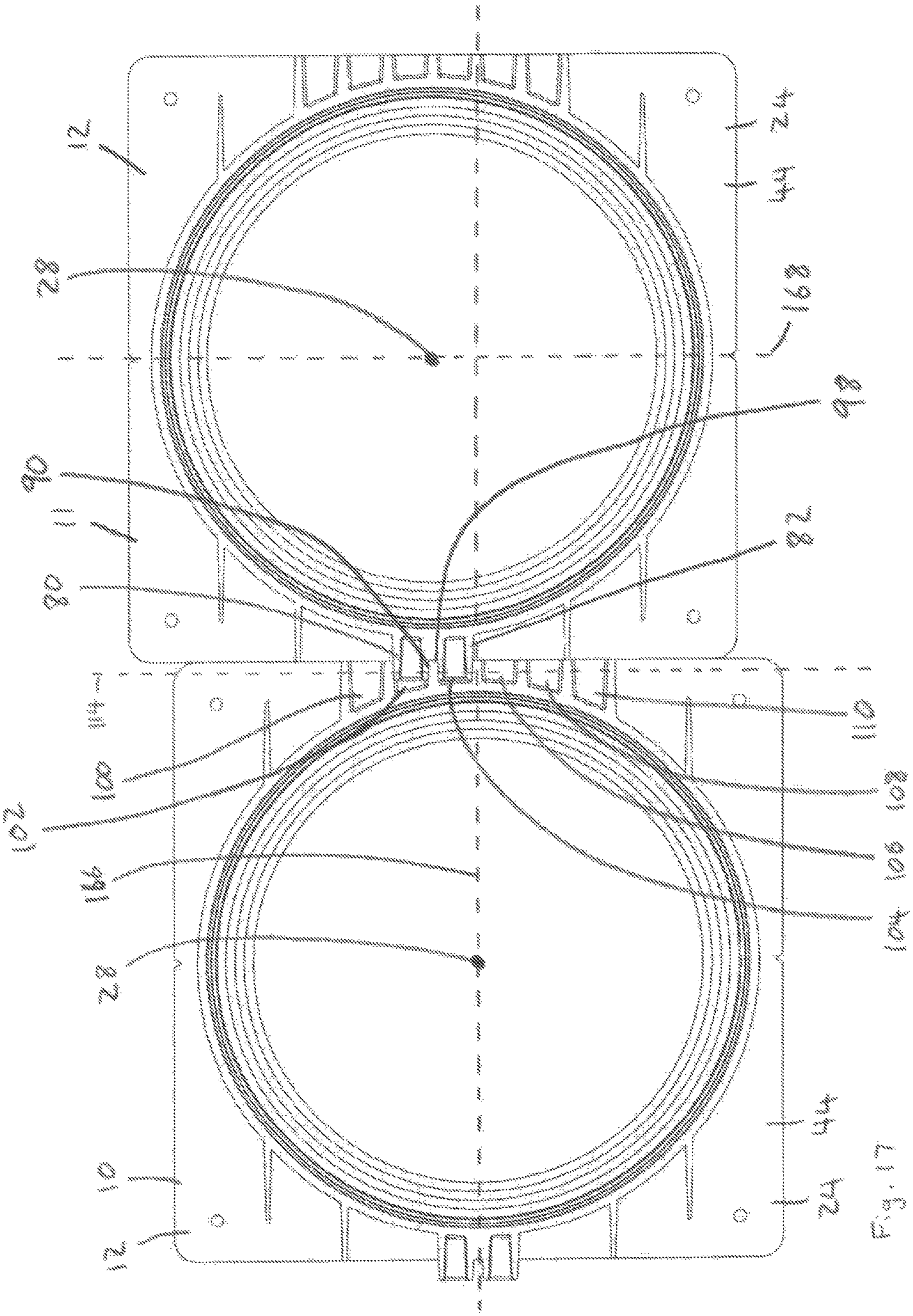
FIG. 17 is a cross-sectional top view the same as in FIG. 16, but with the second firestop device offset in a first direction relative to the first firestop device.

The second firestop device 11 can also be offset relative to the first firestop device 10. For example, in the configuration Shown in FIG. 17, the second firestop device 11 is offset in a first direction relative to the first firestop device 10 by mating the protrusions 80, 82 on the male side 72 of the second firestop device 11 with the second and third sockets 102, 104 on the female side 70 of the first firestop device 10. When in the offset configuration shown in FIG. 17, the center axis 28 of the second firestop device 11 is spaced from the alignment axis 166 of the first firestop device 10 in the first direction along an offset axis 168. The offset axis 168 is a hypothetical line that is parallel to the connection axis 114 of the first firestop device 10 and perpendicular to the center axis 28 of the second firestop device 11, as shown in FIG. 17. The distance that the center axis 28 of the second firestop device 11 moves along the offset axis 168 when moved from the aligned configuration shown in FIG. 16 to the offset configuration shown in FIG. 17 is equal to the offset interval 118 shown in FIG. 8.

Figure 19:
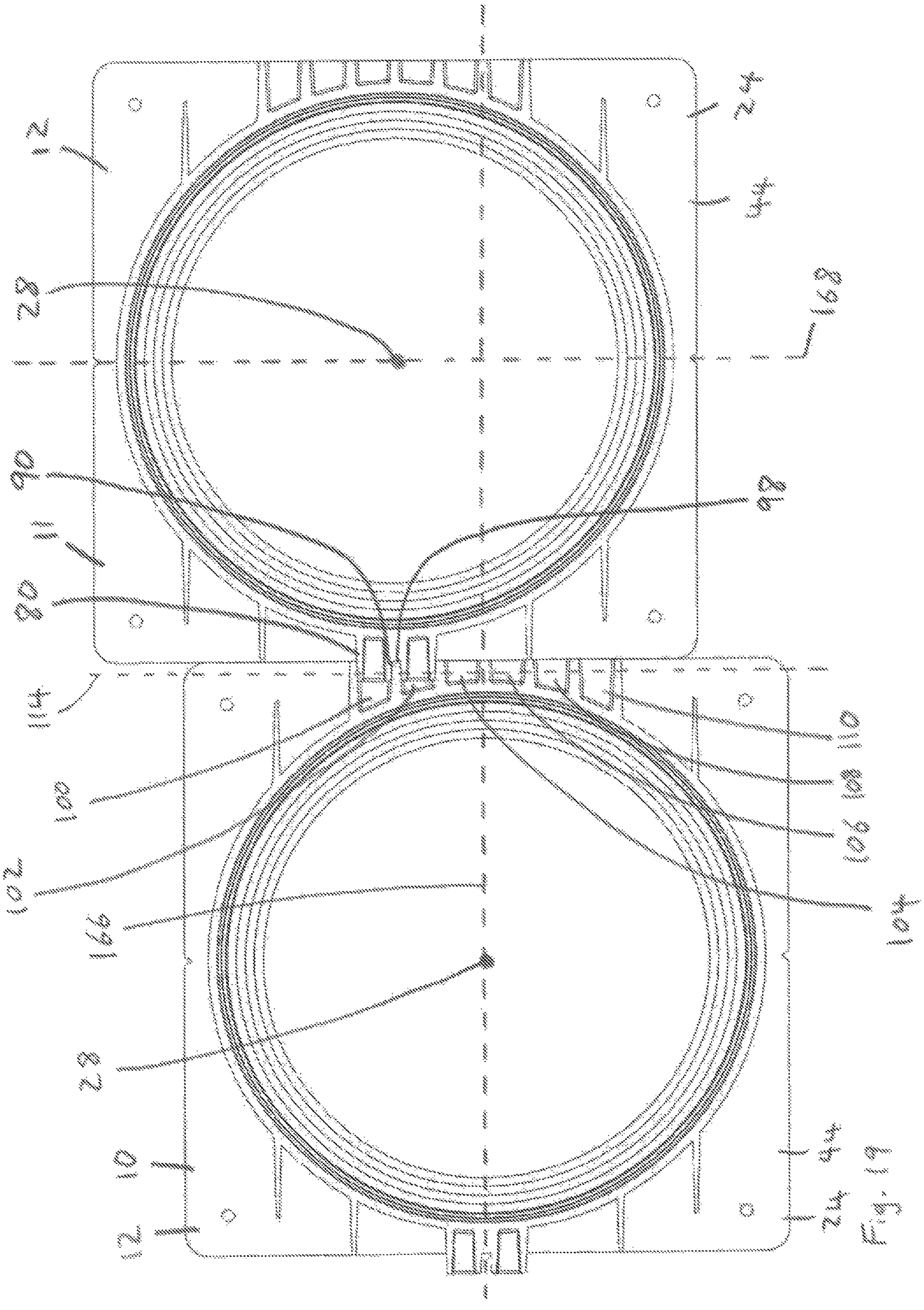
FIG. 19 is a cross-sectional view the same as in FIG. 17, but with the second firestop device offset further in the first direction relative to the first firestop device.

The second firestop device 11 can be further offset in the first direction relative to the first firestop device 10 by mating the protrusions 80, 82 on the male side 72 of the second firestop device 11 with the first and second sockets 100, 102 on the female side 70 of the first firestop device 10, as shown in FIG. 19. This moves the center axis 28 of the second firestop device 11 a further offset interval 118, or about ½ inch, in the first direction.

Figure 18:
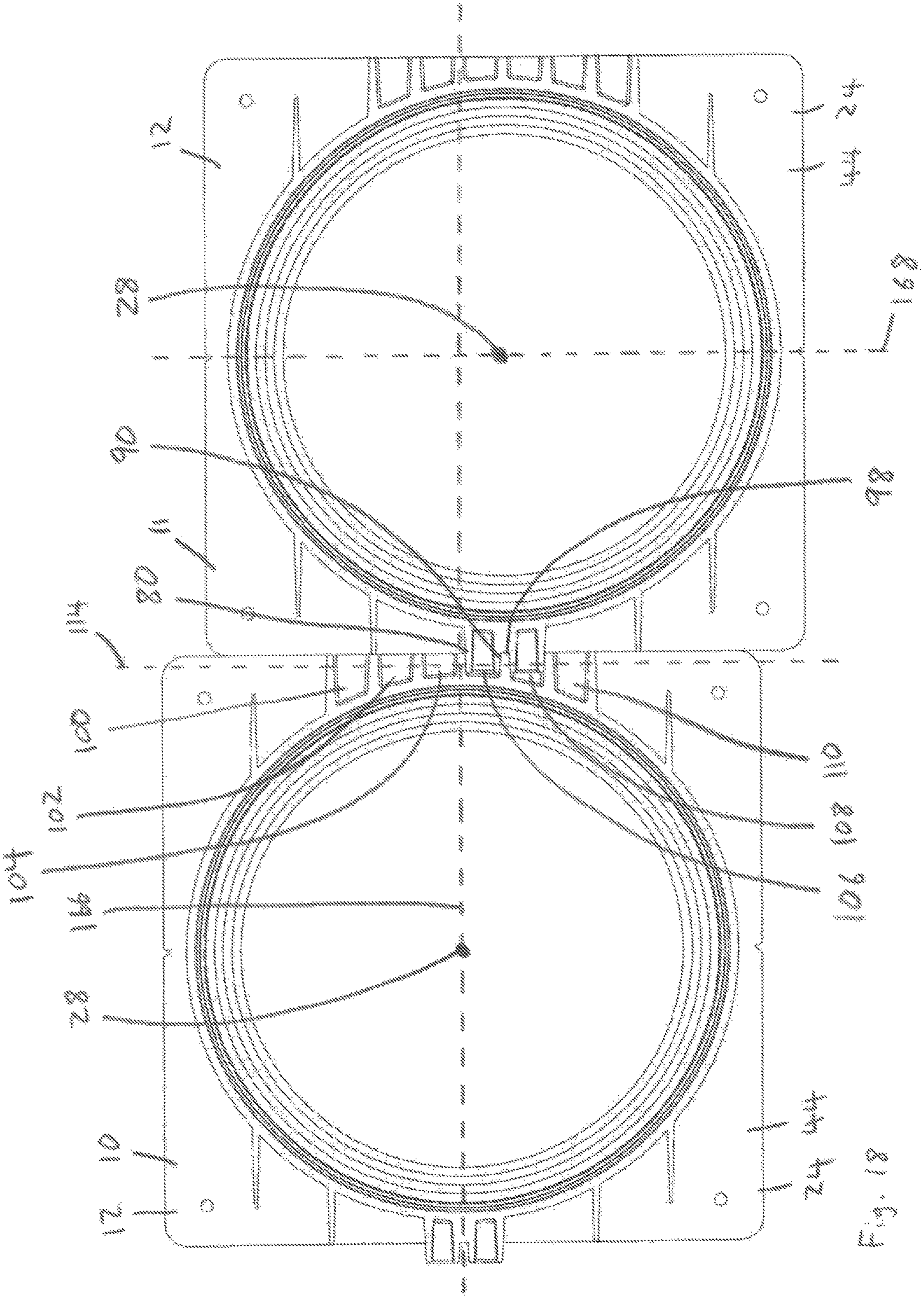
FIG. 18 is a cross-sectional view the same as in FIG. 16, but with the second firestop device offset in a second direction relative to the first firestop device.
Figure 20:
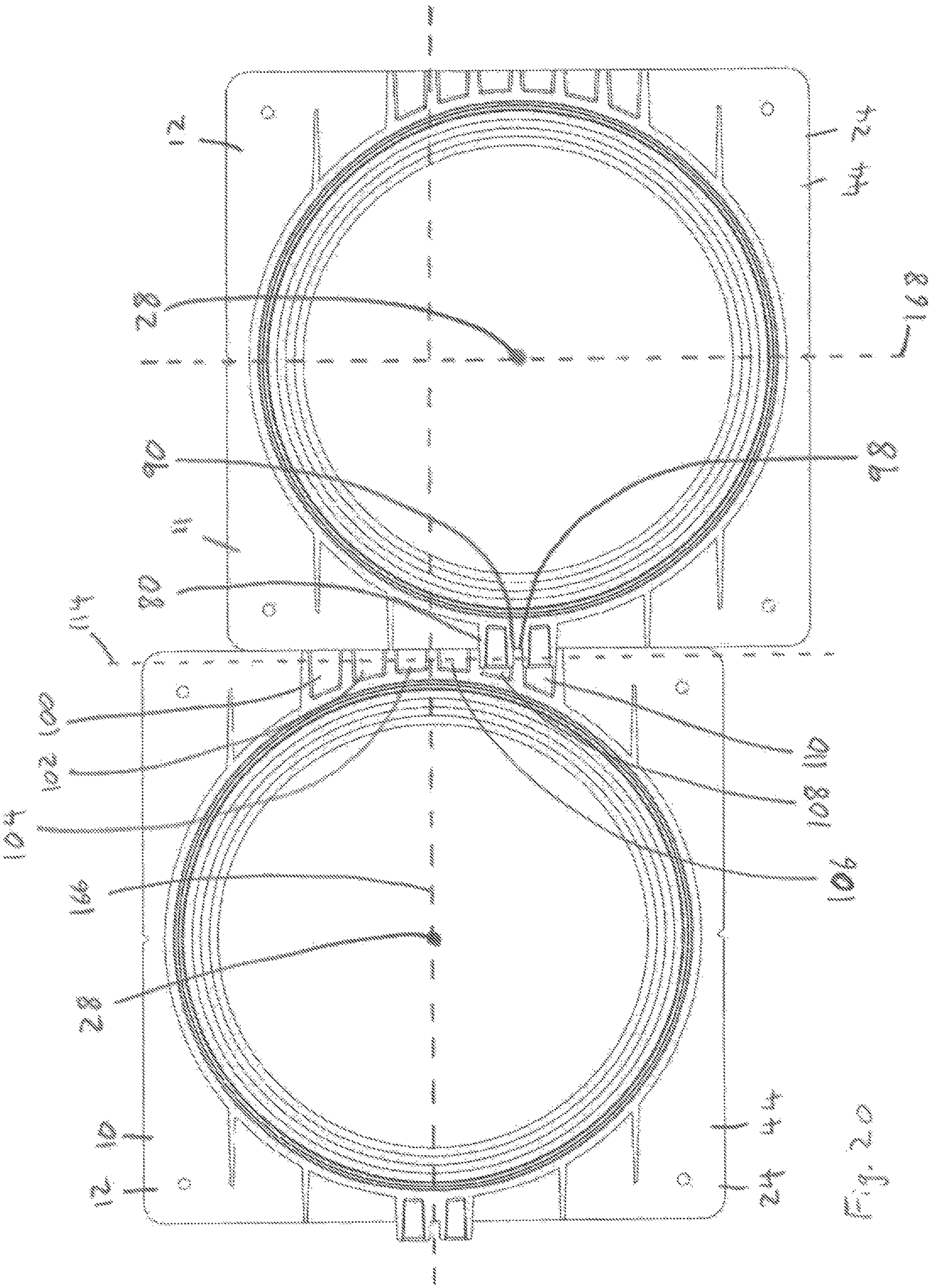
FIG. 20 is a cross-sectional view the same as in FIG. 18, but with the second firestop device offset further in the second direction relative to the first firestop device.

The second firestop device 11 can also be offset relative to the first firestop device 10 in an opposite second direction along the offset axis 168, as shown in FIG. 18. In the configuration shown in FIG. 18, the protrusions 80, 82 on the male side 72 of the second firestop device 11 are mated with the fourth and fifth sockets 106, 108 on the female side 70 of the first firestop device 10. This offsets the center axis 28 of the second firestop device 11 from the alignment axis 166 of the first firestop device 10 by the offset interval 118 in the second direction. To offset the second firestop device 11 a further offset interval 118 in the second direction, the protrusions 80, 82 on the male side 72 of the second firestop device 11 can be mated with the fifth and sixth sockets 108, 110 on the female side 70 of the first firestop device 10, as shown in FIG. 20.

The arrangement of the sockets 100, 102, 104, 106, 108, 110 on the female side 70 of the first firestop device 10 thus provides multiple different configurations that can be selected for arranging the second firestop device 11 relative to the first firestop device 10. This preferably allows an installer to select the configuration of the first firestop device 10 and the second firestop device 11 that is best suited to accommodate the desired arrangement of pipes 164 or other conduits that are to pass through the to-be-cast constructional component.

Although not shown, the cast-in-place constructional system could also include additional firestop devices, each having an identical construction to the first and second firestop devices 10, 11. By arranging the firestop devices 10, 11 in a daisy-chain like manner, the constructional system could be used to provide an indefinite number of passageways for pipes 164 or other conduits to pass through the to-be-cast constructional component.

The two or more firestop devices 10, 11 are embedded in the to-be-cast constructional component in much the same way as a single firestop device 10 is embedded, as described above. The firestop devices 10, 11 are first mounted to the formwork 160 in the desired interlocked configuration. Optionally, the firestop devices 10, 11 can be interlocked before being fastened to the formwork 160. Alternatively, one of the firestop devices 10, 11 can be fastened to the formwork 160 first, and then the other firestop device 10, 11 can be placed in the desired interlocked configuration before being fastened in place. Concrete is then poured into the mold provided by the formwork 160, with the caps 22 of the firestop devices 10, 11 preferably coupled to the open top ends 154 of their respective sleeves 20 to prevent the concrete from getting into their respective inner chambers 150 and internal passageways 46. The concrete is then cured to produce a concrete component 162, as shown for example in FIG. 3, with the two firestop devices 10, 11 embedded therein. The caps 22 and the formwork 160 can then be removed, and conduits such as pipes 164 can be passed through the firestop devices 10, 11.

Preferably, the height of the firestop devices 10, 11 is selected to substantially correspond to the thickness of the concrete component 162 in which the firestop devices 10, 11 will be embedded. For example, if the firestop device 10 is to be embedded in a concrete component 162 whose thickness is smaller than the unmodified height of the firestop device 10, the sleeve 20 of the firestop device 10 can be cut to the desired height. The marking area 156 of the sleeve 20 preferably has markings, not shown, which indicate the height of the firestop device 10 up to the location of the marking. To reduce the height of the firestop device 10, an installer can select the marking corresponding to the desired height and then cut the sleeve 20 at the location of the selected marking. The cut end of the sleeve 20 then effectively becomes a new open top end 154 of the sleeve 20, which can removably receive the cap 22 for preventing concrete from getting into the inner chamber 150.

Figure 21:
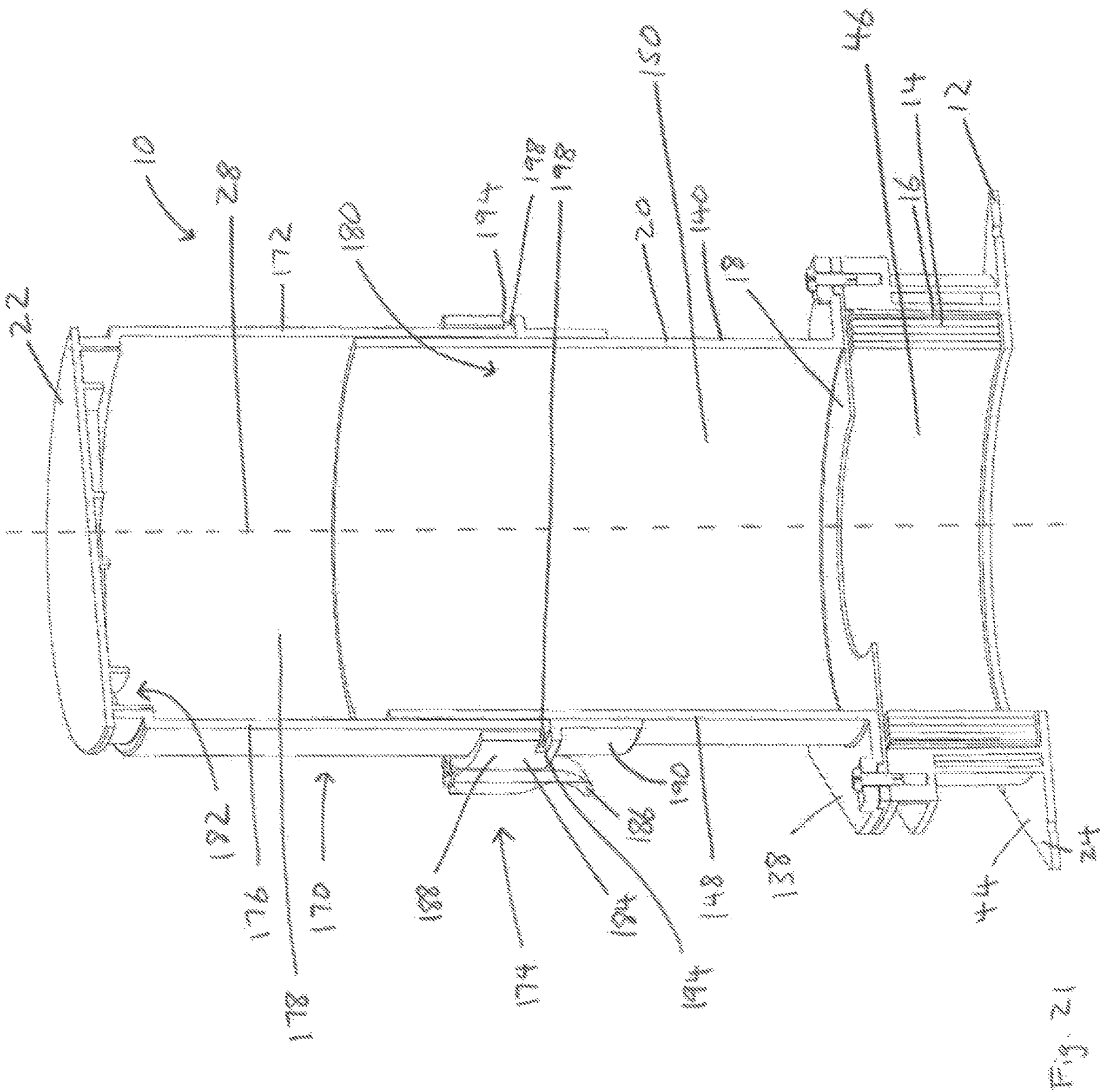
FIG. 21 is a perspective cross-sectional view of the firestop device of FIG. 1, with an extension assembly shown attached to the top end of the sleeve.

If the thickness of the concrete component 162 is greater than the unmodified height of the firestop device 10, the height of the firestop device 10 can be increased by attaching an extension assembly 170 to the top of the sleeve 20, as shown in FIG. 21. The extension assembly 170 comprises a telescopic extension sleeve 172 and a locking mechanism 174. The telescopic extension sleeve 172 has a cylindrical outer wall 176 that defines an inner extension chamber 178 with an open lower end 180 and an open upper end 182.

As shown in FIG. 21, the telescopic extension sleeve 172 is removably coupled to the sleeve 20 by inserting the open top end 154 of the sleeve 20 into the open lower end 180 of the extension sleeve 172. When the telescopic extension sleeve 172 is coupled to the sleeve 20, the cylindrical outer wall 176 of the extension sleeve 20 extends coaxially about the center axis 28 of the housing 12. As shown in FIG. 21, the open upper end 182 of the extension sleeve 172 has a reduced diameter in comparison to the open lower end 180. This allows the open upper end 182 of the extension sleeve 172 to removably receive the cap 22.

When the telescopic extension sleeve 172 is coupled to the sleeve 20, the height of the firestop device 10 is selected by sliding the extension sleeve 172 axially up or down relative to the sleeve 20 until the open upper end 182 of the extension sleeve 172 is at the desired height. The extension sleeve 172 can then be locked in place by the locking mechanism 174.

Figure 29:
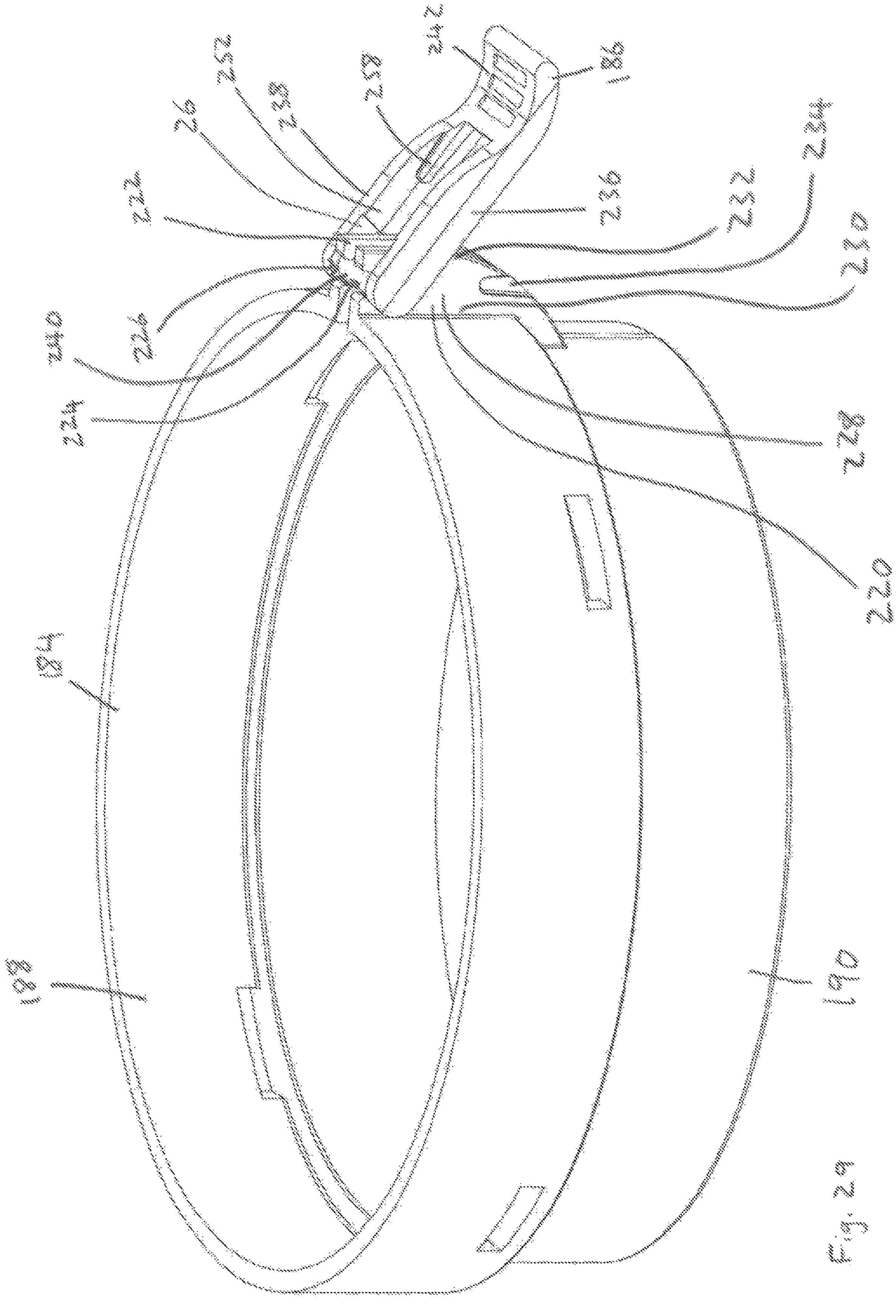
FIG. 29 is a perspective view of the locking sleeve and the locking lever of FIG. 28, showing the locking lever in an intermediate position.

As shown in FIG. 29, the locking mechanism 174 comprises an annular locking sleeve 184 and a locking lever 186. The locking sleeve 184 has an upper cylindrical portion 188 that is positioned above a lower cylindrical portion 190, the upper cylindrical portion 188 having a greater diameter than the lower cylindrical portion 190. The lower cylindrical portion 190 has an upwardly directed annular shoulder surface 192 where the upper cylindrical portion 190 meets the lower cylindrical portion 190. The upper cylindrical portion 190 preferably has one or more locking slots 194 that extend radially through the upper cylindrical portion 190 immediately above the shoulder surface 192.

The upper cylindrical portion 190 defines an upper receiving chamber 196 that matedly receives the open lower end 180 of the extension sleeve 172, as shown in FIG. 21. The open lower end 180 of the extension sleeve 172 preferably has one or more locking fingers 198 that extend radially outwardly from the cylindrical outer wall 176 for engaging with the locking slots 194 in a snap fit, to help secure the locking sleeve 184 to the extension sleeve 172. The lower cylindrical portion 190 of the locking sleeve 172 defines a lower receiving chamber 200 that matedly receives the open top end 154 of the sleeve 20, as shown in FIG. 21.

Figure 22:
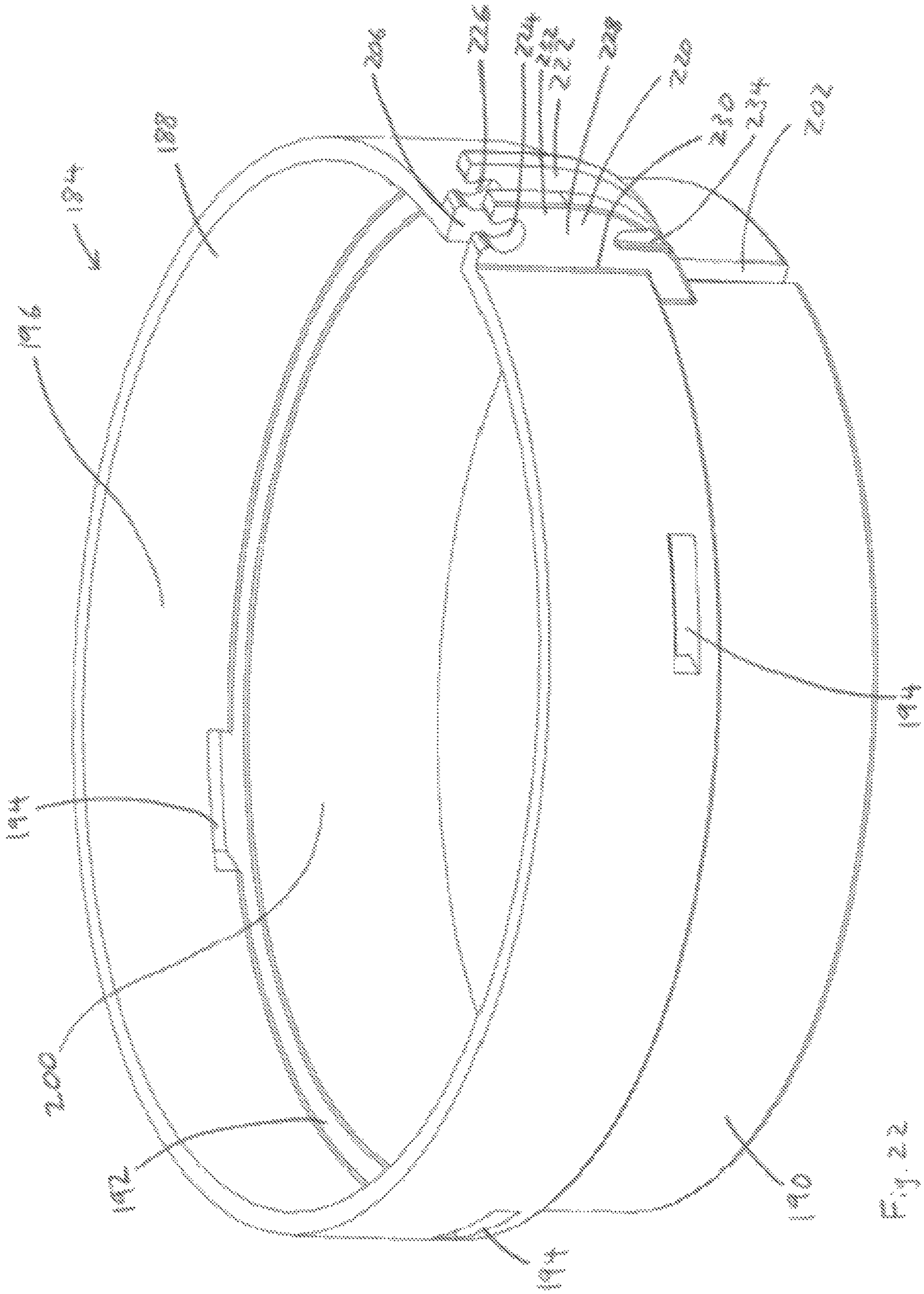
FIG. 22 is a perspective view of a locking sleeve of the extension assembly shown in FIG. 21.
Figure 23:
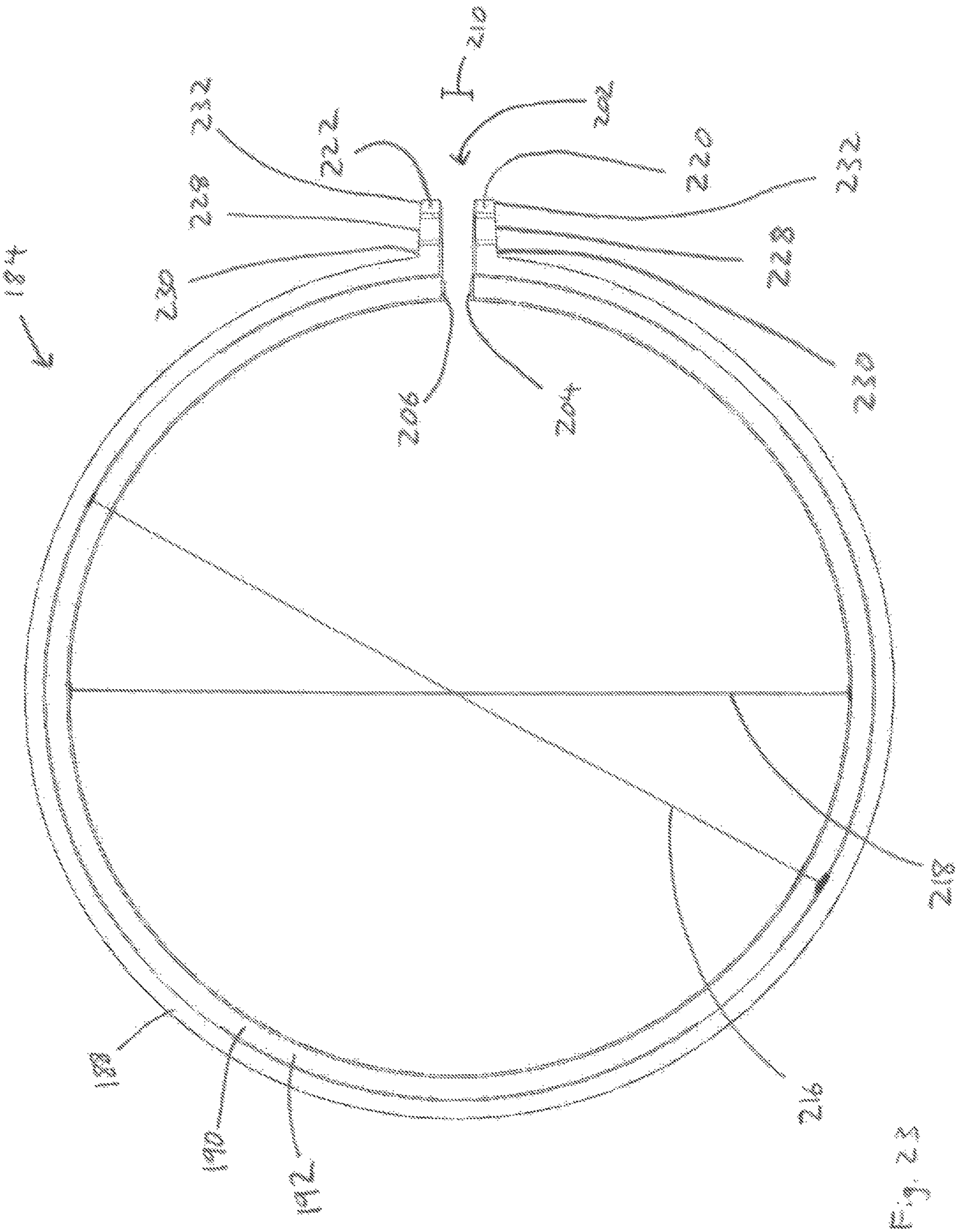
FIG. 23 is a top view of the locking sleeve of FIG. 22, showing the locking sleeve in an unlocked position.

As shown in FIG. 23, the annular locking sleeve 184 is split vertically by a slit opening 202 that extends vertically through the upper cylindrical portion 188 and the lower cylindrical portion 190. The locking sleeve 184 has a first end surface 204 that defines a first side of the slit opening 202 and a second end surface 206 that defines a second side of the slit opening 202. A first lever attachment member 220 extends radially outwardly from the upper cylindrical portion 188 adjacent to the first end surface 204, and a second lever attachment member 222 extends radially outwardly from the upper cylindrical portion 188 adjacent to the second end surface 206. As best shown in FIG. 22, the first lever attachment member 220 has an upwardly open first lever attachment channel 224, and the second lever attachment member 222 has an upwardly open second lever attachment channel 226.

Figure 32:
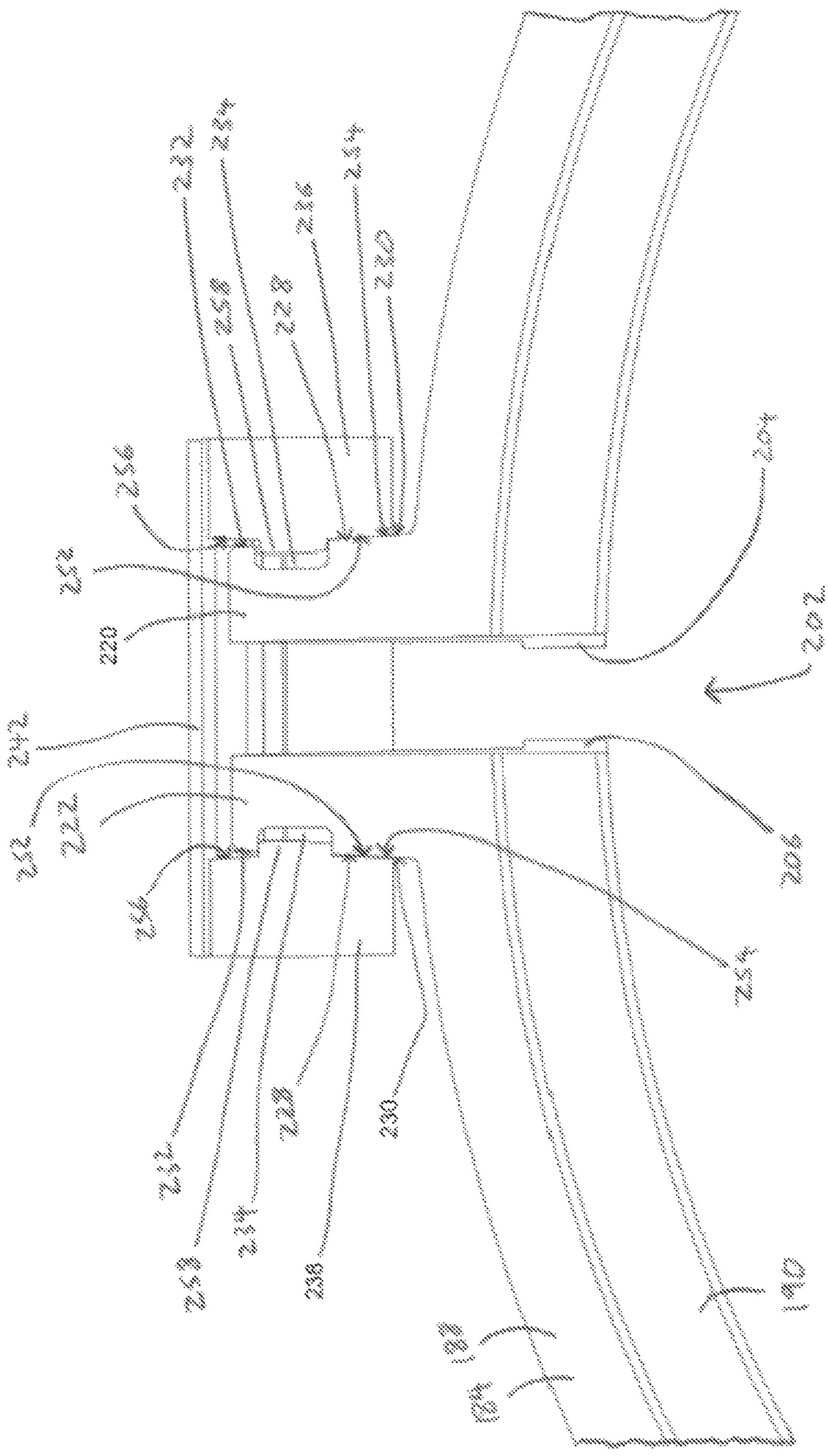
FIG. 32 is an enlarged cross-sectional view of the locking sleeve and the locking lever in the locking position of FIG. 31, showing the engagement of the locking lever with the locking sleeve.
Figure 23:
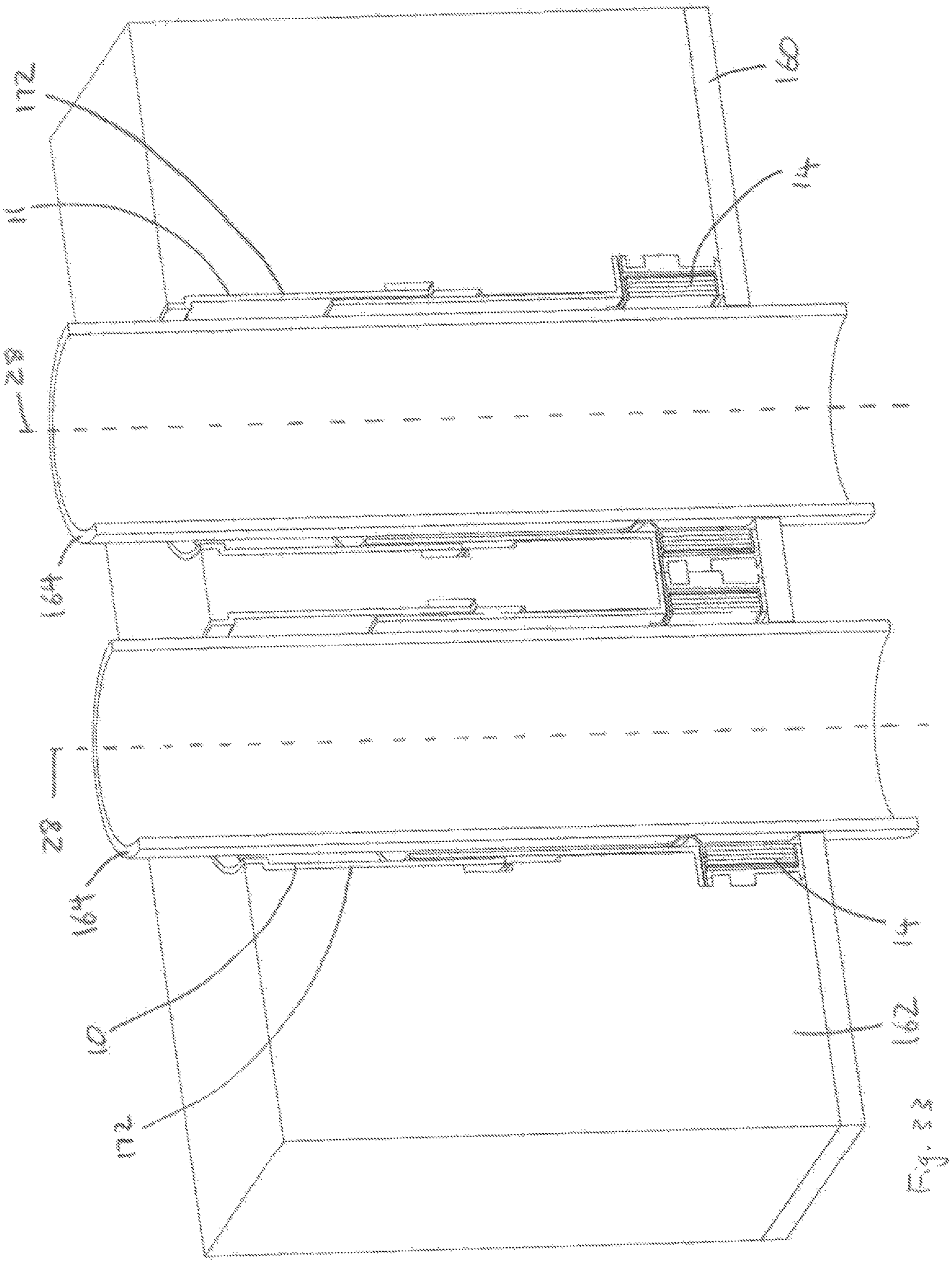
Figure 34:
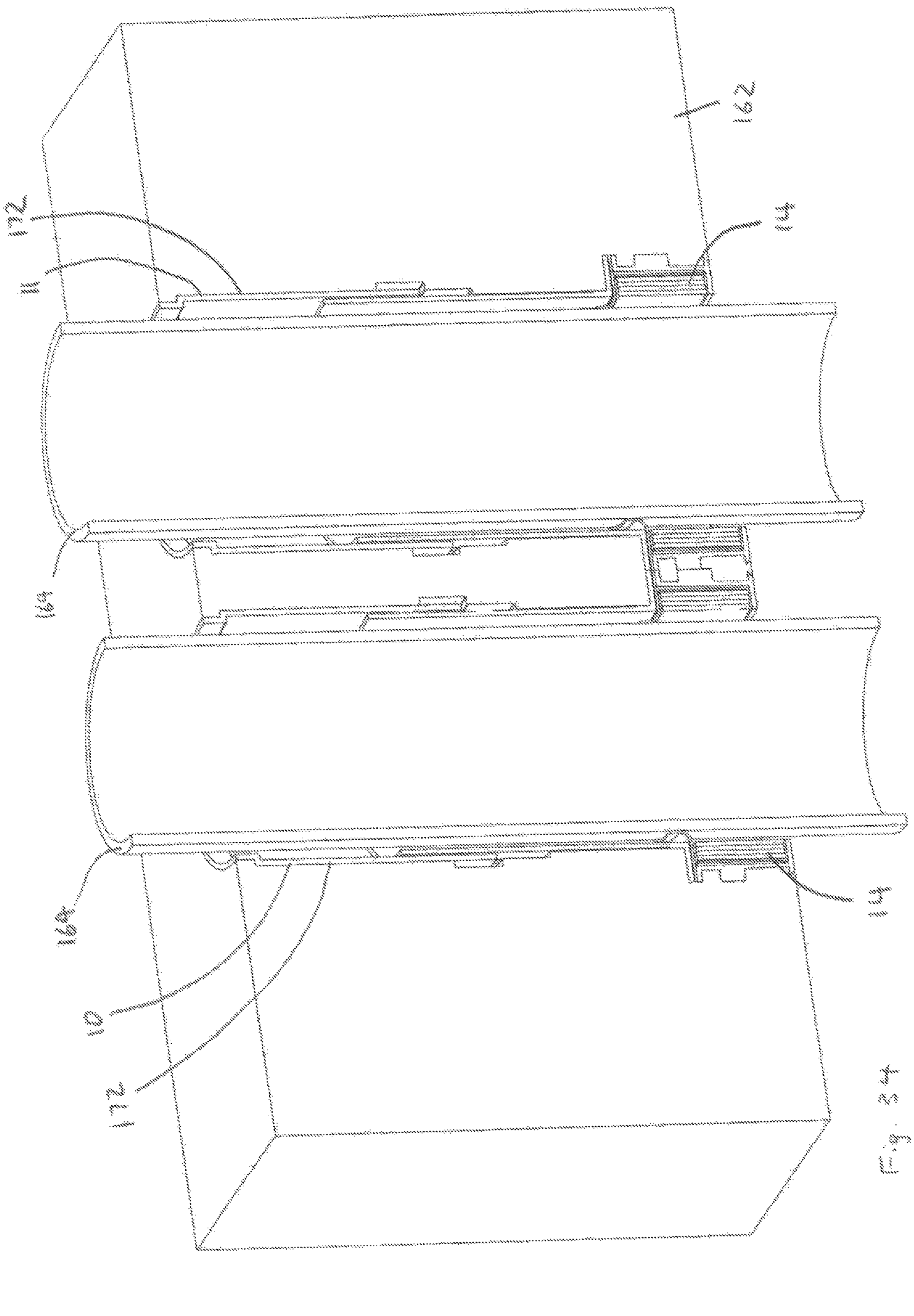
FIG. 34 is a perspective cross-sectional view of the firestop devices of FIG. 33, showing the firestop devices embedded in the concrete constructional component with the formwork removed.

As shown in FIG. 32, the first lever attachment member 220 and the second lever attachment member 222 each have an outer tapered face 228 that faces away from the slit opening 202 and extends radially away from the upper cylindrical portion 188. The outer tapered face 228 has a radially inner portion 230 and a radially outer portion 232, the radially inner portion 230 being closer to the upper cylindrical portion 188 than the radially outer portion 232 is to the upper cylindrical portion 188. As shown in FIG. 32, the radially inner portion 230 of the first lever attachment member 220 is further from the radially inner portion 230 of the second lever attachment member 222 than the radially outer portion 232 of the first lever attachment member 220 is from the radially outer portion 232 of the second lever attachment member 222.

As shown in FIG. 22, the first lever attachment member 220 has a snap fit slot 234 formed by an indentation in the lower portion of the outer tapered face 228. The second lever attachment member 222 also has a snap fit slot 234, as can be seen in FIG. 32.

Figure 24:
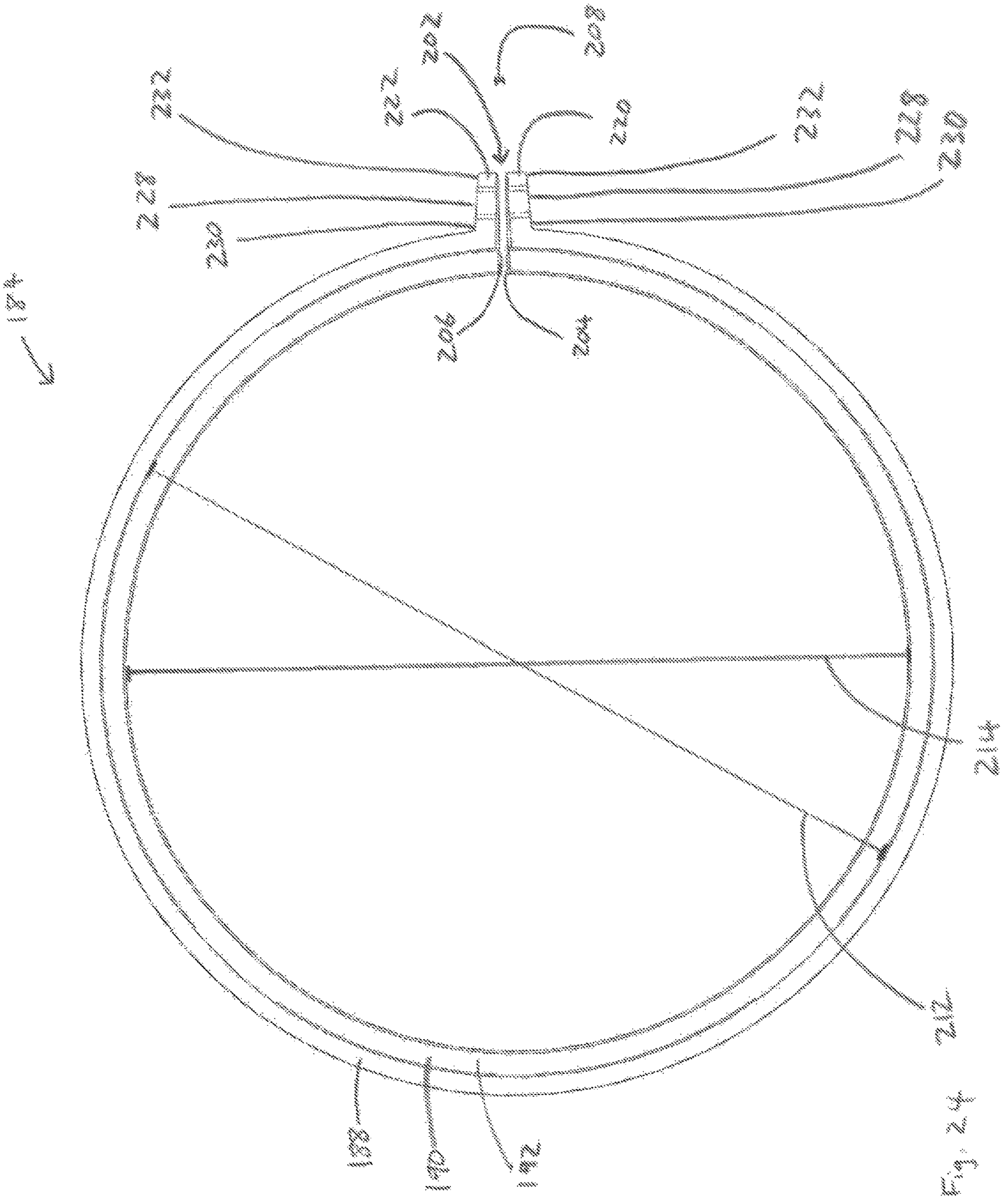
FIG. 24 is a top view of the locking sleeve of FIG. 22, showing the locking sleeve in a locked position.

The locking sleeve 184 is made from a suitably deformable material that allows the end surfaces 204, 206 on either side of the slit opening 202 to be moved towards or away from each other between the unlocked position shown in FIG. 23 and the locked position shown in FIG. 24. When in the locked position shown in FIG. 24, the first end surface 204 is spaced a first distance 208 from the second end surface 206. When in the unlocked position shown in FIG. 23, the first end surface 204 is spaced a second distance 210 from the second end surface 206, the first distance 208 being smaller than the second distance 210.

When the locking sleeve 184 is in the locked position shown in FIG. 24, the upper cylindrical portion 188 has a first upper diameter 212 and the lower cylindrical portion 190 has a first lower diameter 214, the first upper diameter 212 being larger than the first lower diameter 214. When the locking sleeve is in the unlocked position shown in FIG. 23, the upper cylindrical portion 188 has a second upper diameter 216 and the lower cylindrical portion 190 has a second lower diameter 218, the second upper diameter 216 being larger than the second lower diameter 218, the second upper diameter 216 being larger than the first upper diameter 212, and the second lower diameter 218 being larger than the first lower diameter 214.

When the locking sleeve 184 moves from the locked position shown in FIG. 24 to the unlocked position shown in FIG. 23, the diameter of the upper cylindrical portion 188 increases from the first upper diameter 212 to the second upper diameter 216 and the diameter of the lower cylindrical portion 190 increases from the first lower diameter 214 to the second lower diameter 218. When the locking sleeve 184 moves from the unlocked position shown in FIG. 23 to the locked position shown in FIG. 24, the diameter of the upper cylindrical portion 188 decreases from the second upper diameter 216 to the first upper diameter 212 and the diameter of the lower cylindrical portion 190 decreases from the second lower diameter 218 to the first lower diameter 214.

Figure 25:
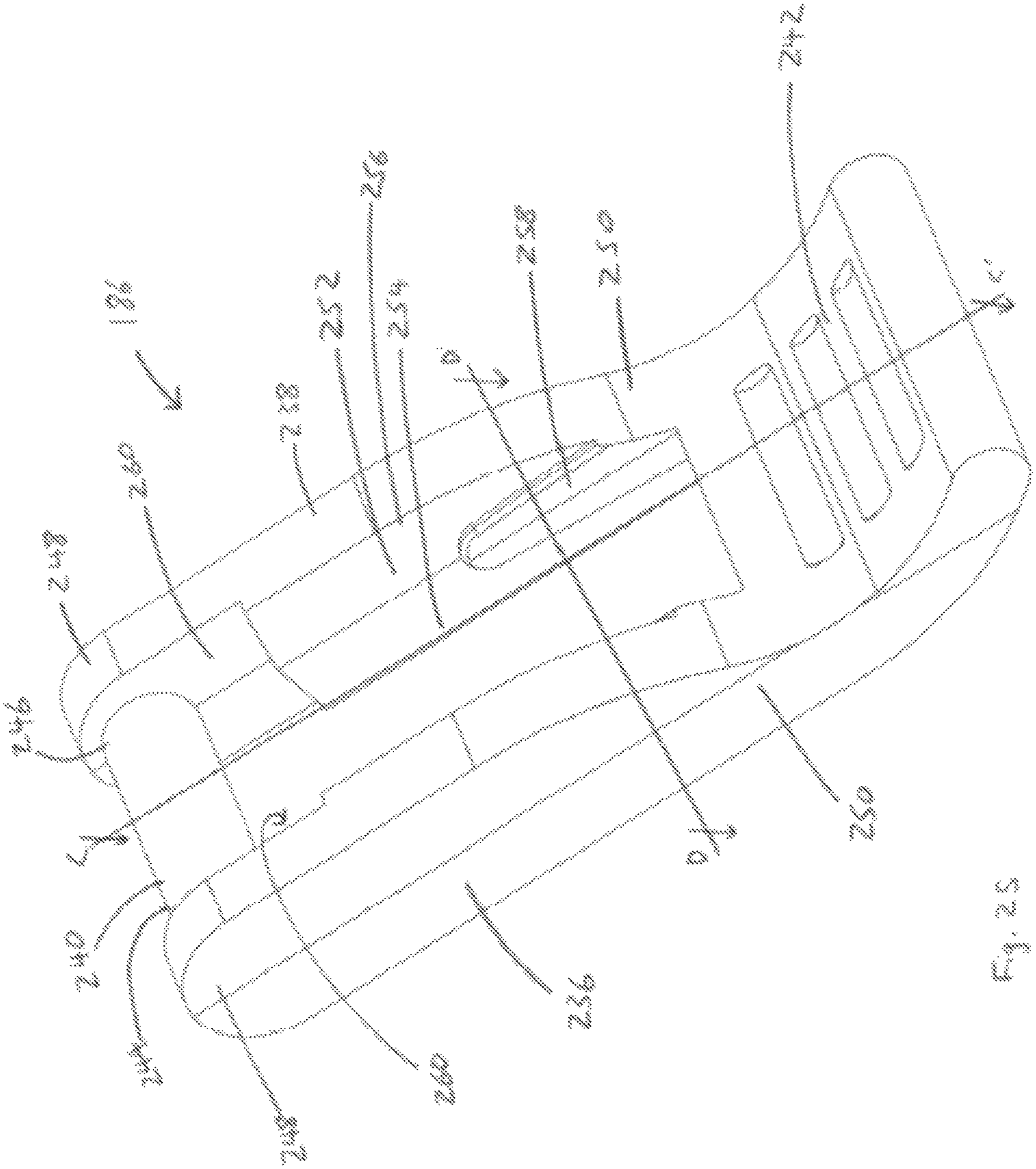
FIG. 25 is a perspective view of a locking lever of the extension assembly shown in FIG. 21.

The locking lever 186 is best shown in FIG. 25 as having a first arm member 236, a second arm member 238, an axle member 240, and a grip member 242. The axle member 240 is a cylindrical body that extends between the first arm member 236 and the second arm member 238. The first arm member 236 and the second arm member 238 each have a proximal end 248 and a distal end 250. The first arm member 236 is spaced from the second arm member 238, with the proximal end 248 of the first arm member 236 being attached to a first end 244 of the axle member 240, and the proximal end 248 of the second arm member 238 being attached to a second end 246 of the axle member 240. The distal ends 250 of the first and second arm members 236, 238 are attached to the grip member 242. The grip member 242 has a curved shape with several indentations for assisting a user in manually gripping and manipulating the lever 186.

Figure 26:
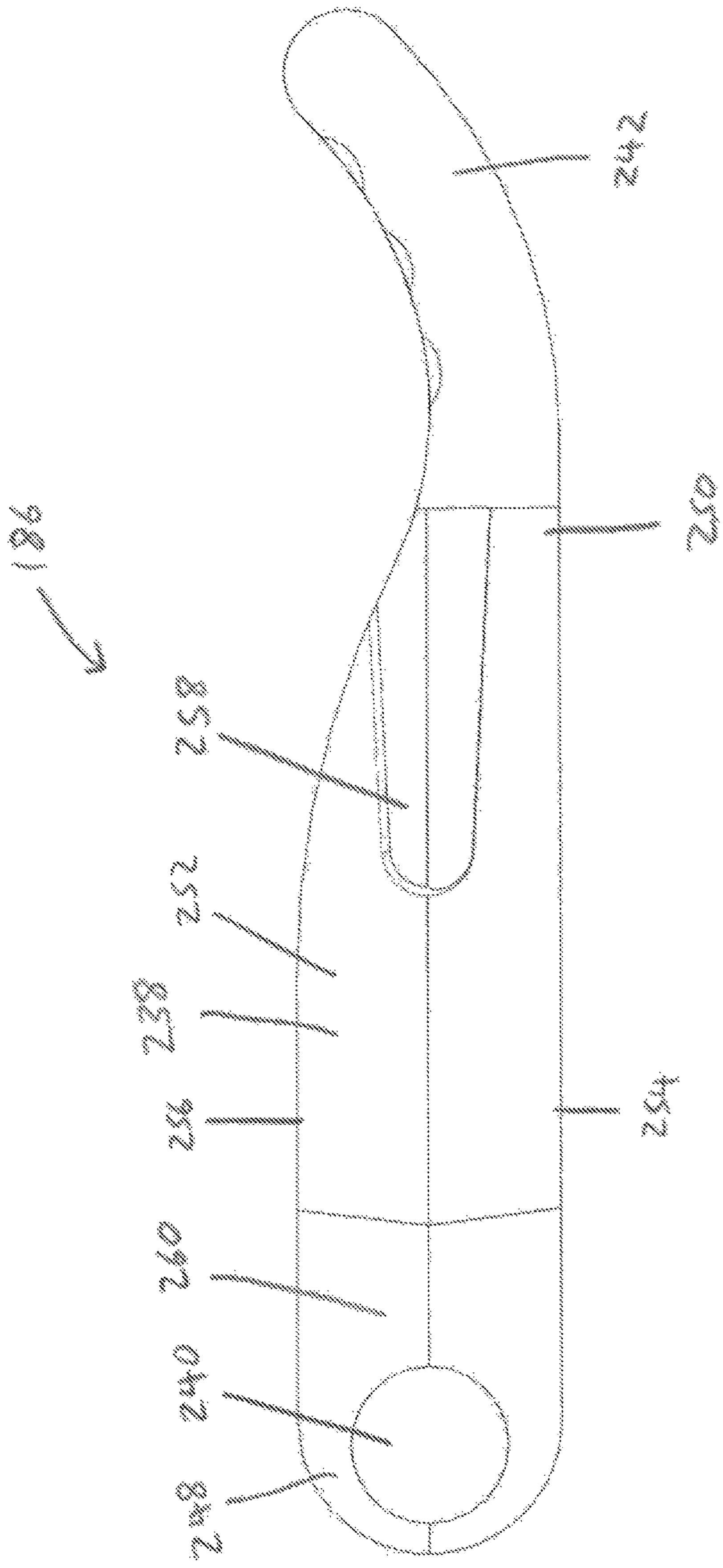
FIG. 26 is a cross-sectional view of the locking lever of FIG. 25, taken along line C-C' shown in FIG. 25.
Figure 27:
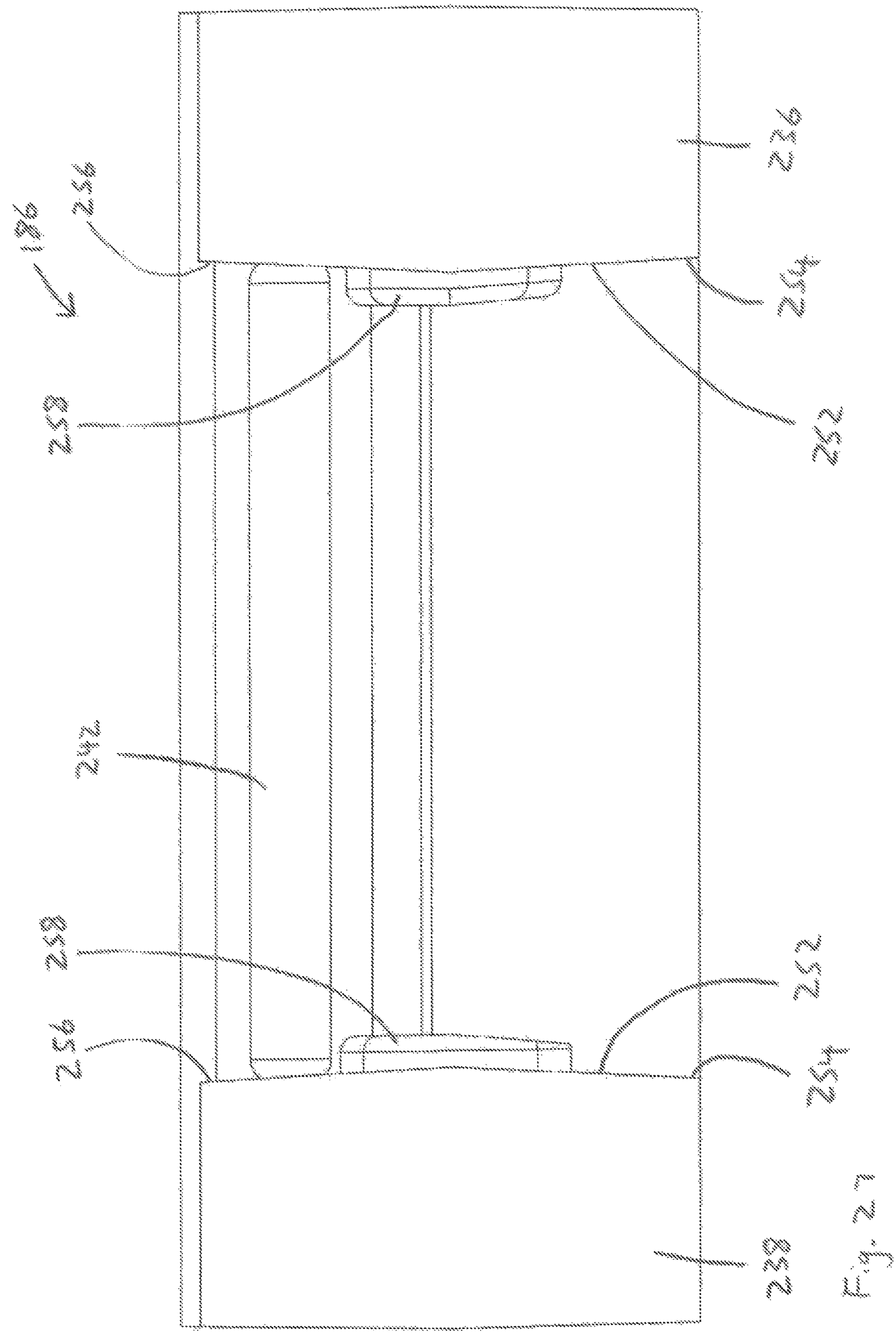
FIG. 27 is a cross-sectional view of the locking lever of FIG. 25, taken along line D-D' shown in FIG. 25.

The first arm member 236 and the second arm member 238 each have an inner face 252, with the inner face 252 of the first arm member 236 being spaced from and facing towards the second arm member 238, and the inner face 252 of the second arm member 238 being spaced from and facing towards the first arm member 236. As shown in FIGS. 26 and 27, the inner face 252 of the first arm member 236 and the inner face 252 of the second arm member 238 each have an inner portion 254 and an outer portion 256. When the locking lever 186 is oriented as shown in FIGS. 26 and 27, the inner portion 254 is the bottom portion of the inner face 252 and the outer portion 256 is the top portion of the inner face 252. In the embodiment shown in FIG. 27, the inner face 252 has a slightly convex shape, though this is not necessary.

The distance between the inner portion 254 of the inner face 252 of the first arm member 236 and the inner portion 254 of the inner face 252 of the second arm member 238 is smaller than the distance between the radially inner portion 230 of the outer tapered face 228 of the first lever attachment member 220 and the radially inner portion 230 of the outer tapered face 228 of the second lever attachment member 222 when the locking sleeve 184 is in the unlocked position shown in FIG. 23.

As can be seen in FIG. 25, the second arm member 238 has a snap fit tab 258 that projects towards the first arm member 236 from the inner face 252. The first arm member 236 also has a snap fit tab 258, as can be seen in FIG. 27. The first and second arm members 236, 238 also have an indented portion 260 at their proximal ends 248. The indented portion 260 of the first arm member 236 is further from the indented portion 260 of the second arm member 238 than the inner face 252 of the first arm member 236 is from the inner face 252 of the second arm member 238.

As shown in FIG. 29, the locking lever 186 is coupled to the locking sleeve 184 by placing the axle member 240 of the locking lever 186 in the first lever attachment channel 224 of the first lever attachment member 220 and the second lever attachment channel 226 of the second lever attachment member 222. With the axle member 240 received by the first and second lever attachment channels 224, 226, the locking lever 186 is rotatable about the axle member 240 between the unlocking position shown in FIG. 28 and the locking position shown in FIG. 30.

Figure 28:
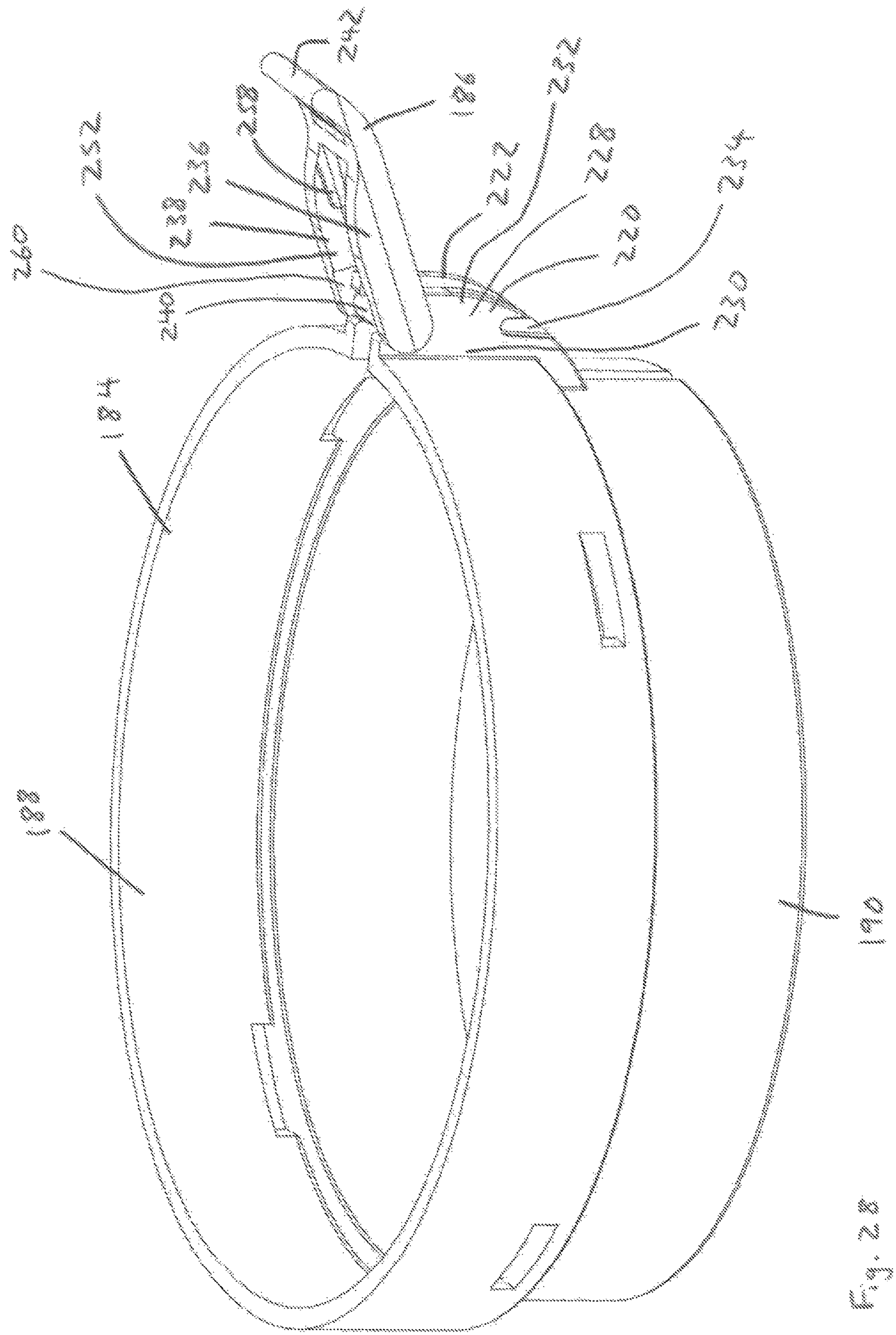
FIG. 28 is a perspective view of the locking sleeve of FIG. 22, showing the locking lever of FIG. 25 coupled to the locking sleeve in an unlocking position.

When in the unlocking position shown in FIG. 28, the indented portion 260 of the first and second arm members 236, 238 is positioned adjacent to the outer tapered face 228 of the first and second lever attachment members 220, 222, and the inner face 252 of the first and second arm members 236, 238 is spaced from and disengaged from the outer tapered face 228 of the first and second lever attachment members 220, 222. The distance between the indented portions 260 of the first and second arm members 236, 238 provides sufficient space so that, when the locking lever 186 is in the unlocking position of FIG. 28, the first and second lever attachment members 220, 222 are able to move to, or remain in, the unlocked position shown in FIG. 23, in which the first and second end surfaces 204, 206 of the locking sleeve 184 are spaced the second distance 210 apart, the upper cylindrical portion 188 has the second upper diameter 216, and the lower cylindrical portion 190 has the second lower diameter 218.

Figure 30:
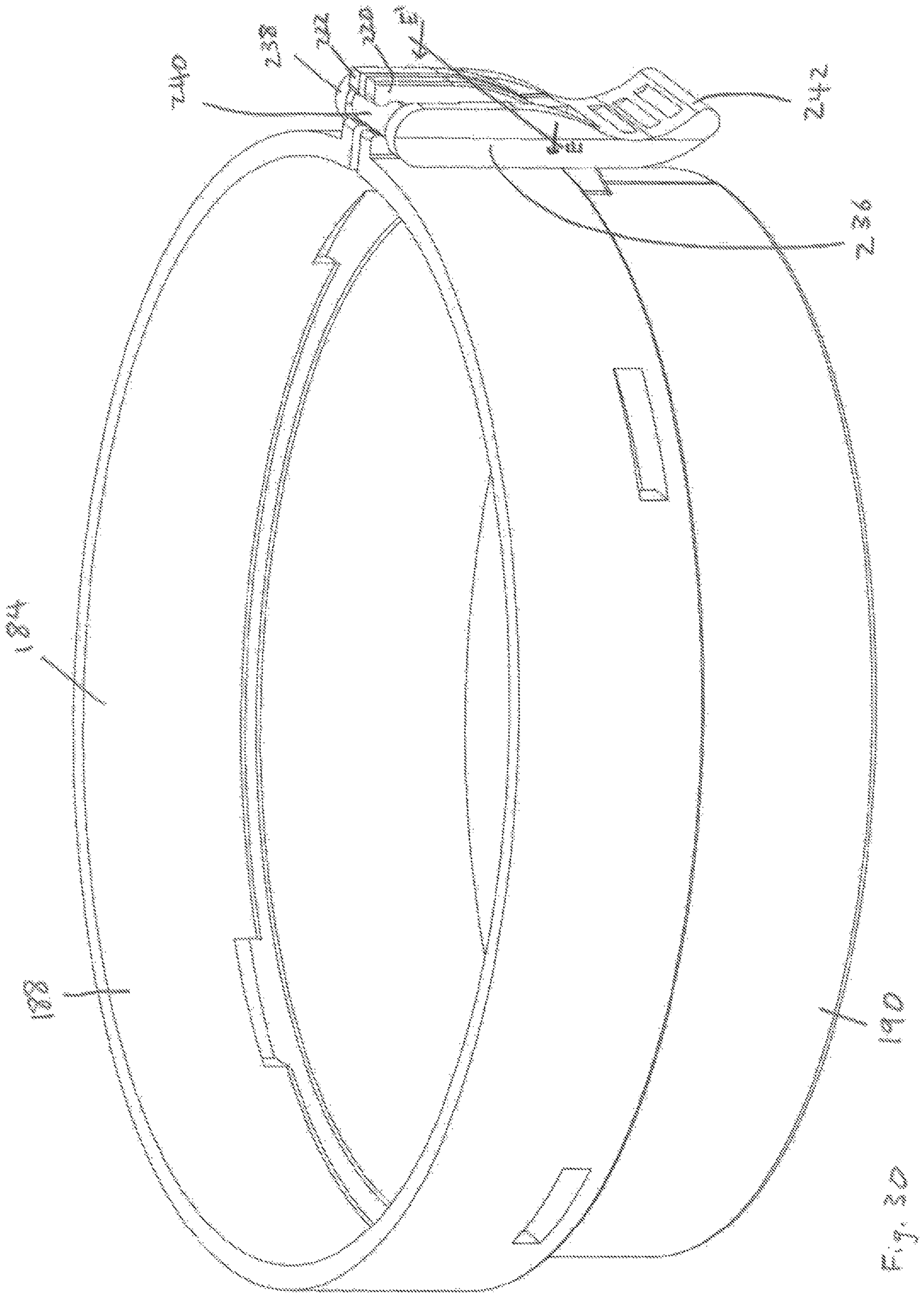
FIG. 30 is a perspective view of the locking sleeve and the locking lever of FIG. 28, showing the locking lever in a locking position.
Figure 31:
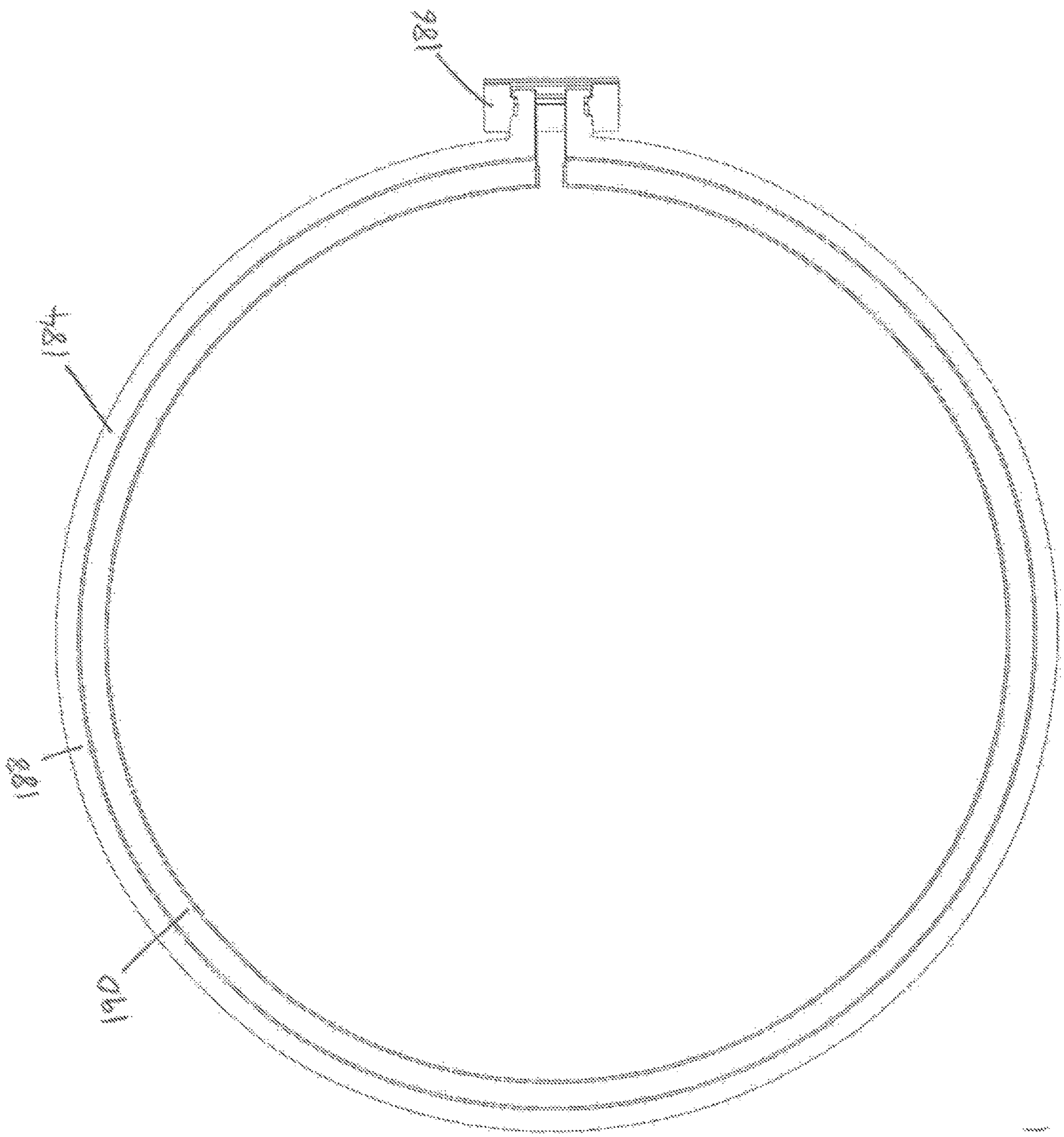
FIG. 31 is a top cross-sectional view of the locking sleeve and the locking lever in the locking position of FIG. 30, taken along line E-E' shown in FIG. 30.

To move the locking lever 186 from the unlocking position of FIG. 28 to the locking position of FIG. 30, the locking lever 186 is rotated downwardly as by a user manually gripping the grip member 242 and pushing it downwardly relative to the locking sleeve 184.

When the locking lever 186 reaches the intermediate position shown in FIG. 29, the inner face 252 of the first and second arm members 236, 238 comes into contact with the radially outer portion 232 of the outer tapered face 228 of the first and second lever attachment members 220, 222. The engagement of the inner face 252 of the first and second arm members 236, 238 with the outer tapered face 228 of the first and second lever attachment members 220, 222 forces the first and second lever attachment members 220, 222 to move towards each other.

As the locking lever 186 is rotated further downwardly, the inner portion 254 of the inner face 252 of the first and second arm members 236, 238 moves radially inwardly from the radially outer portion 232 of the outer tapered face 228 towards the radially inner portion 230 of the outer tapered face 228. Because the outer tapered face 228 has a slanted or tapered profile, the first and second lever attachment members 220, 222 move closer towards each other as the inner portion 254 of the inner face 252 of the first and second arm members 236, 238 moves towards the radially inner portion 230 of the outer tapered face 228.

When the locking lever 186 reaches the locking position shown in FIG. 30, the inner portion 254 of the inner face 252 of the first and second arm members 236, 238 engages with the radially inner portion 230 of the outer tapered face 228 of the first and second lever attachment members 220, 222, as shown in FIG. 32. The engagement of the inner portion 254 of the inner face 252 of the first and second arm members 236, 238 with the radially inner portion 230 of the outer tapered face 228 of the first and second lever attachment members 220, 222 moves the first and second lever attachment members 220, 222 to the locked position shown in FIG. 24, in which the first and second end surfaces 204, 206 of the locking sleeve 184 are spaced the first distance 208 apart, the upper cylindrical portion 188 has the first upper diameter 212, and the lower cylindrical portion 190 has the second lower diameter 214.

When the extension assembly 170 is coupled to the sleeve 20 as shown in FIG. 21, the locking lever 186 is initially placed in the unlocking position shown in FIG. 28. This allows the locking sleeve 184 to adopt the unlocked position shown in FIG. 23. When in the unlocked position, the relatively large second lower diameter 218 of the lower cylindrical portion 190 of the locking sleeve 184 provides space for the lower receiving chamber 200 to receive the open top end 154 of the sleeve 20, and to permit the locking sleeve 184 to slide axially relative to the sleeve 20 so that the telescopic extension sleeve 172 can be placed at the desired height.

Once the telescopic extension sleeve 172 is at the desired height, the locking lever 186 is rotated from the unlocking position of FIG. 28 to the locking position of FIG. 30. This forces the locking sleeve 184 to move from the unlocked position of FIG. 23 to the locked position of FIG. 24. When in the locked position, the relatively small first lower diameter 214 of the lower cylindrical portion 190 of the locking sleeve 184 causes the lower cylindrical portion 190 to tightly engage with the sleeve 20, locking the telescopic extension sleeve 172 in place relative to the sleeve 20 at the desired height.

When the locking lever 186 is in the locking position, the snap fit tabs 258 of the first and second arm members 236, 238 engage in a snap fit with the snap fit slots 234 of the first and second lever attachment members 220, 222, respectively, as shown in FIG. 32. The engagement of the snap fit tabs 258 with the snap fit slots 234 preferably helps to hold the locking lever 186 in the locking position.

With the extension assembly 170 locked in place, the firestop device 10 can then be embedded in a to-be-cast constructional component in much the same manner as previously described. The firestop device 10 is fastened to a formwork 160 of the to-be-cast constructional component, optionally with one or more additional firestop devices 11 interlocked therewith. With the caps 22 in place in the open upper ends 182 of the extension sleeves 172, concrete is poured into the mold provided by the formwork 160. The concrete is then cured, to produce the concrete component 162 with the firestop devices 10, 11 embedded therein as shown in FIG. 33. The formwork 160 and the caps 22 can then be removed, and conduits such as pipes 164 can be passed through the firestop devices 10, 11.

In preferred embodiments, the firestop device 10 is suitable for use with DVW piping systems, and prevents or retards the spread of fire through fire rated floors through service penetrations between floors. Preferably, the device 10 should create a fire rating that meets the applicable standards. The device 10 preferably works with DWV pipes 164 of at least two sizes, such as 3 inches and 4 inches, for example.

The cast-in-place constructional system is preferably suitable for use with various concrete slab thicknesses ranging from 4.5 inches to 12 inches, for example. The intumescent material 14, which may for example be molded or strips, is preferably activated when exposed to flame or heat as defined in the applicable standards. The expanded intumescent material 14 will preferably crush the pipe 164 and close the annular space, thereby preferably preventing flame from the floor beneath from propagating to the floor above, thus acting as a firestop.

Optionally, the device 10 may have the following features:

A) Without the extension assembly 170, the device 10 is suitable for use with concrete slabs 4.5 inches thick to 8 inches thick.

B) The extension assembly 170 providing height adjustability for concrete slabs 9 inches thick to 12 inches thick.

C) An easy to use extension sleeve 172 locking mechanism 174.

D) One piece construction of the base or housing 12.

E) Integrated water barrier seal provided by the gasket 18.

F) Daisy chain/alignment features.

G) Safety cap 22 to prevent poured concrete from getting in.

A basic design of the device 10 may include the following five features:

1) The base or housing 12, which houses the intumescent material 14. The housing 12 preferably has a single piece construction, and is not a clamshell. For installation, the housing 12 is preferably nailed to the wooded slab of the formwork 160 before pouring concrete.

2) The gasket 18, which preferably acts as a water and smoke barrier.

3) The intumescent material 14, which expands and crushes the pipe when heat is applied. The intumescent material 14 preferably closes the annular hole of the penetration, thereby preventing the fire from the bottom floor propagating to the upper floor. The intumescent material 14 preferably has the metal sheath 16 on the outside.

4) The sleeve 20, which preferably can be cut based on the concrete slab thickness.

5) The safety cap 22, which preferably prevents the concrete from getting into the annular space. The cap 22 also preferably prevents any hazard from installers stepping into an open sleeve 20.

The metal sheath 16 preferably helps to divert the intumescent expansion radially inwards, accelerating the closure of the annular hole. The holes 126 in the metal sheath 16 preferably act as an undercut when trapped inside cured concrete. This preferably prevents the intumescent material 14 from expanding axially downwards thereby maintaining the expansion force radially inwards. The metal sheath 16 also preferably helps in assembly of the intumescent material 14 to the housing 12.

The gasket 18 is preferably housed between the housing 12 and the sleeve 20, and is preferably kept in place by self-tapping screws. The gasket nodule receiving recesses 144 of the sleeve 20 preferably provides additional support to prevent the gasket 18 from slipping in when a pipe 164 is pushed through the annular gasket opening 132.

The sleeve 20 preferably has markings that aid the installer in cutting the sleeve 20 at a desired length.

The cap 22 can optionally be push-fit to the sleeve 20 once the sleeve 20 is cut to the desired length.

The daisy chain/interlocking feature preferably assists the installer to align adjacent firestop devices 10, 11. The firestop devices 10, 11 preferably feature flexibility to offset if required. Offsetting each cell or socket 100, 102, 104, 106, 108, 110 may provide ½ inch increments, for example.

The optional extension sleeve 172 preferably provides installation on thicker slabs, such as 9 inches to 12 inches, for example. Markings are preferably provided on the sleeve to assist the installation. The telescopic design preferably provides flexibility for the installer to install at any height within the available range with greater ease.

Preferably, the device 10 features the locking sleeve 184 that is used to secure the extension sleeve 184 at any desired position. The locking sleeve 184 is preferably a split ring that will reduce in internal diameter when a force is applied normal (inwards) to the outer tapered faces 228. The inner faces 252 on the locking lever 186, which are optionally also tapered, preferably help in pushing the ends 244, 246 of the ring closer when the lever 186 is pushed downwards. The locking lever 186 will preferably snap into the locking sleeve 184 to preferably prevent the locking lever 186 from disengaging unintentionally.

Reference is now made to FIGS. 35 to 43, which show a firestop device 10 in accordance with a second embodiment of the invention. Like numerals are used to denote like components.

As in the first embodiment of the invention shown in FIGS. 1 to 34, the firestop device 10 shown in FIGS. 35 to 43 has a housing 12, an intumescent material 14, a metal sheath 16, a gasket 18, a sleeve 20, a removable cap 22, and an extension sleeve 172. The housing 12, the intumescent material 14, and the metal sheath 16 in the embodiment shown in FIGS. 35 to 43 are identical in structure and function to the housing 12, the intumescent material 14, and the metal sheath 16 shown in FIGS. 1 to 34.

Figure 37:
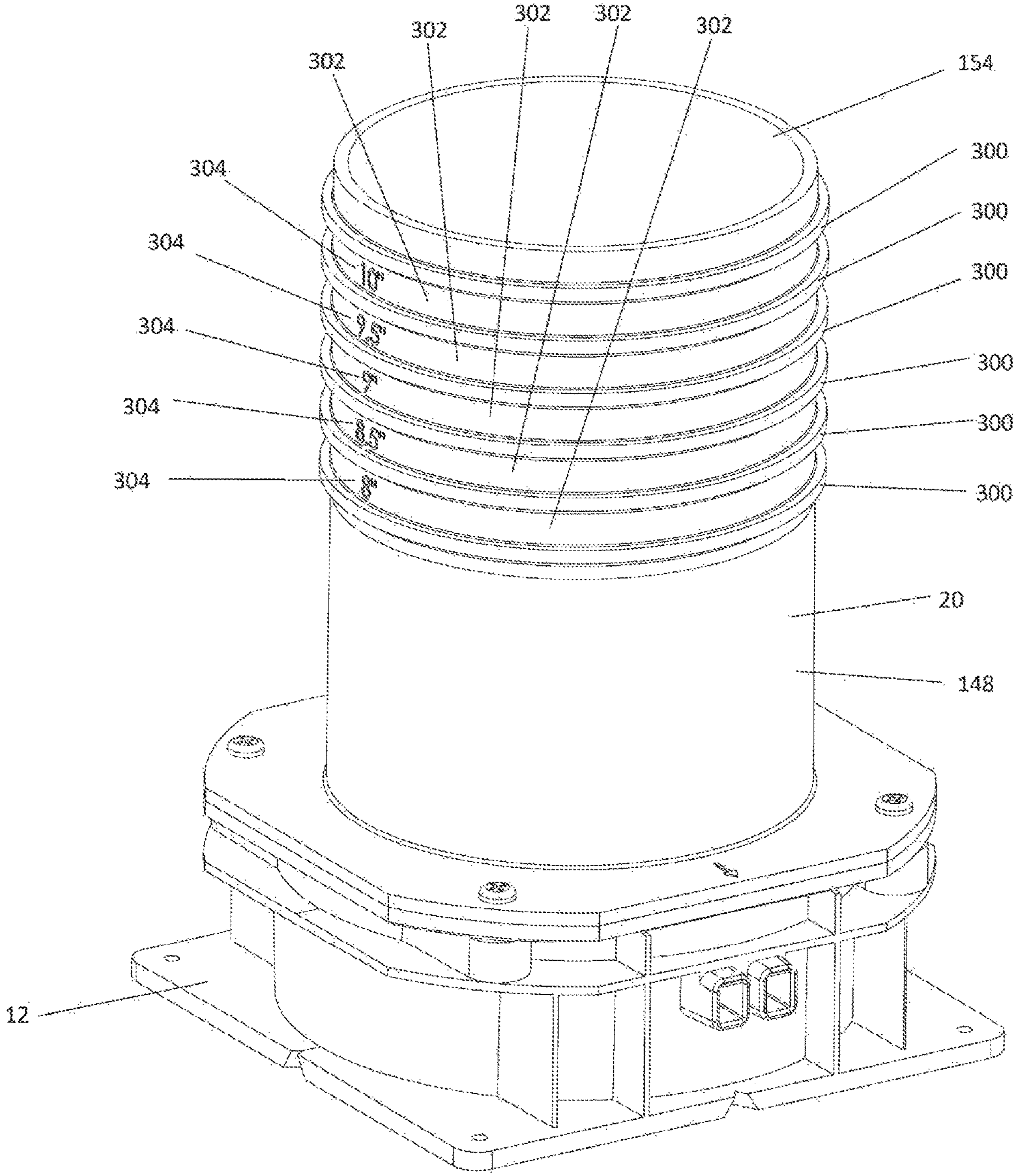
FIG. 37 is a perspective view of the firestop device of FIG. 35, with the extension sleeve omitted.

As can be seen in FIG. 37, the sleeve 20 has a series of vertically spaced ribs 300 that extend radially outwardly from the cylindrical wall 148. In the embodiment shown, the sleeve 20 has six ribs 300 that are each spaced about ½ of an inch apart, with the uppermost rib 300 being spaced about ½ of an inch below the open top end 154 of the sleeve 20. In other embodiments of the invention, any desired number and/or spacing of the ribs 300 could be used.

A locking member receiving channel 302 is defined between each vertically adjacent pair of ribs 300. Optionally, in each locking member receiving channel 302, the outer surface of the cylindrical wall 148 has a height indicator 304 to assist an installer in selecting the desired height of the extension sleeve 172 relative to the sleeve 20.

Figure 38:
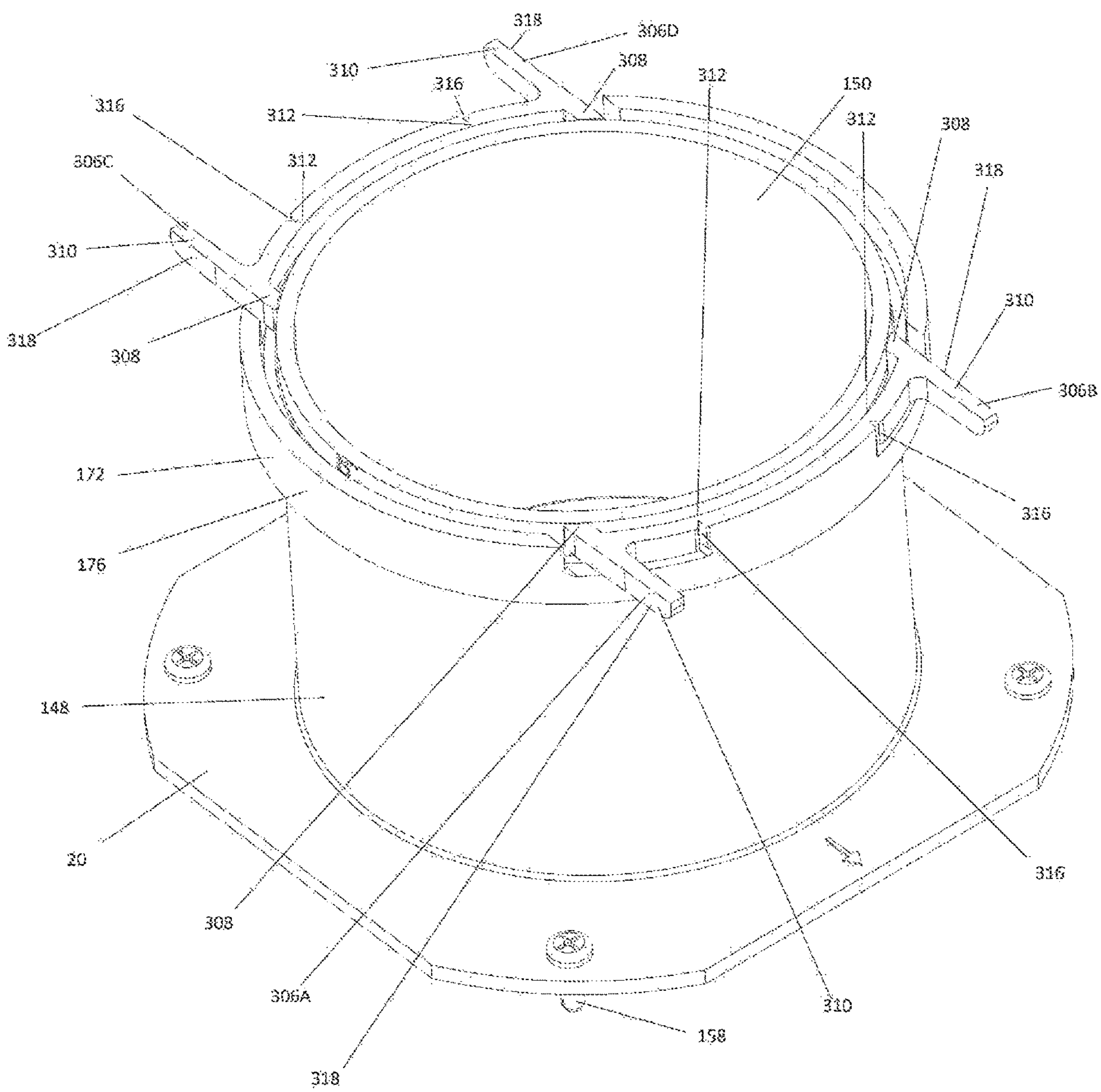
FIG. 38 is a perspective cross-sectional view of a sleeve and the extension sleeve of the firestop device of FIG. 35, taken along line G-G' shown in FIG. 35.
Figure 39:
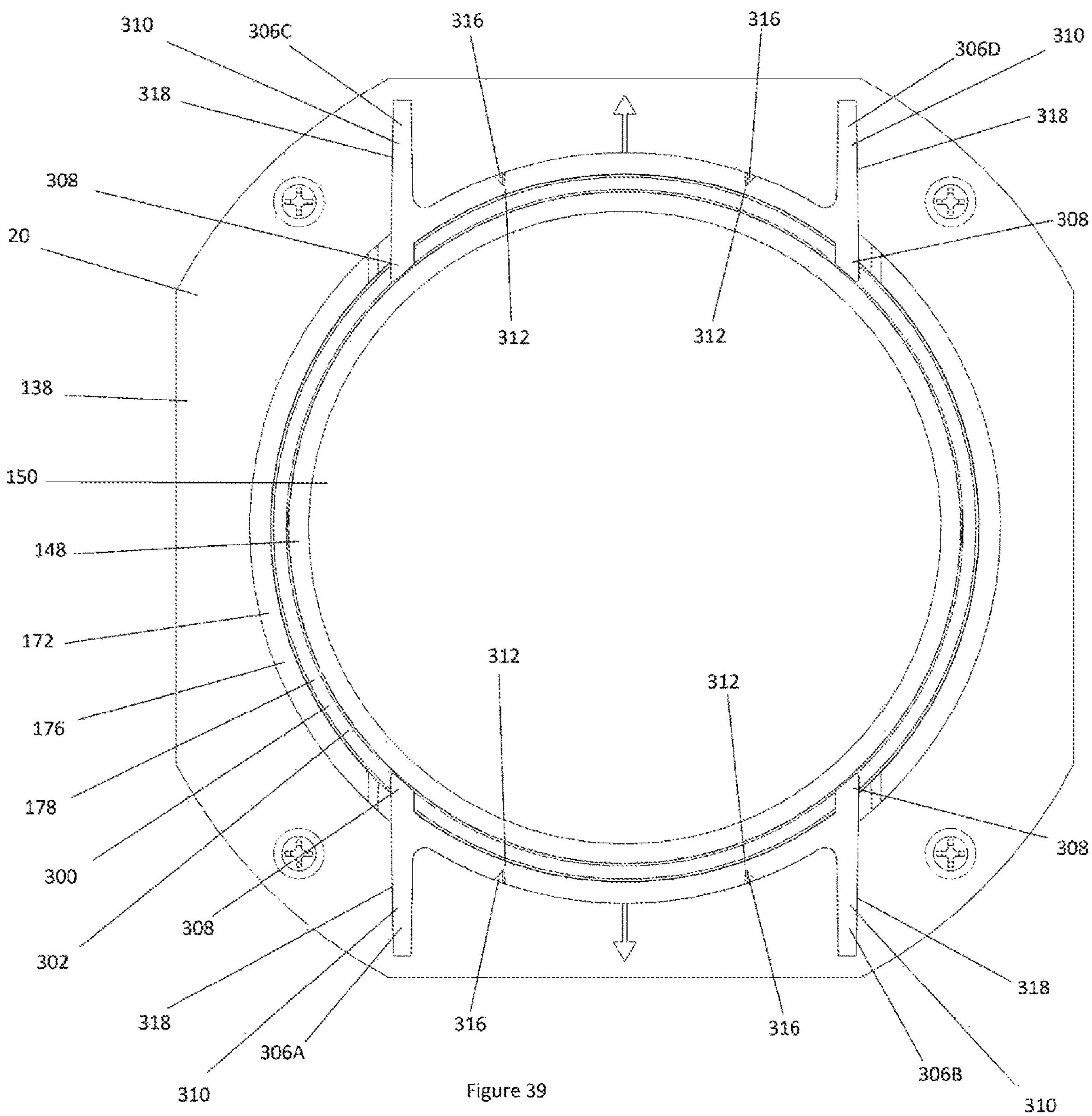
FIG. 39 is a top cross-sectional view of the sleeve and the extension sleeve of the firestop device of FIG. 35, taken along line G-G' shown in FIG. 35, and showing four locking members of the extension sleeve at an extended position.
Figure 40:
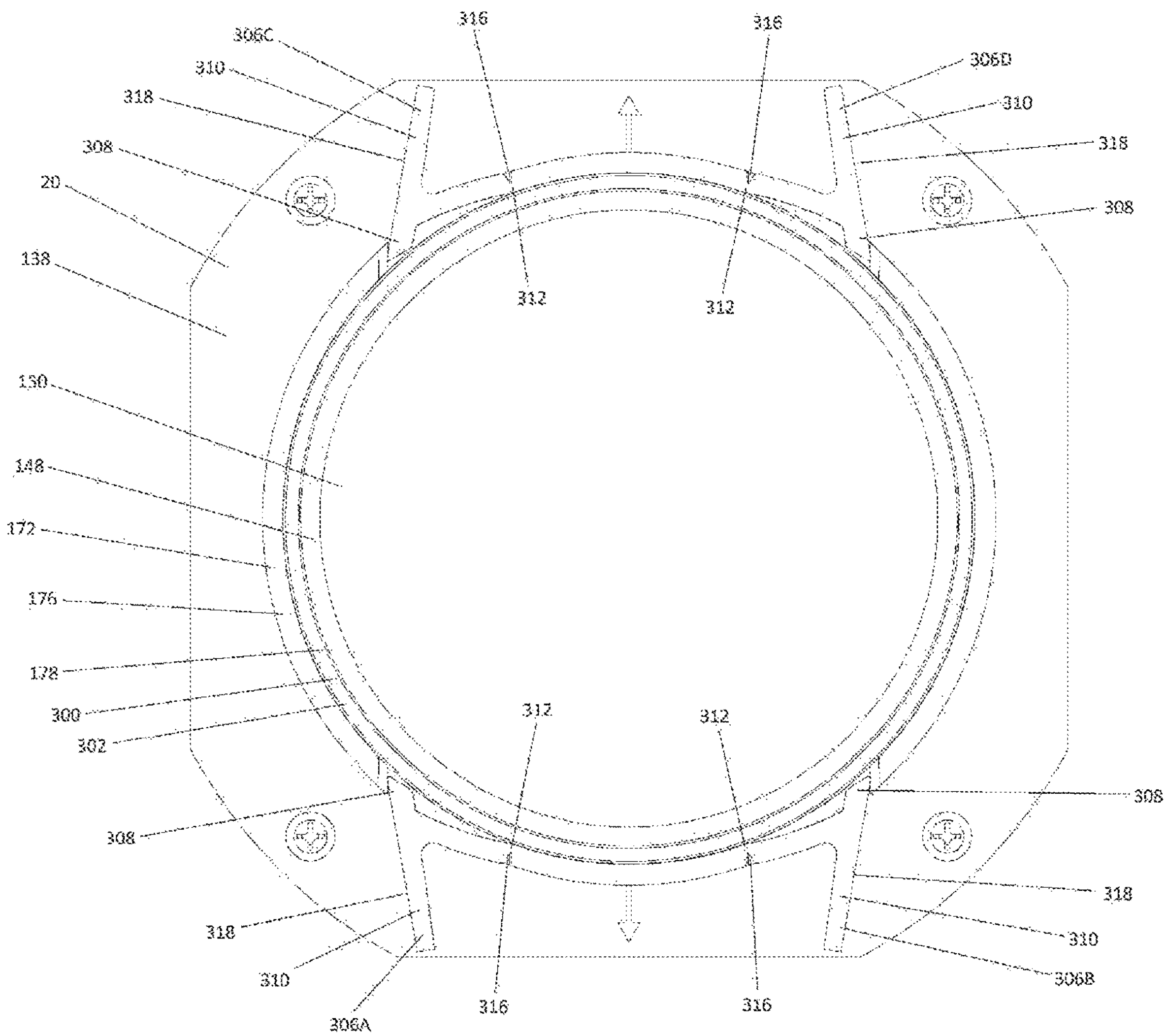
FIG. 40 is a top cross-sectional view of the sleeve and the extension sleeve of the firestop device as shown in FIG. 39, with the four locking members at a retracted position.
Figure 41:
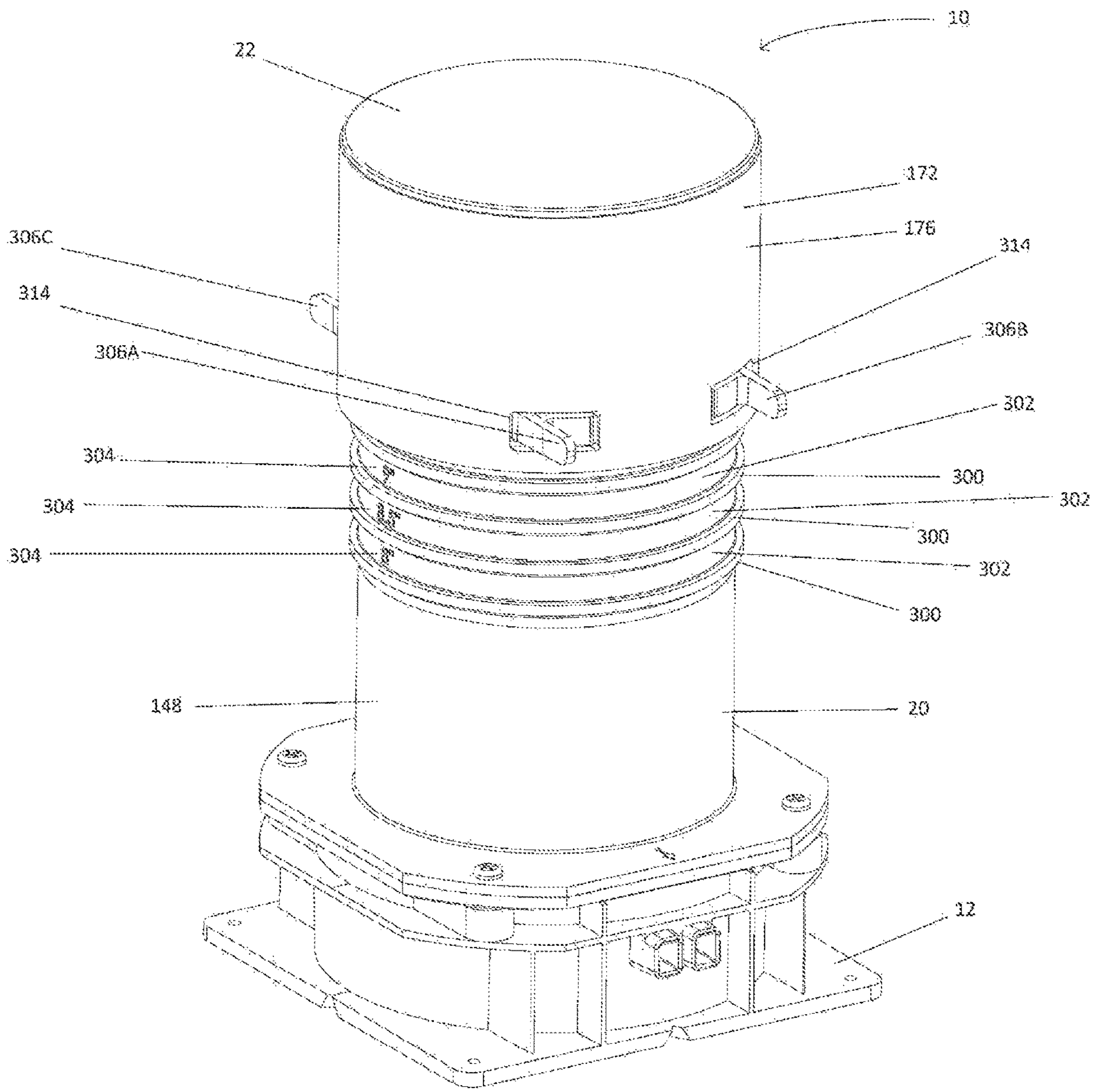
FIG. 41 is a perspective view of the firestop device of FIG. 35, with the extension sleeve shown at a second height that is higher than the first height shown in FIG. 35.

As can be seen in FIGS. 35 and 38 to 41, the extension sleeve 172 has four locking members 306A, 306B, 306C, 306D that are movable relative to the cylindrical outer wall 176 of the extension sleeve 172 between the extended position shown in FIGS. 35, 38, 39, and 41 and the retracted position shown in FIG. 40. Each locking member 306A, 306B, 306C, 306D has an inner locking end 308 that extends inwardly into the inner extension chamber 178 when the locking member 306A, 306B, 306C, 306D is at the extended position; an outer tab 310 that extends outwardly from the cylindrical outer wall 176; and an attachment member 312 that attaches the locking member 306A, 306B, 306C, 306D to the cylindrical outer wall 176.

Each locking member 306A, 306B, 306C, 306D sits within a rectangular cut-out 314 in the cylindrical outer wall 176 of the extension sleeve 172, and is attached to the cylindrical outer wall 176 only by the attachment member 312. As best shown in FIGS. 38 and 39, the attachment member 312 is formed by an extension of the cylindrical outer wall 176 having a radially outwardly open wedge-shaped groove 316. The wedge-shaped groove 316 reduces the thickness of attachment member 312, which allows the attachment member 312 to resiliently deform to allow the locking member 306A, 306B, 306C, 306D to move relative to the cylindrical outer wall 176 from the extended position shown in FIG. 39 to the retracted position shown in FIG. 40.

The outer tab 310 of each locking member 306A, 306B, 306C, 306D has a side surface 318 that faces away from the attachment member 312. The outer tab 310 can be manipulated by applying an unlocking force to the side surface 318 using, for example, an installer's finger or fingers. The unlocking force deforms the attachment member 312 to move the locking member 306A, 306B, 306C, 306D from the extended position shown in FIG. 39 to the retracted position shown in FIG. 40. When the unlocking force is withdrawn, the attachment member 312 is biased to return the locking member 306A, 306B, 306C, 306D from the retracted position shown in FIG. 40 back to the extended position shown in FIG. 39.

Figure 35:
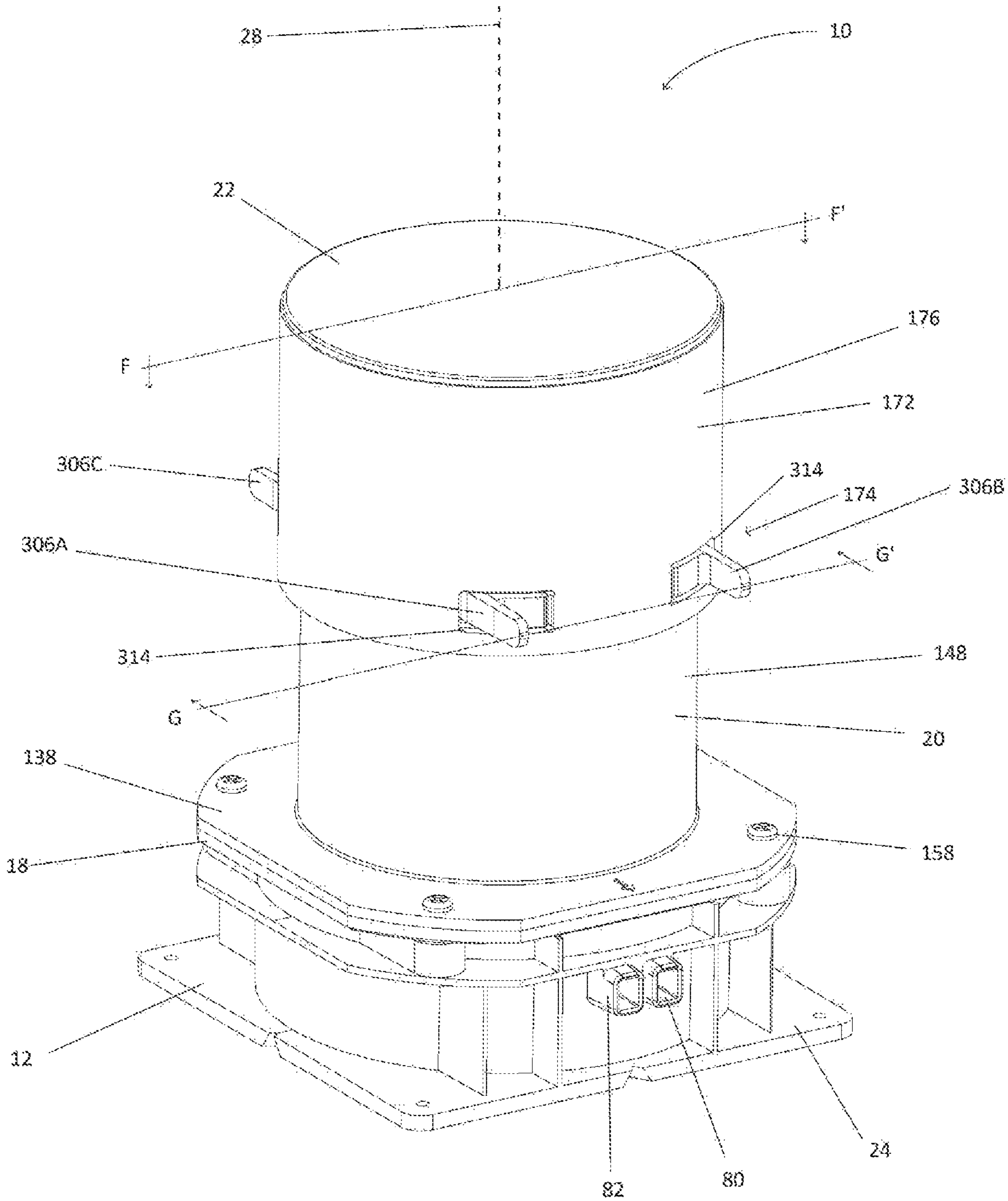
FIG. 35 is a perspective view of a firestop device in accordance with a second embodiment of the present invention, with an extension sleeve of the firestop device shown at a first height.
Figure 36:
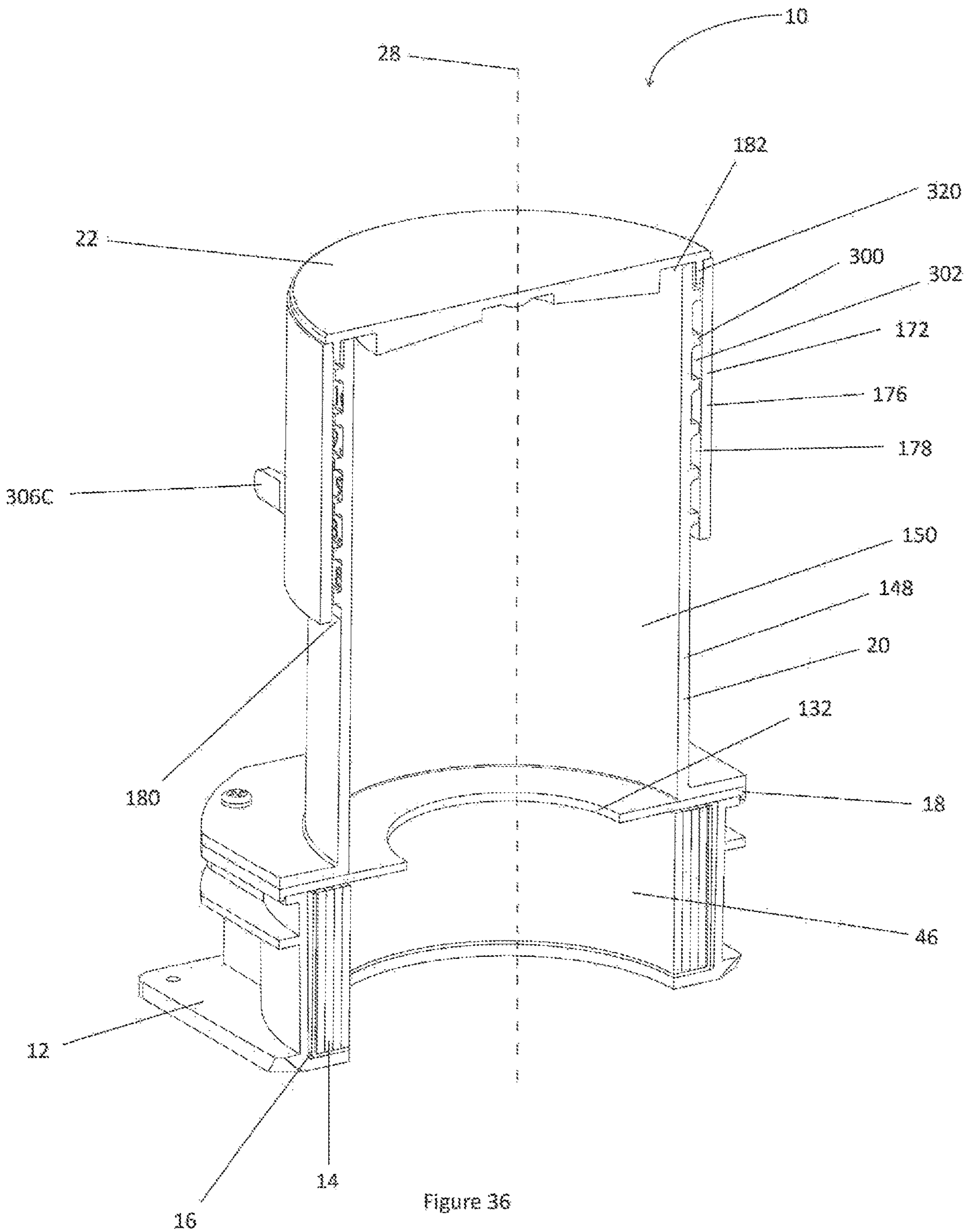
FIG. 36 is a cross-sectional view of the firestop device of FIG. 35, taken along line F-F' shown in FIG. 35.

As in the embodiment shown in FIGS. 1 to 34, in the embodiment shown in FIGS. 35 to 43 the extension sleeve 172 is configured to be coupled to the sleeve 20 by inserting the open top end 154 of the sleeve 20 into the open lower end 180 of the extension sleeve 172. When the extension sleeve 172 is coupled to the sleeve 20, the cylindrical outer wall 176 of the extension sleeve 172 extends coaxially about the center axis 28 of the housing 12, as shown in FIGS. 35 and 36.

As can be seen in FIG. 39, when the extension sleeve 172 is coupled to the sleeve 20 and the locking members 306A, 306B, 306C, 306D are at the extended position, the inner locking ends 308 of the locking members 306A, 306B, 306C, 306D at least partially overlap with the ribs 300 in the vertical direction. The inner locking ends 308 are therefore unable to move vertically past the ribs 300 when the locking members 306A, 306B, 306C, 306D are at the extended position, which limits the extent to which the extension sleeve 172 can move vertically relative to the sleeve 20. For example, if the locking members 306A, 306B, 306C, 306D are at the extended position and the inner locking ends 308 are positioned in one of the locking member receiving channels 302, then the extension sleeve 172 will be prevented from sliding vertically upwardly relative to the sleeve 20 by the engagement of the inner locking ends 308 with the rib 300 defining the upper boundary of the locking member receiving channel 302, and the extension sleeve 172 will be prevented from sliding vertically downwardly relative to the sleeve 20 by the engagement of the inner locking ends 308 with the rib 300 defining the lower boundary of the locking member receiving channel 302.

As can be seen in FIG. 40, when the locking members 306A, 306B, 306C, 306D are at the retracted position, the inner locking ends 308 are retracted outwardly away from the sleeve 20, and do not overlap with the ribs 300 in the vertical direction. The extension sleeve 172 is thus able to move freely in the vertical direction relative to the sleeve 20 when the locking members 306A, 306B, 306C, 306D are at the retracted position, without the inner locking ends 308 engaging with the ribs 300 and obstructing the vertical movement.

The locking members 306 and the ribs 300 serve as a locking mechanism 174 that allows the height of the firestop device 10 to be selected by moving the extension sleeve 172 to the desired height relative to the sleeve 20, and then locking the extension sleeve 172 in place at the selected height. To move the extension sleeve 172 to the desired height, the locking members 306A, 306B, 306C, 306D are moved to the retracted position, for example by squeezing the outer tabs 310 of locking members 306A and 306B together using one hand and squeezing the outer tabs 310 of locking members 306C and 306D together using the other hand. With the inner locking ends 308 of the locking members 306A, 306B, 306C, 306D retracted, the extension sleeve 172 can be moved freely in the vertical direction to the desired height.

Optionally, an installer may use the height indicators 304 on the sleeve 20 to assist in selecting the height of the extension sleeve 172. For example, if the desired height of the firestop device 10 is nine inches, the installer would slide the extension sleeve 172 vertically until the locking members 306A, 306B, 306C, 306D are in vertical alignment with the locking member receiving channel 302 having the height indicator 304 for nine inches. The installer would then release the outer tabs 310 of the locking members 306A, 306B, 306C, 306D, causing the locking members 306A, 306B, 306C, 306D to return to the extended position under the bias of the attachment members 312, so that the inner locking ends 308 of the locking members 306A, 306B, 306C, 306D now extend radially inwardly into the locking member receiving channel 302 having the height indicator 304 for nine inches. The extension sleeve 172 would then be locked at the desired height, with the inner locking ends 308 engaging with the ribs 300 defining the upper and lower boundaries of the locking member receiving channel 302 and thereby preventing the extension sleeve 172 from moving upwardly or downwardly relative to the sleeve 20 while the locking members 306A, 306B, 306C, 306D remain at the extended position.

Once the extension sleeve 172 is locked at the desired height, the cap 22 can then be secured to the open upper end 182 of the extension sleeve 172. As in the embodiment shown in FIGS. 1 to 34, the cap 22 prevents concrete from entering the inner chamber 150 of the sleeve 20, and also prevents installers from stepping into an open sleeve 20. As best shown in FIG. 36, the cap 22 has an annular cap locking ridge 320 that extends downwardly from a bottom surface of the cap 22. The cap locking ridge 320 is configured to slide into the open upper end 182 of the extension sleeve 172 and to engage in a friction fit with an inner surface of the cylindrical outer wall 176 of the extension sleeve 172. When the extension sleeve 172 is at the eight inch position, as shown in FIG. 36, the cap locking ridge 320 fits between the cylindrical outer wall 176 of the extension sleeve 172 and the cylindrical wall 148 of the sleeve 20, and sits above the uppermost rib 300.

Figure 42:
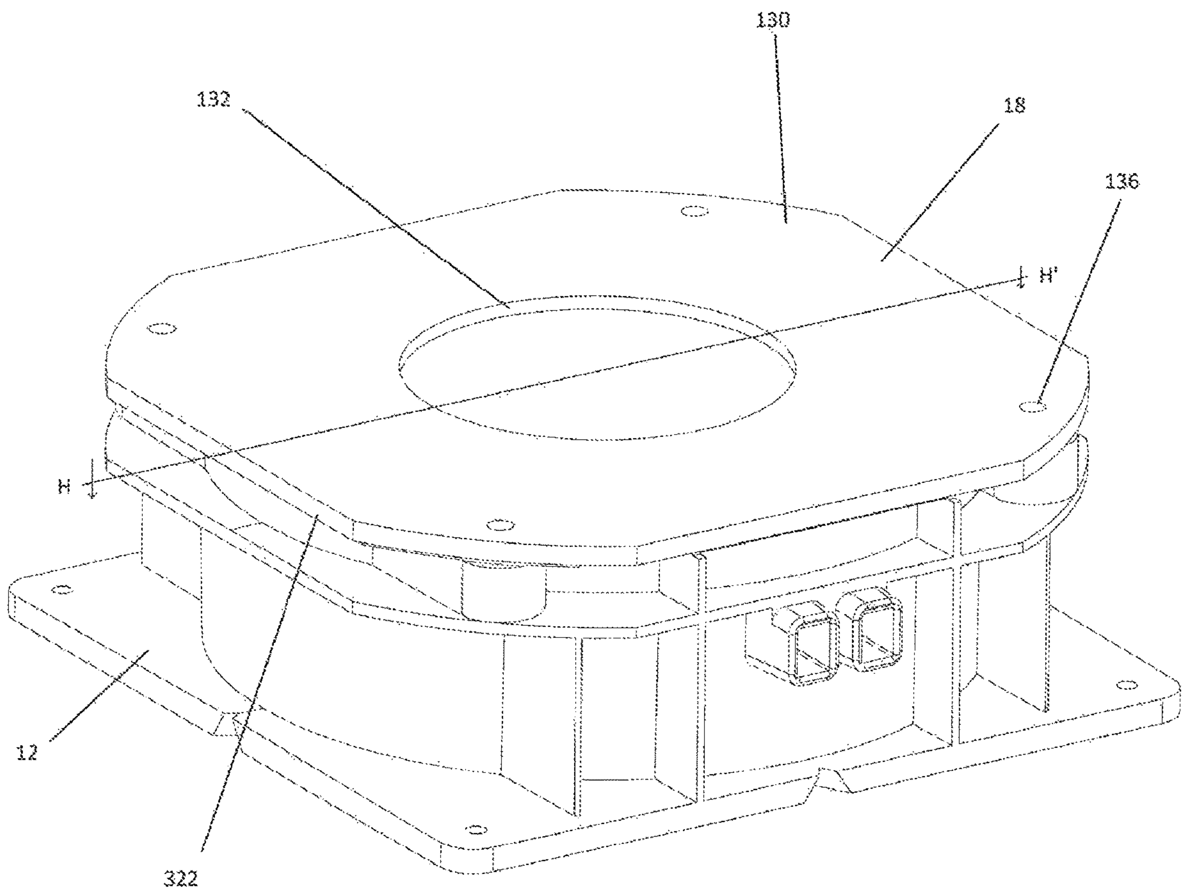
FIG. 42 is a perspective view of a housing and a gasket of the firestop device of FIG. 35.
Figure 43:
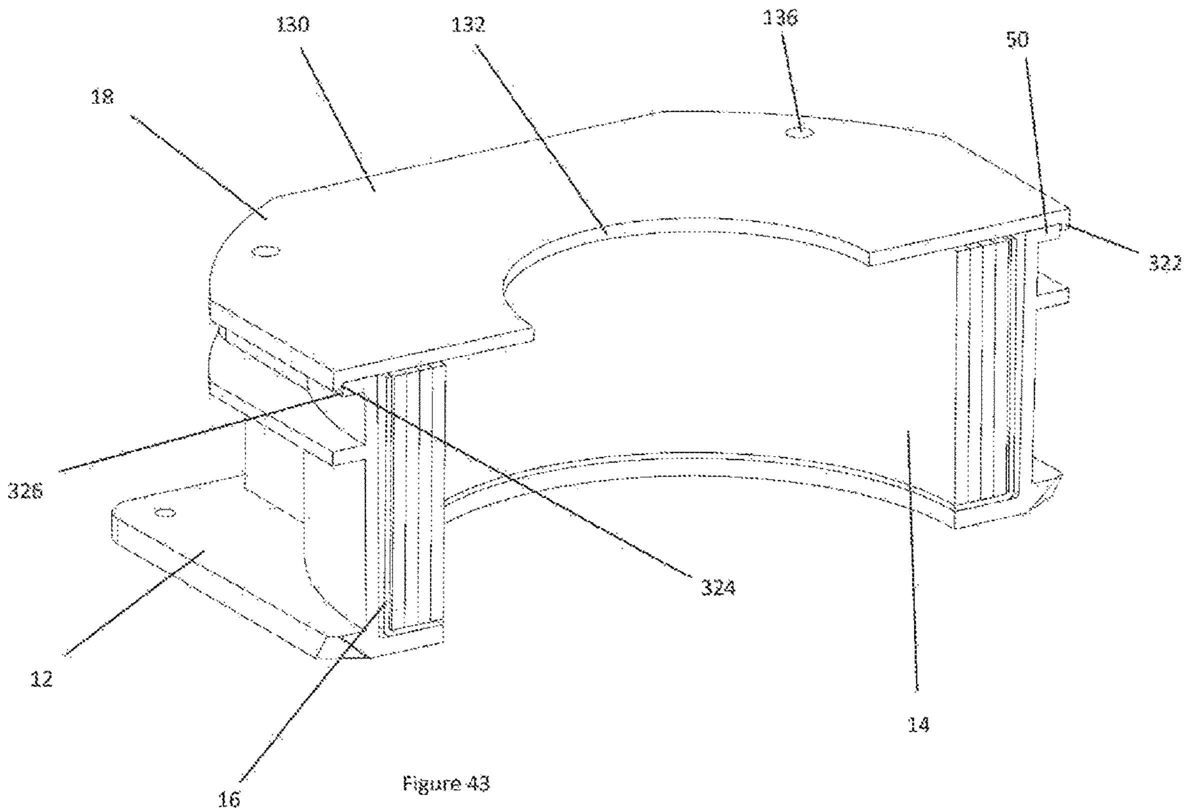
FIG. 43 is a perspective cross-sectional view of the housing and the gasket of FIG. 42, taken along line H-H' shown in FIG. 42.

Reference is now made to FIGS. 42 and 43, which show the gasket 18 of the firestop device 10 in accordance with the second embodiment of the invention coupled to the housing 12. The gasket 18 shown in FIGS. 42 and 43 differs from the gasket 18 shown in FIGS. 1 to 34 in that the gasket 18 shown in FIGS. 42 and 43 has a downwardly protruding circumferential wall or outer rim 322, and does not have the gasket fastening nodules 134. The outer rim 322 has an inwardly facing catch surface 324 that engages with an outwardly facing catching surface 326 of the upper housing flange 50 of the housing 12. The engagement of the catch surface 324 of the outer rim 322 with the catching surface 326 of the upper housing flange 50 helps to prevent the gasket 18 from being pulled inwards when a pipe 164 is pulled through the central opening 132 of the gasket 18.

The firestop device 10 shown in FIGS. 35 to 43 may be used in the same manner and for the same purposes as the firestop devices 10 shown in FIGS. 1 to 34, with the only, difference being the manner in which the extension sleeve 172 is coupled to the sleeve 20 for selecting and adjusting the height of the extension sleeve 172 relative to the sleeve 20.

The sleeve 20 of the firestop device 10 shown in FIGS. 35 to 43 has a height of 6 inches, with the six ribs 300 arranged to allow an installer to select the overall height of the firestop device 10 to be from 8 inches to 10 inches in ½ inch increments. This preferably allows the installer to select a suitable height for the firestop device 10 based on the thickness of the component that the firestop device 10 will be embedded within. The dimensions of the firestop device 10, including the height of the sleeve 20, the height of the extension sleeve 172, and the number and arrangement of the ribs 300 may be modified to allow the firestop device 10 to be installed in components of any desired thickness, including thicknesses that are less than 8 inches and more than 10 inches.

The locking members 306A, 306B, 306C, 306D could have a different construction and arrangement from that shown in FIGS. 35 to 43. For example, the extension sleeve 172 could have one, two, three, four, or more locking members 306A, 306B, 306C, 306D, which could be arranged in any suitable manner that permits locking and unlocking of the extension sleeve 172 relative to the sleeve 20. The inner locking end 308, the outer tab 310, and the attachment member 312 could all have a different construction from that shown in the drawings. Preferably, the construction and arrangement of the locking members 306A, 306B, 306C, 306D is selected so that the locking members 306A, 306B, 306C, 306D are able to withstand specified amounts of load applied to the firestop device 10 during and after installation.

It will be understood that, although various features of the invention have been described with respect to one or another of the embodiments of the invention, the various features and embodiments of the invention may be combined or used in conjunction with other features and embodiments of the invention as described and illustrated herein.

The firestop device 10 in accordance with the present invention is not limited to the particular construction shown in the drawings. For example, the device 10 could have a greater number or a smaller number of connection elements 100, 102, 104, 106, 108, 110 than shown in the drawings. Preferably, the device 10 has at least four connection elements 100, 102, 104, 106, 108, 110, and more preferably at least six connection elements 100, 102, 104, 106, 108, 110. The device 10 could also have a greater number or a smaller number of complementary elements 80, 82. For example, in an alternative embodiment the device 10 could have only one complementary element 80 instead of two.

The connection elements 100, 102, 104, 106, 108, 110 and the complementary element or elements 80, 82 are not limited to the particular construction shown in the drawings. Rather, the connection elements 100, 102, 104, 106, 108, 110 and the complementary element or elements 80, 82 could have any suitable construction that permits the complementary element or elements 80, 82 to connect to a selected one or more of the complementary elements 100, 102, 104, 106, 108, 110.

Each of the firestop devices 10, 11 of the cast-in-place constructional system are preferably substantially identical, and have both a female side 70 and a male side 72 as shown in the drawings, which permits the devices 10, 11 to be linked together in a daisy chain of indefinite length. This, however, is not strictly necessary. For example, the first firestop device 10 could optionally have only a female side 70 and the second firestop device 11 could optionally have only a male side 72, or the first firestop device 10 could have two female sides 70 and the second firestop device 11 could have two male sides 72. The devices 10, 11 could also be designed to each have more than two connectable male and/or female sides 70, 72. For example, the devices 10, 11 could optionally be configured to have connection elements 100, 102, 104, 106, 108, 110 and/or complementary elements 80, 82 facing towards each of the four sides 30A, 30B, 30C, 30D of the base plate 24. The base plate 24 could also have a different shape from that shown in the drawings, and could for example alternatively have a circular or triangular shape.

The extension assembly 170 could also have a different construction from that shown in the drawings. For example, any suitable locking mechanism 174 for locking the extension sleeve 172 at the desired height could be used, and the invention is not limited to the particular locking sleeve 184 and locking lever 186 shown in the drawings.

In addition to the cast-in-place constructional system and the firestop devices 10, 11 described above, the present invention also includes methods of manufacturing, assembling, modifying, installing, using, and operating the system and the devices 10, 11. For example, the invention includes a method of positioning and installing the first firestop device 10 and the second firestop device 11, the method comprising: selecting a position for installing the first firestop device 10 relative to the second firestop device 11; selecting one of the connection elements 100, 102, 104, 106, 108, 110 of the connection side 70 of the first firestop device 10 to connect to the complementary element 80 of the complementary side 72 of the second firestop device 11 based on the position selected for installing the first firestop device 10 relative to the second firestop device 11; connecting the complementary element 80 of the complementary side 72 of the second firestop device 11 to the selected one of the connection elements 100, 102, 104, 106, 108, 110 of the connection side 70 of the first firestop device 10; and installing the first firestop device 10 and the second firestop device 11.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The invention claimed is:

1. A cast-in-place constructional system comprising a first firestop device and a second firestop device that are embeddable in a to-be-cast constructional component, the first firestop device and the second firestop device each comprising:

a housing with an internal passageway for receiving a conduit; and an intumescent material that is positioned within the internal passageway, the intumescent material being configured to expand and occlude the internal passageway when exposed to heat from a fire;

wherein the housing of the first firestop device is configured to interlock with the housing of the second firestop device;

wherein the housing of the first firestop device and the housing of the second firestop device each have a center axis that extends through a center of their respective internal passageways;

wherein, when the housing of the first firestop device is interlocked with the housing of the second firestop device, the center axis of the first firestop device is parallel to the center axis of the second firestop device;

wherein the housing of the first firestop device and the housing of the second firestop device each have a mounting flange for releasably mounting the first firestop device and the second firestop device to a formwork of the to-be-cast constructional component;

wherein the housing of the first firestop device has a connection side with a plurality of connection elements and the housing of the second firestop device has a complementary side with a complementary element, the complementary element of the complementary side of the second firestop device being configured to connect to a selected one of the connection elements of the connection side of the first firestop device;

wherein the connection elements of the connection side of the first firestop device are each arranged at a different location on the connection side of the housing of the first firestop device, so that a position of the first firestop device relative to the second firestop device, when the connection side of the housing of the first firestop device is interlocked with the complementary side of the housing of the second firestop device, is selectable by selecting which of the connection elements of the connection side of the first firestop device is connected to the complementary element of the complementary side of the second firestop device;

wherein the mounting flange of the first firestop device lies in a mounting plane;

wherein the connection elements of the connection side of the first firestop device each intersect a connection plane, the connection plane being parallel to the mounting plane;

wherein the connection elements of the connection side of the first firestop device are arranged along a connection axis, the connection axis being parallel to the mounting plane;

wherein, for each of the first firestop device and the second firestop device, the center axis is perpendicular to the mounting plane;

wherein the plurality of connection elements of the connection side of the first firestop device comprise at least a first connection element and a second connection element;

wherein, when the complementary element of the complementary side of the second firestop device is connected to the first connection element of the first firestop device, the center axis of the second firestop device is located at a first position relative to the center axis of the first firestop device;

wherein, when the complementary element of the complementary side of the second firestop device is connected to the second connection element of the first firestop device, the center axis of the second firestop device is located at a second position relative to the center axis of the first firestop device;

wherein the first position of the center axis of the second firestop device is spaced from the second position of the center axis of the second firestop device along an offset axis, the offset axis being parallel to the connection axis of the first firestop device and perpendicular to the center axis of the second firestop device;

wherein the complementary element of the complementary side of the second firestop device comprises a protrusion;

wherein the connection elements of the connection side of the first firestop device comprise sockets that are configured to matedly receive the protrusion of the second firestop device;

wherein the housing of the first firestop device and the housing of the second firestop device each have a female side and a male side;

wherein the connection side of the first firestop device is the female side of the first firestop device, and the complementary side of the second firestop device is the male side of the second firestop device;

wherein, when the housing of the first firestop device is interlocked with the housing of the second firestop device, the female side of the housing of the first firestop device is arranged adjacent to the male side of the housing of the second firestop device, with the protrusion of the second firestop device matedly received by the selected one of the sockets of the first firestop device;

wherein the sockets each have a generally rectangular cavity, and the protrusion comprises a generally rectangular projection that is sized and shaped to be matedly received by the generally rectangular cavity of the selected one of the sockets;

wherein the female side of the housing of the first firestop device has a ladder-shaped socket member, the socket member having a top wall that is parallel to the mounting plane, a bottom wall that is spaced from the top wall and parallel to the mounting plane, and a series of spaced dividing walls that are perpendicular to the mounting plane and extend between the top wall and the bottom wall;

wherein the ladder-shaped socket member of the housing of the first firestop device has at least six sockets;

wherein each of the sockets of the first firestop device is defined between the top wall, the bottom wall, and an adjacent pair of the dividing walls;

wherein the protrusion of the second firestop device is a first protrusion, the housing of the second firestop device further comprising a second protrusion;

wherein the first protrusion and the second protrusion of the second firestop device are spaced from each other on the male side of the housing of the second firestop device;

wherein the first protrusion and the second protrusion have a gap therebetween that is sized to matedly receive one of the dividing walls of the socket member of the first firestop device; and wherein, when the housing of the first firestop device is interlocked with the housing of the second firestop device, the first protrusion and the second protrusion of the second firestop device are matedly received by a selected adjacent pair of the sockets of the first firestop device, and the dividing wall between the selected adjacent pair of the sockets is matedly received by the gap between the first protrusion and the second protrusion.

2. The cast-in-place constructional system according to claim 1, wherein the housing of the first firestop device is substantially identical to the housing of the second firestop device.

3. The cast-in-place constructional system according to claim 1, wherein the first firestop device has an alignment axis that intersects with the center axis of the first firestop device, the alignment axis of the first firestop device being perpendicular to the center axis of the first firestop device and perpendicular to the connection axis of the first firestop device;

wherein, when the complementary element of the complementary side of the second firestop device is connected to the second connection element of the first firestop device, the center axis of the second firestop device intersects with the alignment axis of the first firestop device.

4. The cast-in-place constructional system according to claim 3, wherein the plurality of connection elements of the connection side of the first firestop device further comprise a third connection element;

wherein, when the complementary element of the complementary side of the second firestop device is connected to the first connection element of the first firestop device, the center axis of the second firestop device is spaced from the alignment axis of the first firestop device in a first direction;

wherein, when the complementary element of the complementary side of the second firestop device is connected to the third connection element of the first firestop device, the center axis of the second firestop device is spaced from the alignment axis of the first firestop device in a second direction; and wherein the first direction and the second direction are opposite directions.

5. The cast-in-place constructional system according to claim 4, wherein a center of each of the plurality of connection elements of the connection side of the first firestop device is spaced a preselected distance along the connection axis from the center of an adjacent one of the plurality of connection elements of the connection side of the first firestop device;

wherein, when the complementary element of the complementary side of the second firestop device is connected to the first connection element of the first firestop device, the center axis of the second firestop device is spaced the preselected distance from the alignment axis of the first firestop device in the first direction; and wherein, when the complementary element of the complementary side of the second firestop device is connected to the third connection element of the first firestop device, the center axis of the second firestop device is spaced the preselected distance from the alignment axis of the first firestop device in the second direction.

6. The cast-in-place constructional system according to claim 5, wherein the preselected distance is about ½ inch;

wherein the connection side of the housing of the first firestop device has at least four of the connection elements; and wherein the complementary side of the housing of the second firestop device has a second complementary element that is configured to connect to a second selected one of the connection elements of the connection side of the first firestop device.

7. The cast-in-place constructional system according to claim 1, wherein the first firestop device and the second firestop device each further comprise:

a sleeve that is fastened to the housing, the sleeve having a cylindrical wall that extends coaxially about the center axis of the internal passageway of the housing, the cylindrical wall defining an inner chamber with an open bottom end that is open to the internal passageway and an open top end;

a cap that removably couples to the open top end of the sleeve, the cap preventing poured concrete from getting into the inner chamber;

a gasket that is interposed between the sleeve and the housing, the gasket having a center hole for receiving the conduit and providing a water tight seal between the gasket and the conduit; and a metal sheath that annularly surrounds the intumescent material, the metal sheath having four tabs that are parallel to the mounting plane and extend out of the internal passageway, each of the four tabs having a hole for receiving the poured concrete, the tabs anchoring the metal sheath in the poured concrete when the poured concrete cures.

8. The cast-in-place constructional system according to claim 7, wherein the first firestop device and the second firestop device each further comprise:

a telescopic extension sleeve that removably couples to the sleeve, the extension sleeve having a cylindrical outer wall that extends coaxially about the center axis of the internal passageway of the housing when the extension sleeve is coupled to the sleeve, the cylindrical outer wall defining an inner extension chamber with an open lower end for receiving the open top end of the sleeve, and an open upper end; and a locking mechanism for locking the extension sleeve at a selected height relative to the sleeve;

wherein the cap removably couples to the open upper end of the extension sleeve, the cap preventing the poured concrete from getting into the inner extension chamber.

9. The cast-in-place constructional system according to claim 8, wherein the locking mechanism comprises an annular locking sleeve and a locking lever;

wherein the annular locking sleeve has an upper cylindrical portion and a lower cylindrical portion, the upper cylindrical portion defining an upper receiving chamber that matedly receives the open lower end of the extension sleeve, and the lower cylindrical portion defining a lower receiving chamber that matedly receives the open top end of the sleeve;

wherein the annular locking sleeve is split vertically by a slit opening that extends vertically through the upper cylindrical portion and the lower cylindrical portion, the annular locking sleeve having a first end surface on a first side of the slit opening and a second end surface on a second side of the slit opening;

wherein the annular locking sleeve is deformable between a locked position, in which the first end surface is spaced a first distance from the second end surface, and an unlocked position, in which the first end surface is spaced a second distance from the second end surface, the first distance being smaller than the second distance;

wherein, when the annular locking sleeve is in the locked position, the upper cylindrical portion has a first upper diameter and the lower cylindrical portion has a first lower diameter, the first upper diameter being larger than the first lower diameter;

wherein, when the annular locking sleeve is in the unlocked position, the upper cylindrical portion has a second upper diameter and the lower cylindrical portion has a second lower diameter, the second upper diameter being larger than the second lower diameter, the second upper diameter being larger than the first upper diameter, and the second lower diameter being larger than the first lower diameter;

wherein, when the annular locking sleeve is in the unlocked position and the sleeve is matedly received by the lower cylindrical portion, the lower cylindrical portion is vertically slidable relative to the sleeve;

wherein, when the annular locking sleeve is in the locked position and the sleeve is matedly received by the lower cylindrical portion, the lower cylindrical portion engages with the sleeve so as to prevent the lower cylindrical portion from sliding vertically relative to the sleeve;

wherein the locking lever rotatably couples to the annular locking sleeve, the locking lever being rotatable relative to the annular locking sleeve between a locking position and an unlocking position;

wherein, when the locking lever is in the unlocking position, the locking lever allows the annular locking sleeve to move to the unlocked position, in which the first end surface is spaced the second distance from the second end surface; and wherein, when the locking lever is in the locking position, the locking lever forces the annular locking sleeve to move to the locked position, in which the first end surface is spaced the first distance from the second end surface.

10. The cast-in-place constructional system according to claim 9, wherein the annular locking sleeve has a first lever attachment member that is positioned adjacent to the first end surface and a second lever attachment member that is positioned adjacent to the second end surface;

wherein the first lever attachment member has a first lever attachment channel and the second lever attachment member has a second lever attachment channel;

wherein the first lever attachment member and the second lever attachment member each have an outer tapered face that faces away from the slit opening and extends radially outwardly from the upper cylindrical portion, the outer tapered face having a radially inner portion and a radially outer portion, the radially inner portion being closer to the upper cylindrical portion than the radially outer portion is to the upper cylindrical portion;

wherein, when the annular locking sleeve is in the unlocked position, the radially inner portion of the first lever attachment member is further from the radially inner portion of the second lever attachment member than the radially outer portion of the first lever attachment member is from the radially outer portion of the second lever attachment member;

wherein the first lever attachment member and the second lever attachment member each have a snap fit slot;

wherein the locking lever has an axle member that is rotatably received by the first lever attachment channel and the second lever attachment channel;

wherein the locking lever has a first arm member that is attached to a first end of the axle member and a second arm member that is attached to a second end of the axle member, the first arm member being spaced from the second arm member;

wherein the first arm member has an inner face that faces towards the second arm member, and the second arm member has an inner face that faces towards the first arm member;

wherein the inner face of the first arm member and the inner face of the second arm member each have an inner portion and an outer portion;

wherein, when the annular locking sleeve is in the unlocked position, the radially inner portion of the first lever attachment member is further from the radially inner portion of the second lever attachment member than the inner portion of the first arm member is from the inner portion of the second arm member;

wherein, when the locking lever is in the locking position, the inner portion of the first arm member engages with the radially inner portion of the first lever attachment member and the inner portion of the second arm member engages with the radially inner portion of the second lever attachment member, which forces the annular locking sleeve to move to the locked position;

wherein, when the locking lever is in the unlocking position, the inner portion of the first arm member is disengaged from the radially inner portion of the first lever attachment member and the inner portion of the second arm member is disengaged from the radially inner portion of the second lever attachment member, which allows the annular locking sleeve to move to the unlocked position;

wherein the first arm member and the second arm member each have a snap fit tab; and wherein, when the locking lever is in the locking position, the snap fit tab of the first arm member engages in a snap fit with the snap fit slot of the first lever attachment member and the snap fit tab of the second arm member engages in a snap fit with the snap fit slot of the second lever attachment member.

11. A method of positioning and installing a first firestop device and a second firestop device, the first firestop device and the second firestop device each comprising:

a housing with an internal passageway for receiving a conduit; and an intumescent material that is positioned within the internal passageway, the intumescent material being configured to expand and occlude the internal passageway when exposed to heat from a fire;

wherein the housing of the first firestop device is configured to interlock with the housing of the second firestop device;

wherein the housing of the first firestop device has a connection side with a plurality of connection elements and the housing of the second firestop device has a complementary side with a complementary element, the complementary element of the complementary side of the second firestop device being configured to connect to a selected one of the connection elements of the connection side of the first firestop device; and wherein the connection elements of the connection side of the first firestop device are each arranged at a different location on the connection side of the housing of the first firestop device;

the method comprising:

selecting a position for installing the first firestop device relative to the second firestop device;

selecting one of the connection elements of the connection side of the first firestop device to connect to the complementary element of the complementary side of the second firestop device based on the position selected for installing the first firestop device relative to the second firestop device;

connecting the complementary element of the complementary side of the second firestop device to the selected one of the connection elements of the connection side of the first firestop device; and installing the first firestop device and the second firestop device;

wherein the housing of the first firestop device has a mounting flange for releasably mounting the first firestop device to a formwork of a to-be-cast concrete component, the mounting flange lying in a mounting plane;

wherein the connection elements of the connection side of the first firestop device each intersect a connection plane, the connection plane being parallel to the mounting plane;

wherein the connection elements of the connection side of the first firestop device are arranged along a connection axis the connection axis being parallel to the mounting plane;

wherein the housing of the first firestop device is substantially identical to the housing of the second firestop device;

wherein the housing of the first firestop device and the housing of the second firestop device each have a center axis that extends through a center of their respective internal passageways, the center axis being perpendicular to the mounting plane;

wherein, when the housing of the first firestop device is interlocked with the housing of the second firestop device, the center axis of the first firestop device is parallel to the center axis of the second firestop device;

wherein the plurality of connection elements of the connection side of the first firestop device comprise at least a first connection element and a second connection element;

wherein, when the complementary element of the complementary side of the second firestop device is connected to the first connection element of the first firestop device, the center axis of the second firestop device is located at a first position relative to the center axis of the first firestop device;

wherein, when the complementary element of the complementary side of the second firestop device is connected to the second connection element of the first firestop device, the center axis of the second firestop device is located at a second position relative to the center axis of the first firestop device;

wherein the first position of the center axis of the second firestop device is spaced from the second position of the center axis of the second firestop device along an offset axis, the offset axis being parallel to the connection axis of the first firestop device and perpendicular to the center axis of the second firestop device;

wherein selecting the position for installing the first firestop device relative to the second firestop device comprises selecting at least from the first position and the second position;

wherein selecting one of the connection elements of the connection side of the first firestop device to connect to the complementary element of the complementary side of the second firestop device comprises selecting at least from the first connection element and the second connection element;

wherein installing the first firestop device and the second firestop device comprises connecting the mounting flange of the first firestop device and the mounting flange of the second firestop device to the formwork of the to-be-cast concrete component;

wherein the first firestop device and the second firestop device each further comprise:

a sleeve that is fastened to the housing, the sleeve having a cylindrical wall that extends coaxially about the center axis of the internal passageway of the housing, the cylindrical wall defining an inner chamber with an open bottom end that is open to the internal passageway and an open top end;

a gasket that is interposed between the sleeve and the housing, the gasket having a center hole for receiving the conduit;

a metal sheath that annularly surrounds the intumescent material, the metal sheath having four tabs that are parallel to the mounting plane and extend out of the internal passageway, each of the four tabs having a hole;

a telescopic extension sleeve that removably couples to the sleeve, the extension sleeve having a cylindrical outer wall that extends coaxially about the center axis of the internal passageway of the housing when the extension sleeve is coupled to the sleeve, the cylindrical outer wall defining an inner extension chamber with an open lower end for receiving the open top end of the sleeve, and an open upper end;

a locking mechanism for locking the extension sleeve at a selected height relative to the sleeve; and a cap that removably couples to the open top end of the sleeve or the open upper end of the extension sleeve;

wherein installing the first firestop device and the second firestop device comprises, for each of the first firestop device and the second firestop device;

selecting a desired height of the firestop device based on a thickness of the to-be-cast concrete component;

if the desired height is smaller than an unmodified height of the firestop device, cutting the sleeve so that the firestop device has the desired height;

if the desired height is larger than the unmodified height of the firestop device, coupling the extension sleeve to the sleeve, positioning the extension sleeve so that the firestop device has the desired height, and locking the extension sleeve at the desired height;

coupling the cap to the open top end of the sleeve or the open upper end of the extension sleeve;

pouring concrete into the formwork to form the concrete component, the poured concrete being received by the holes in the tabs of the metal sheath, and the cap preventing the poured concrete from getting into the inner chamber or the inner extension chamber;

curing the concrete, with the holes in the tabs of the metal sheath anchoring the metal sheath in the cured concrete;

removing the cap from the open top end of the sleeve or the open upper end of the extension sleeve; and inserting the conduit through the internal passageway, the hole in the gasket, the inner chamber, and, if the extension sleeve is coupled to the sleeve, the inner extension chamber, with the gasket providing a water tight seal between the gasket and the conduit.

12. A cast-in-place constructional system comprising a first firestop device and a second firestop device that are embeddable in a to-be-cast constructional component, the first firestop device and the second firestop device each comprising:

a housing with an internal passageway for receiving a conduit; and an intumescent material that is positioned within the internal passageway, the intumescent material being configured to expand and occlude the internal passageway when exposed to heat from a fire;

wherein the housing of the first firestop device is configured to interlock with the housing of the second firestop device;

wherein the housing of the first firestop device and the housing of the second firestop device each have a center axis that extends through a center of their respective internal passageways;

wherein, when the housing of the first firestop device is interlocked with the housing of the second firestop device, the center axis of the first firestop device is parallel to the center axis of the second firestop device;

wherein the housing of the first firestop device and the housing of the second firestop device each have a mounting flange for releasably mounting the first firestop device and the second firestop device to a formwork of the to-be-cast constructional component;

wherein the housing of the first firestop device has a connection side with a plurality of connection elements and the housing of the second firestop device has a complementary side with a complementary element, the complementary element of the complementary side of the second firestop device being configured to connect to a selected one of the connection elements of the connection side of the first firestop device;

wherein the connection elements of the connection side of the first firestop device are each arranged at a different location on the connection side of the housing of the first firestop device, so that a position of the first firestop device relative to the second firestop device, when the connection side of the housing of the first firestop device is interlocked with the complementary side of the housing of the second firestop device, is selectable by selecting which of the connection elements of the connection side of the first firestop device is connected to the complementary element of the complementary side of the second firestop device;

wherein the first firestop device and the second firestop device each further comprise:

a sleeve that is fastened to the housing, the sleeve having a cylindrical wall that extends coaxially about the center axis of the internal passageway of the housing, the cylindrical wall defining an inner chamber with an open bottom end that is open to the internal passageway and an open top end;

a telescopic extension sleeve that removably couples to the sleeve, the extension sleeve having a cylindrical outer wall that extends coaxially about the center axis of the internal passageway of the housing when the extension sleeve is coupled to the sleeve, the cylindrical outer wall defining an inner extension chamber with an open lower end for receiving the open top end of the sleeve, and an open upper end;

a cap that removably couples to the open upper end of the extension sleeve, the cap preventing poured concrete from entering the inner extension chamber; and a locking mechanism for locking the extension sleeve at a selected height relative to the sleeve;

wherein the sleeve has a series of vertically spaced ribs that extend radially outwardly from the cylindrical wall;

wherein the extension sleeve has one or more locking members that are movable relative to the cylindrical outer wall between an extended position and a retracted position;

wherein each said locking member comprises;

an inner locking end that extends inwardly into the inner extension chamber when the locking member is at the extended position;

an outer tab that extends outwardly from the cylindrical outer wall; and an attachment member that attaches the locking member to the cylindrical outer wall;

wherein the attachment member is resiliently deformable so as to allow the locking member to move relative to the cylindrical outer wall from the extended position to the retracted position upon application of an unlocking force to the outer tab;

wherein the attachment member is biased to return the locking member to the extended position when the unlocking force is withdrawn from the outer tab;

wherein, when the extension sleeve is coupled to the sleeve and the locking member is at the extended position, the inner locking end limits vertical movement of the extension sleeve relative to the sleeve by engagement of the inner locking end with one or more of the ribs on the sleeve; and wherein, when the extension sleeve is coupled to the sleeve and the locking member is at the retracted position, the inner locking end is retracted outwardly away from the sleeve and is disengaged from the ribs on the sleeve, so that the vertical movement of the extension sleeve relative to the sleeve is unobstructed by the inner locking end.

13. The cast-in-place constructional system according to claim 12, wherein the one or more locking members comprise a first locking member, a second locking member, a third locking member, and a fourth locking member;

wherein the first locking member is positioned adjacent to the second locking member so that a user is able to move the first locking member and the second locking member from the extended position to the retracted position by squeezing the outer tabs of the first locking member and the second locking member together with a first hand;

wherein the third locking member is positioned adjacent to the fourth locking member so that the user is able to move the third locking member and the fourth locking member from the extended position to the retracted position by squeezing the outer tabs of the third locking member and the fourth locking member together with a second hand;

wherein, when the extension sleeve is coupled to the sleeve and the first locking member, the second locking member, the third locking member, and the fourth locking member are at the retracted position, the extension sleeve is vertically slideable relative to the sleeve for positioning the extension sleeve at the selected height relative to the sleeve; and wherein, when the extension sleeve is at the selected height relative to the sleeve and the first locking member, the second locking member, the third locking member, and the fourth locking member are allowed to return to the extended position, the inner locking ends of the first locking member, the second locking member, the third locking member, and the fourth locking member engage with one or more of the ribs to lock the extension sleeve at the selected height relative to the sleeve.

* * * * *